United States Patent [19]
Yamashita et al.

[11] Patent Number: 5,487,270
[45] Date of Patent: Jan. 30, 1996

[54] AIR-FUEL RATIO CONTROL SYSTEM FOR INTERNAL COMBUSTION ENGINE

[75] Inventors: Yukihiro Yamashita, Kariya, Japan; Kenji Ikuta, Rolling Hills Estates, Calif.; Shigenori Isomura, Kariya, Japan

[73] Assignee: Nippondenso Co., Ltd., Kariya, Japan

[21] Appl. No.: 85,378

[22] Filed: Jul. 2, 1993

[30] Foreign Application Priority Data

| Jul. 3, 1992 | [JP] | Japan | 4-177227 |
| Jul. 3, 1992 | [JP] | Japan | 4-177228 |
| Oct. 30, 1992 | [JP] | Japan | 4-292503 |
| Jan. 14, 1993 | [JP] | Japan | 5-005290 |

[51] Int. Cl.$^6$ ............................................. F01N 3/20
[52] U.S. Cl. .................................. 60/276; 60/277; 60/285
[58] Field of Search ................................ 60/276, 277, 285

[56] References Cited

U.S. PATENT DOCUMENTS

| 5,090,199 | 2/1992 | Ikuta et al. |  |
| 5,311,737 | 5/1994 | Komatsu | 60/277 |

FOREIGN PATENT DOCUMENTS

| 61-286550 | 12/1986 | Japan . |
| 1110853 | 4/1989 | Japan . |
| 2238147 | 9/1990 | Japan . |
| 3185244 | 8/1991 | Japan . |
| 3217633 | 9/1991 | Japan . |
| 3253714 | 11/1991 | Japan . |
| 2242544 | 10/1991 | United Kingdom . |

*Primary Examiner*—Douglas Hart
*Attorney, Agent, or Firm*—Cushman, Darby & Cushman

[57] ABSTRACT

An air-fuel ratio control system for an internal combustion engine includes two air-fuel ratio sensors, one upstream of a catalytic converter and the other downstream of the catalytic converter. When an output of the downstream air-fuel ratio sensor has been inverted between rich and lean, a target air-fuel ratio is corrected by a skip amount in a direction opposite to that of the inversion. On the other hand, at no inversion, the target air-fuel ratio is corrected by an integral amount in a direction opposite to deviation of the output of the downstream air-fuel ratio sensor. A fuel injection amount is derived based on a differential between the target air-fuel ratio and an output of the upstream air-fuel ratio sensor. An engine operating condition, the output of the downstream air-fuel ratio sensor or a deterioration degree of the catalytic converter may be used to change the skip amount and the integral amount.

24 Claims, 45 Drawing Sheets

IDLING OR ΔPM≦ΟmmHg : VOX2TG=0.35V
ΔPM≧ΟmmHg : VOX2TG=0.55V

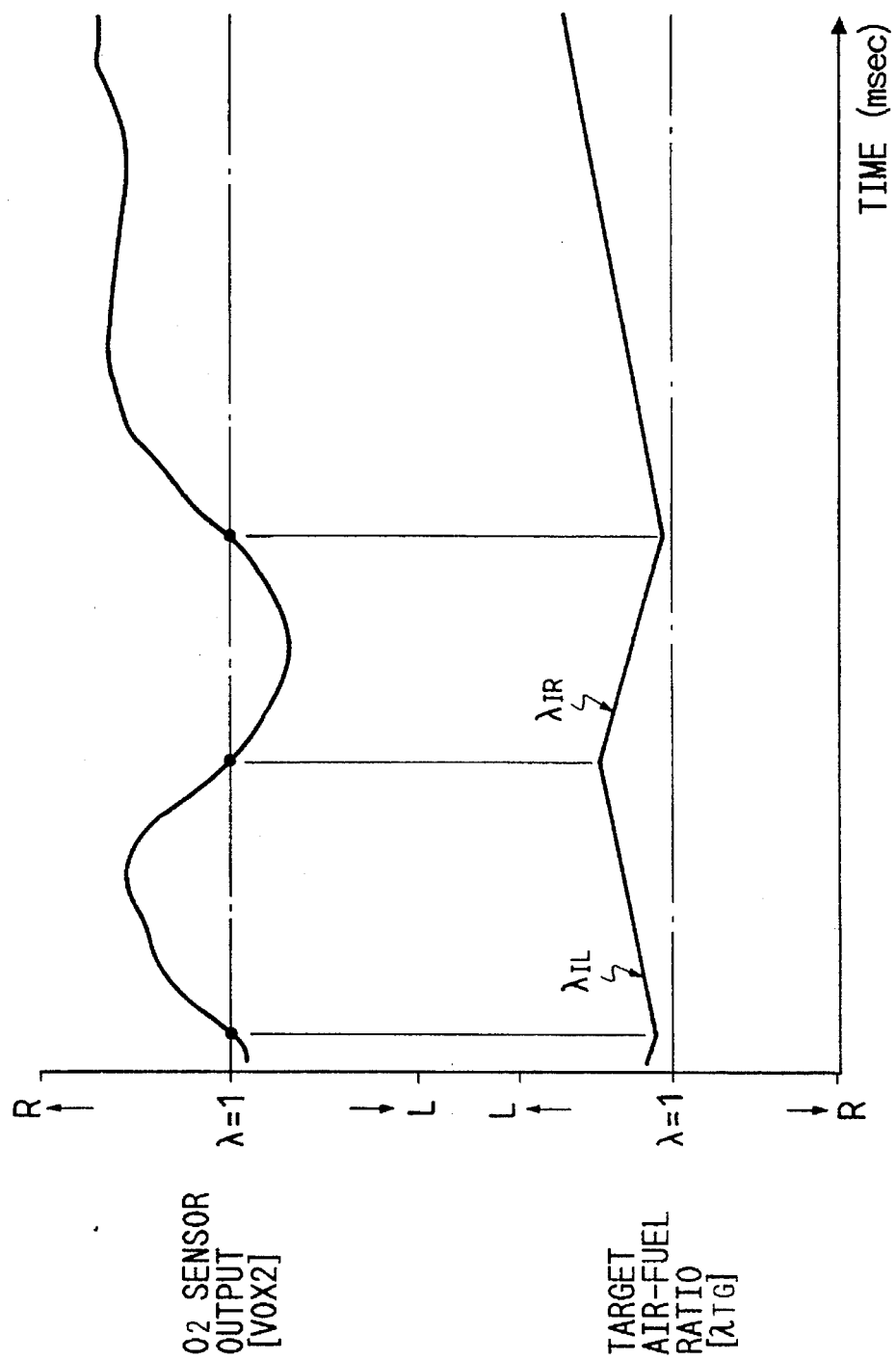

AIR-FUEL RATIO CONTROL SYSTEM FOR INTERNAL COMBUSTION ENGINE

BACKGROUND OF THE INVENTION

1. Field of the Invention

The present invention relates generally to an air-fuel ratio control system for an internal combustion engine, and more specifically, to the air-fuel ratio control system, wherein an air-fuel ratio feedback control is performed based on outputs from a pair of sensors which are provided on the upstream and downstream sides of a catalytic converter in an exhaust passage for monitoring the exhaust gas passing therethrough to respectively detect air-fuel ratios of an air-fuel mixture which has caused the monitored exhaust gas.

Hereinafter, for simplification of explanation, the expression "air-fuel ratio" will be used to represent not only "an air-fuel ratio of an air-fuel mixture to be fed to the engine", but also other meanings where the context allows. For example, the expression "air-fuel ratio" will also represent "an air-fuel ratio indicative or related condition of the monitored exhaust gas" or "a converted value of an air-fuel ratio", depending on the context.

2. Description of the Prior Art

Japanese First (unexamined) Patent Publication No. 2-238147 discloses an air-fuel ratio control system for an internal combustion engine of the above-noted two sensor type.

In the system of this publication, oxygen concentration sensors (hereinafter referred to as "$O_2$ sensors") are respectively arranged on the upstream and downstream sides of a catalytic converter. FIG. 52 shows a time chart of an air-fuel ratio correction coefficient FAF and an output voltage VOX2 of the downstream $O_2$ sensor derived in this conventional system. Specifically, when it is determined based on an output voltage of the upstream $O_2$ sensor that an air-fuel ratio of the exhaust gas is deviated or fluctuated to a rich or lean side with respect to a stoichiometric air-fuel ratio, the air-fuel ratio correction coefficient FAF is corrected by a preset integral amount KIR or KIL in a direction opposite to that of the deviation. Further, when the monitored air-fuel ratio is inverted from rich to lean or from lean to rich across the stoichiometric air-fuel ratio, the air-fuel ratio correction coefficient FAF is corrected in a skipped manner by a skip amount RSR or RSL which is set to a value greater than the integral amount KIR or KIL, in a direction opposite to that of the deviation, so as to converge the actual air-fuel ratio to the stoichiometric air-fuel ratio. Moreover, when the output voltage VOX2 of the downstream $O_2$ sensor largely fluctuates beyond a preset rich side limit value VRL or a preset lean side limit value VLL, the skip amount RSR or RSL is increased so as to largely correct the air-fuel ratio correction coefficient FAF for completing the correction of the air-fuel ratio as quick as possible.

Japanese First (unexamined) Patent Publication No. 3-185244 or U.S. Pat. No. 5,090,199 which is equivalent thereto, discloses another air-fuel ratio control system for an internal combustion engine of the two sensor type.

In the system of this publication, an air-fuel ratio sensor is arranged upstream of a catalytic converter, and an $O_2$ sensor is arranged downstream of the catalytic converter. FIG. 53 shows a time chart of an output voltage VOX2 of the $O_2$ sensor and a target air-fuel ratio λTG derived in this conventional system. Specifically, when it is determined based on the output voltage VOX2 of the $O_2$ sensor that an air-fuel ratio of the exhaust gas is deviated to a rich or lean side with respect to the stoichiometric air-fuel ratio, the target air-fuel ratio λTG is corrected at a constant speed by a preset rich integral amount λIR or a preset lean integral amount λIL in a direction opposite to that of the deviation. Subsequently, the air-fuel ratio correction coefficient FAF is calculated at a given updating speed based on a differential or deviation between the corrected target air-fuel ratio and the actual air-fuel ratio monitored by the air-fuel ratio sensor so as to converge the actual air-fuel ratio to the stoichiometric air-fuel ratio.

However, the foregoing conventional systems have the following disadvantages, respectively:

In the system of FIG. 52, as described above, the skip amount RSR or RSL which is used at a timing determined by the output voltage of the upstream $O_2$ sensor, is increased or decreased based on the output voltage VOX2 of the downstream $O_2$ sensor. Accordingly, the correction of the skip amount RSR or RSL effected by the output voltage of the downstream $O_2$ sensor is only reflected on the air-fuel ratio correction coefficient FAF when the air-fuel ratio monitored by the upstream $O_2$ sensor crosses the stoichiometric air-fuel ratio, i.e. at a timing when the skip amount RSR or RSL is used. As a result, assuming that the downstream $O_2$ sensor detects the air-fuel ratio as exceeding the rich side limit value VRL at a time point A in FIG. 52, the air-fuel ratio correction coefficient FAF is actually corrected by the increased lean skip amount RSL at a largely delayed time point B. This correction delay is likely to cause an excessive correction to periodically fluctuate the air-fuel ratio between the rich and lean sides so that the convergence to the stoichiometric air-fuel ratio is not effectively realized, resulting in alternate emissions of CO and HC, and NOx. Further, the correction delay is likely to cause the catalytic converter to be saturated so that the catalytic converter emits CO and HC, or NOx.

On the other hand, in the system of FIG. 53, since the air-fuel ratio correction coefficient FAF is calculated at a given updating speed based on the deviation of the actual air fuel ratio monitored by the air-fuel ratio sensor relative to the target air-fuel ratio corrected based on the output voltage VOX2 of the $O_2$ sensor, the rich integral amount λIR or the lean integral amount λIL is immediately reflected on the air-fuel ratio correction coefficient FAF. However, since the internal combustion engine, including the three way catalytic converter, is the system which basically represents a large delay, assuming that the inversion between rich and lean is detected based on the output voltage VOX2 of the downstream $O_2$ sensor, the air-fuel ratio upstream of the catalytic converter has already been largely deviated from the stoichiometric air-fuel ratio toward the rich or lean side. Accordingly, the delicate correction effected by the rich integral amount λIR or the lean integral amount λIL which is set very small, can not provide an effective target air-fuel ratio for quickly converging the actual air-fuel ratio to the stoichiometric air-fuel ratio. As a result, as in the conventional system of FIG. 52, the correction delay is caused so that the convergence to the stoichiometric air-fuel ratio is not realized, leading to alternate emissions of CO and HC, and NOx. Further, this correction delay is also likely to cause the catalytic converter to be saturated so that the same problem rises as in the conventional system of FIG. 52.

SUMMARY OF THE INVENTION

Therefore, it is an object of the present invention to provide an improved air-fuel ratio control system for an internal combustion engine that can eliminate one or more of the foregoing disadvantages inherent in the conventional air-fuel ratio control systems.

To accomplish the above-mentioned and other objects, according to one aspect of the present invention, an air-fuel ratio control system for an internal combustion engine comprises upstream air-fuel ratio detecting means, provided upstream of a catalytic converter in an exhaust passage of the engine, for detecting a first air-fuel ratio of an air-fuel mixture based on exhaust gas upstream of the catalytic converter; downstream air-fuel ratio detecting means, provided downstream of the catalytic converter, for detecting a second air-fuel ratio of the air-fuel mixture based on the exhaust gas having passed through the catalytic converter; inversion direction determining means for determining a direction of inversion of the second air-fuel ratio when the second air-fuel ratio has been inverted between rich and lean sides across a given air-fuel ratio; target air-fuel ratio setting means for correcting a target air-fuel ratio in a direction opposite to the direction of the inversion when determined by the inversion direction determining means, the target air-fuel ratio setting means correcting the target air-fuel ratio by a given skip amount in a skipped manner; and fuel injection amount deriving means for deriving a fuel injection amount of a fuel injection valve at a given updating speed based on a differential between the first air-fuel ratio and the target air-fuel ratio.

According to another aspect of the present invention, an air-fuel ratio control system for an internal combustion engine comprises upstream air-fuel ratio detecting means, provided upstream of a catalytic converter in an exhaust passage of the engine, for detecting a first air-fuel ratio of an air-fuel mixture based on exhaust gas upstream of the catalytic converter; downstream air-fuel ratio detecting means, provided downstream of the catalytic converter, for detecting a second air-fuel ratio of the air-fuel mixture based on the exhaust gas having passed through the catalytic converter; saturation determining means for determining saturation of the catalytic converter and a direction of the saturation based on the second air-fuel ratio; target air-fuel ratio setting means for correcting a target air-fuel ratio in a direction opposite to the direction of the saturation when the saturation determining means determines the saturation of the catalytic converter, the target air-fuel ratio setting means correcting the target air-fuel ratio by a given skip amount in a skipped manner; and fuel injection amount deriving means for deriving a fuel injection amount of a fuel injection valve at a given updating speed based on a differential between the first air-fuel ratio and the target air-fuel ratio.

According to still another aspect of the present invention, an air-fuel ratio control system for an internal combustion engine comprises upstream air-fuel ratio detecting means, provided upstream of a catalytic converter in an exhaust passage of the engine, for detecting a first air-fuel ratio of an air-fuel mixture based on exhaust gas upstream of the catalytic converter; downstream air-fuel ratio detecting means, provided downstream of the catalytic converter, for detecting a second air-fuel ratio of the air-fuel mixture based on the exhaust gas having passed through the catalytic converter; saturation determining means for determining saturation of the catalytic converter and a direction of the saturation based on the second air-fuel ratio; adsorption amount deriving means for deriving a saturated adsorption amount of the catalytic converter; and target air-fuel ratio setting means for setting the target air fuel ratio to a stoichiometric air-fuel ratio when no saturation is determined by the saturation determining means, and for continuously setting the target air-fuel ratio to a target value for a correction time when the saturation is determined by the saturation determining means, the target value and the correction time corresponding to the saturated adsorption amount derived by the adsorption amount deriving means.

Accordingly to a further aspect of the present invention, an air-fuel ratio control system for an internal combustion engine comprises upstream air-fuel ratio detecting means, provided upstream of a catalytic converter in an exhaust passage of the engine, for detecting a first air-fuel ratio of an air-fuel mixture based on exhaust gas upstream of the catalytic converter; downstream air-fuel ratio detecting means, provided downstream of the catalytic converter, for detecting a second air-fuel ratio of the air-fuel mixture based on the exhaust gas having passed through the catalytic converter; inversion direction determining means for determining a direction of inversion of the second air-fuel ratio when the second air-fuel ratio has been inverted between rich and lean sides across a stoichiometric air-fuel ratio; comparison value setting means for setting a comparison value on a side opposite to the direction of the inversion when determined by the inversion direction determining means; and fuel injection amount deriving means for deriving a fuel injection amount of a fuel injection valve based on a comparison between the first air-fuel ratio and the comparison value.

BRIEF DESCRIPTION OF THE DRAWINGS

The present invention will be understood more fully from the detailed description given hereinbelow and from the accompanying drawings of the preferred embodiments of the invention, which are given by way of example only, and are not intended to be limitative of the present invention.

In the drawings:

FIG. 53 is a time chart showing a relation between the output voltage of the $O_2$ sensor and the target air-fuel ratio, according to another conventional air-fuel ratio control system for an internal combustion engine.

DESCRIPTION OF THE PREFERRED EMBODIMENT

Now, preferred embodiments of the present invention will be described hereinbelow with reference to the accompanying drawings.

Figure 1:
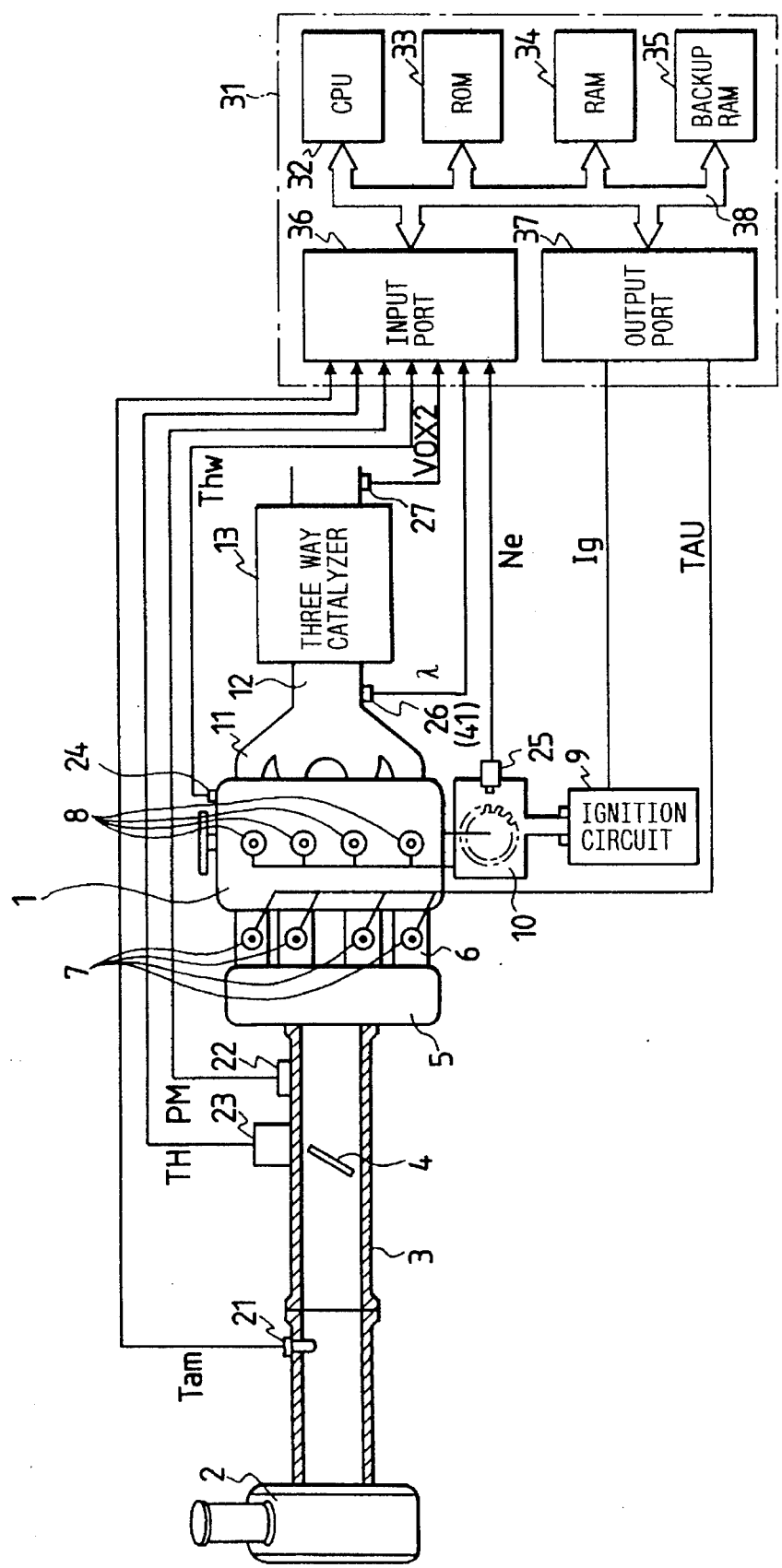
FIG. 1 is a schematic diagram showing an entire structure of an air-fuel ratio control system for an internal combustion engine according to a first preferred embodiment of the present invention.

FIG. 1 is a schematic structural diagram of an internal combustion engine and its peripheral devices, incorporating an air-fuel ratio control system according to a first preferred embodiment of the present invention.

In FIG. 1, the engine 1 is of a spark ignition type of four cylinders and four cycles. Intake air is introduced from the upstream via an air cleaner 2, an intake pipe 3, a throttle valve 4, a surge tank 5 and an intake manifold 6. In the intake manifold 6, the intake air is mixed with a fuel injection valve 7 provided for each engine cylinder so as to form an air-fuel mixture of a given air-fuel ratio, which is then fed to the corresponding engine cylinder. To a spark plug 8 for each engine cylinder, a high voltage supplied from an ignition circuit 9 is distributed by a distributor 10 for igniting the mixture gas in each engine cylinder at a given timing. Exhaust gas after combustion is discharged via an exhaust manifold 11 and an exhaust pipe 12. A three way catalytic converter 13 is arranged in the exhaust pipe 12 for purifying harmful components such as CO, HC and NOx contained in the exhaust gas from the engine cylinders.

An intake air temperature sensor 21 and an intake air pressure sensor 22 are respectively provided in the intake pipe 3. The intake air temperature sensor 21 monitors an intake air temperature Tam upstream of the throttle valve 4, and the intake air pressure sensor 22 monitors an intake air pressure PM downstream of the throttle valve 4. A throttle sensor 23 is further provided for outputting an analog signal indicative of an opening degree of the throttle valve 4. The throttle sensor 23 also outputs an on/off signal from an idle switch (not shown), which is indicative of whether the throttle valve 4 is almost fully closed or not. A coolant temperature sensor 24 is mounted to an engine cylinder block for monitoring a temperature Thw of an engine cooling water. A speed sensor 25 is further provided in the distributor 10 for monitoring an engine speed Ne. The speed sensor 25 produces 24 pulses per 720° CA (crank angle), i.e. per two rotations of an engine crankshaft. Further, an air-fuel ratio sensor (hereinafter referred to as "A/F sensor") 26 is arranged in the exhaust pipe 12 upstream of the three way catalyzer 13. The A/F sensor 26 monitors the exhaust gas discharged from the engine cylinders so as to produce a linear signal corresponding to an air-fuel ratio $\lambda$ (excess air ratio) of the air-fuel mixture which has caused the monitored exhaust gas. An $O_2$ sensor 27 is further provided in the exhaust pipe downstream of the three way catalyzer 13. The $O_2$ sensor 27 monitors the exhaust gas having passed through the three way catalytic converter 13 to produce an output voltage VOX2 depending on whether an air-fuel ratio $\lambda$ of the air-fuel mixture which has caused the monitored exhaust gas is rich or lean with respect to a stoichiometric air-fuel ratio $\lambda=1$.

An electronic control unit (hereinafter referred to as "ECU") 31 for controlling operating conditions of the engine 1 is formed as an arithmetic logic operation circuit mainly comprising a CPU 32, a ROM 33, a RAM 34, a backup RAM 35 and the like which are connected to an input port 36, an output port 37 and the like via a bus 38. The input port 36 is for inputting detection signals from the foregoing sensors, and the output port 37 is for outputting control signals to actuators for controlling operations thereof. Specifically, the ECU 31 receives via the input port 36 the detection signals representative of the intake air temperature Tam, the intake air pressure PM, the throttle opening degree TH, the cooling water temperature Thw, the engine speed Ne, the air-fuel ratio signal, the output voltage VOX2 and the like from the foregoing sensors. The ECU 31 calculates a fuel injection amount TAU and an ignition timing Ig based on these input signals and outputs the respective control signals to the fuel injection valves and the ignition circuit 9 via the output port 37 for controlling the operations thereof. Among these controls, the air-fuel ratio control for deriving the fuel injection amount TAU will be described hereinbelow.

The ECU 31 has been designed by the following method in order to execute the air-fuel ratio control. The designing method, which will be explained hereinbelow, is disclosed in Japanese First (unexamined) Patent Publication No. 64-110853.

Modeling of an Object to be Controlled

In this embodiment, as a model of a system for controlling the air-fuel ratio $\lambda$ of the engine 1, an autoregressive moving average model of degree 1 having a dead time P=3 is used, and is further approximated in consideration of a disturbance d.

First, the mode of the system for controlling the air-fuel ratio $\lambda$ using the autoregressive moving average model can be approximated by the following equation (1):

$$\lambda(k) = a \cdot \lambda(k-1) + b \cdot FAF(k-3) \tag{1}$$

wherein, $\lambda$: air-fuel ratio, FAF: air-fuel ratio correction coefficient, a, b: constants, k: variable indicative of the number of control times from the start of a first sampling Further, when the disturbance d is considered, the model of the control system can be approximated by the following equation (2):

$$\lambda(k) = a \cdot (k-1) + b \cdot FAF(k-3) + d(k-1) \tag{2}$$

For the models thus approximated, it is easy to obtain the constants a and b by discretion based on rotation synchronous (360° CA) saplings using a step response, that is, to obtain a transfer function G of the system which controls the air-fuel ratio $\lambda$.

Display Method of a State Variable Amount X

By rewriting the above equation (2) using a state variable amount $X(k)=[X_1(k), X_2(k), X_3(k), X_4(k)]^T$, the following equation (3) is obtained:

$$\begin{bmatrix} X_1(k+1) \\ X_2(k+1) \\ X_3(k+1) \\ X_4(k+1) \end{bmatrix} = \begin{bmatrix} a & b & 0 & 0 \\ 0 & 0 & 1 & 0 \\ 0 & 0 & 0 & 1 \\ 0 & 0 & 0 & 0 \end{bmatrix} \begin{bmatrix} X_1(k) \\ X_2(k) \\ X_3(k) \\ X_4(k) \end{bmatrix} + \begin{bmatrix} 0 \\ 0 \\ 0 \\ 1 \end{bmatrix} FAF(k) + \begin{bmatrix} 1 \\ 0 \\ 0 \\ 0 \end{bmatrix} d(k) \tag{3}$$

Then, we have $$X_1(k+1) = aX_1(k) + bX_2(k) + d(k) = \lambda(k+1)$$

$$X_2(k+1) = FAF(k-2)$$

$$X_3(k+1) = FAF(k-1)$$

$$X_4(k+1) = FAF(k) \tag{4}$$

Designing of a Regulator

Now, a regulator is designed. By using an optimum feedback gain $K=[K_1, K_2, K_3, K_4]$ and the state variable amount $X^T(k)=[\lambda(k), FAF(k-3), FAF(k-2), FAF(k-1)]$, the following equation (5) is obtained:

$$\begin{aligned} FAF(k) &= K \cdot X^T(k) \\ &= K_1 \cdot \lambda(k) + K_2 \cdot FAF(k-3) + \\ &\quad K_3 \cdot FAF(k-2) + \\ &\quad K_4 \cdot FAF(k-1) \end{aligned} \tag{5}$$

Further, an integration term $Z_1(k)$ for absorbing errors is added to obtain the following equation (6):

$$\begin{aligned} FAF(k) &= K_1 \cdot \lambda(k) + \\ &\quad K_2 \cdot FAF(k-3) + \\ &\quad K_3 \cdot FAF(k-2) + \\ &\quad K_4 \cdot FAF(k-1) + Z_1(k) \end{aligned} \tag{6}$$

In this manner, the air-fuel ratio λ and the correction coefficient FAF can be derived.

The integration term $Z_1(k)$ is a value determined by a deviation between a target air-fuel ratio λTG and an actual air-fuel ratio λ(k) and by an integration constant Ka, and is derived by the following equation (7):

$$Z_1(k)=Z_1(k-1)+Ka\cdot(\lambda TG-\lambda(k)) \quad (7)$$

Figure 2:
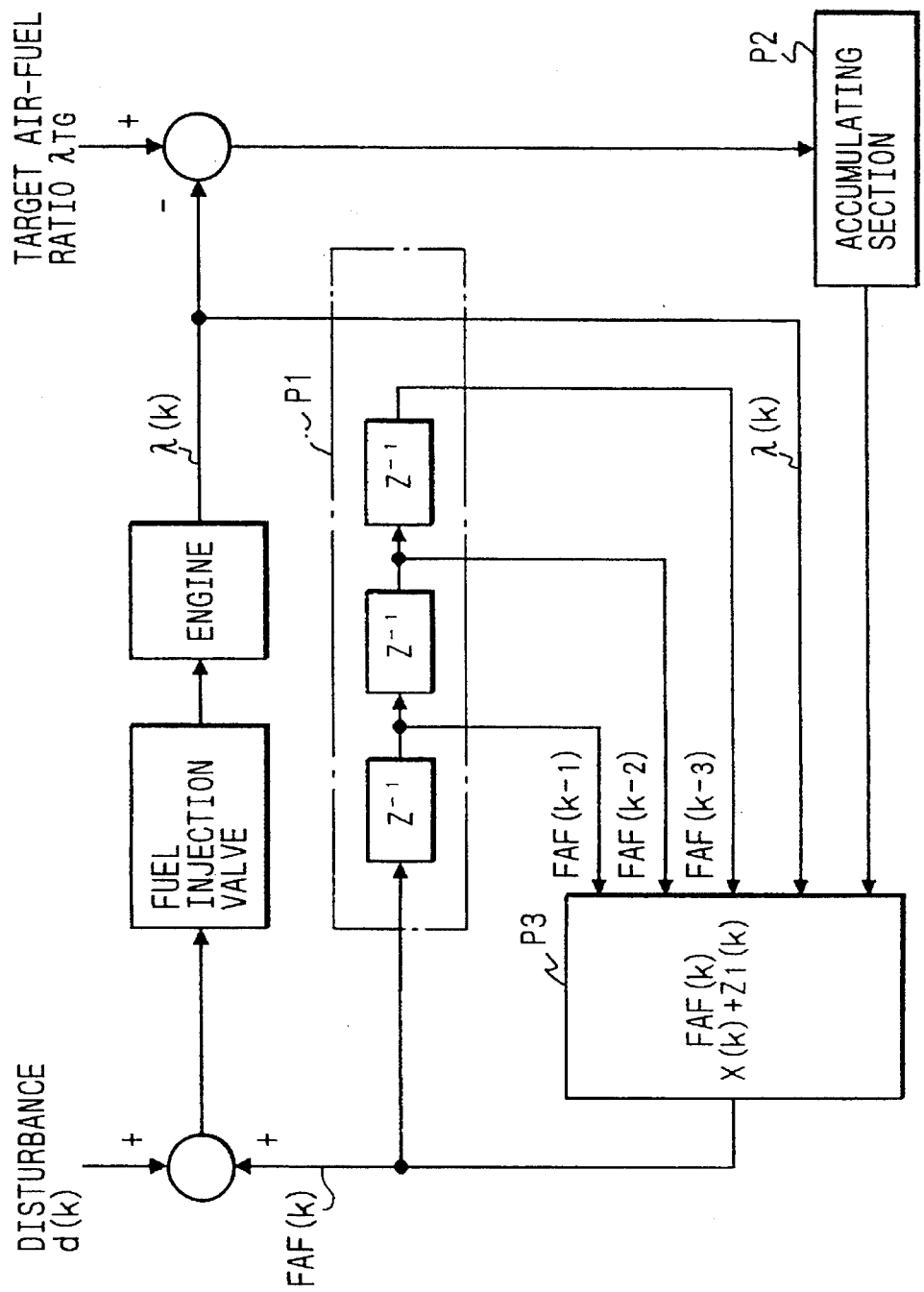
FIG. 2 is a block diagram for explaining the principle of the air-fuel ratio control according to the first preferred embodiment.

FIG. 2 is a block diagram of the system having the model designed in the foregoing manner for controlling the air-fuel ratio λ. As shown in FIG. 2, the $Z^{-1}$ transformation is used to derive the air-fuel ratio correction coefficient FAF(k) from the previous air-fuel ratio correction coefficient FAF(k−1). The previous air-fuel ratio correction coefficient FAF(k−1) has been stored in the RAM 34 and is read out in a next control timing for deriving a new value of the air-fuel ratio correction coefficient FAF(k).

In FIG. 2, a block P1 surrounded by a one-dot chain line represents a section which determines the state variable amount X(k) in a state where the air-fuel ratio λ is feedback controlled to the target air-fuel ratio λTG. A block P2 represents an accumulating section for deriving the integration term $Z_1(k)$. A block P3 represents a section which calculates a current value of the air-fuel ratio correction coefficient FAF(k) based on the state variable amount X(k) determined at the block P1 and the integration term $Z_1(k)$ derived at the block P2.

Determination of the optimum Feedback Gain K and the Integration Constant Ka The optimum feedback gain K and the integration constant Ka can be set, for example, by minimizing an evaluation function J as represented by the following equation (8):

$$J = \sum_{k=0}^{\infty} \{Q(\lambda(k)-\lambda TG)^2 + R(FAF(k)-FAF(k-1))^2\} \quad (8)$$

The evaluation function J intends to minimize the deviation between the actual air-fuel ratio λ(k) and the target air-fuel ratio λTG, while restricting motion of the air-fuel ratio correction coefficient FAF(k). A weighting of the restriction to the air-fuel ratio correction coefficient FAF(k) can be variably set by values of weight parameters Q and R. Accordingly, the optimum feedback gain K and the integration constant Ka are determined by changing the values of the weight parameters Q and R to repeat various simulations until the optimum control characteristics are attained.

Further, the optimum feedback gain K and the integration constant Ka depend on the model constants a and b. Accordingly, in order to ensure the stability (robust performance) of the system against fluctuation (parameter fluctuation) of the system which controls the actual air-fuel ratio λ, the optimum feedback gain K and the integration constant Ka should be set in consideration of fluctuation amounts of the model constants a and b. For this reason, the simulations are performed taking into account the fluctuation of the model constants a and b which can be practically caused, so as to determine the optimum feedback gain K and the integration constant Ka which satisfy the stability.

The ECU 31 has been designed beforehand in the manner as described above. Accordingly, the ECU 31 practically performs the air-fuel ratio control using only the foregoing equations (6) and (7).

Now, details of the air-fuel ratio control will be described hereinbelow.

Figure 3:
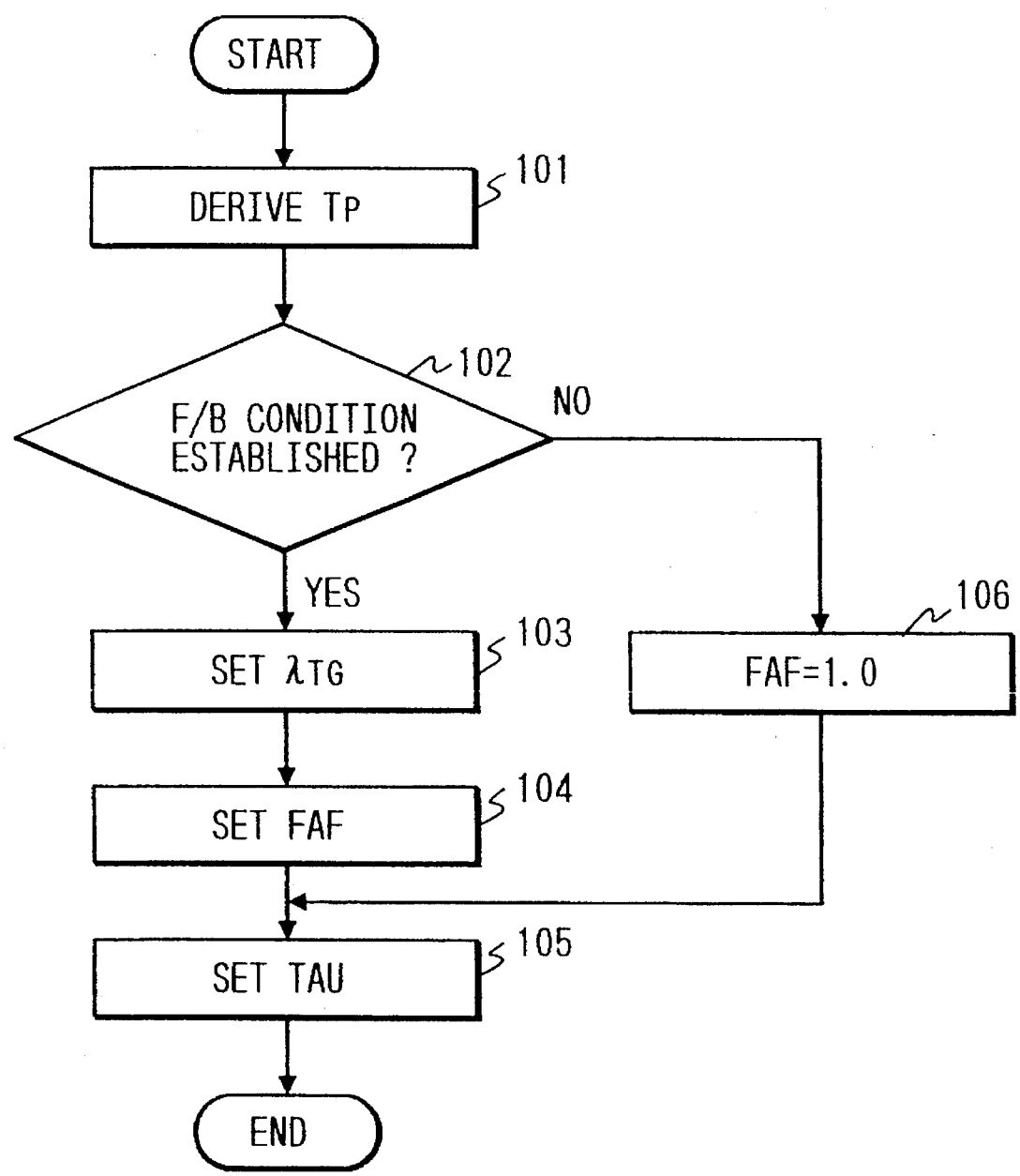
FIG. 3 is a flowchart of a fuel injection amount deriving routine according to the first preferred embodiment.

FIG. 3 is a flowchart showing a main routine to be executed by the CPU 32 for deriving the fuel injection amount TAU.

This routine is executed synchronously with engine rotation, i.e. per 360° CA (crank angle). At a first step 101, a basic fuel injection amount Tp is derived based on, such as, the intake air pressure PM and the engine speed Ne. Subsequently, a step 102 determines whether or not a feedback (F/B) control condition for the air-fuel ratio λ is established. As is well known in the art, the feedback control condition is established when the cooling water temperature Thw is higher than a preset value and when the engine is not at a high speed and under a high load. If the step 102 determines that the feedback control condition is established, the target air-fuel ratio λTG is set at a step 103, which will be described later in detail, and the air-fuel ratio correction coefficient FAF is set at a step 104 for converging the air-fuel ratio λ to the target air-fuel ratio λTG. Specifically, at the step 104, the air-fuel ratio correction coefficient FAF is derived based on the target air-fuel ratio λTG and the air-fuel ratio λ(k) detected by the A/F sensor 26, using the foregoing equations (6) and (7). Subsequently, the routine proceeds to a step 105. On the other hand, if the step 102 determines that the feedback control condition is not established, the air-fuel ratio correction coefficient FAF is set to a value "1", and the routine proceeds to the step 105.

At the step 105, the fuel injection amount TAU is set based on the basic fuel injection amount Tp, the air-fuel ratio correction coefficient FAF and another known correction coefficient FALL, using the following equation:

$$TAU=Tp \times FAF \times FALL$$

A control signal is then produced based on the thus set fuel injection amount TAU and supplied to the fuel injection valve 7 for controlling a valve opening time, that is, an actual fuel injection amount to be supplied via the fuel injection valve 7. As a result, the air-fuel ratio λ of the mixture gas is adjusted to the target air-fuel ratio λTG.

Now, a subroutine, corresponding to the step 103 in FIG. 3, for deriving the target air-fuel ratio λTG will be described in detail.

In this preferred embodiment, the target air-fuel ratio λTG is set in different manners depending on operating conditions of the engine 1. Specifically, the engine operating conditions are classified into a steady driving condition where, for example, a vehicle is running at a constant speed with the engine speed Ne, the intake air pressure PM and the like being held substantially constant, and a transitional driving condition where the vehicle is under acceleration with the engine speed Ne, the intake air pressure PM and the like being fluctuating and where the air-fuel ratio λ is deviated from the stoichiometric air-fuel ratio λ=1 to a certain degree. Accordingly, a routine for determining the steady driving condition or the transitional driving condition will be described hereinbelow.

Figure 4:
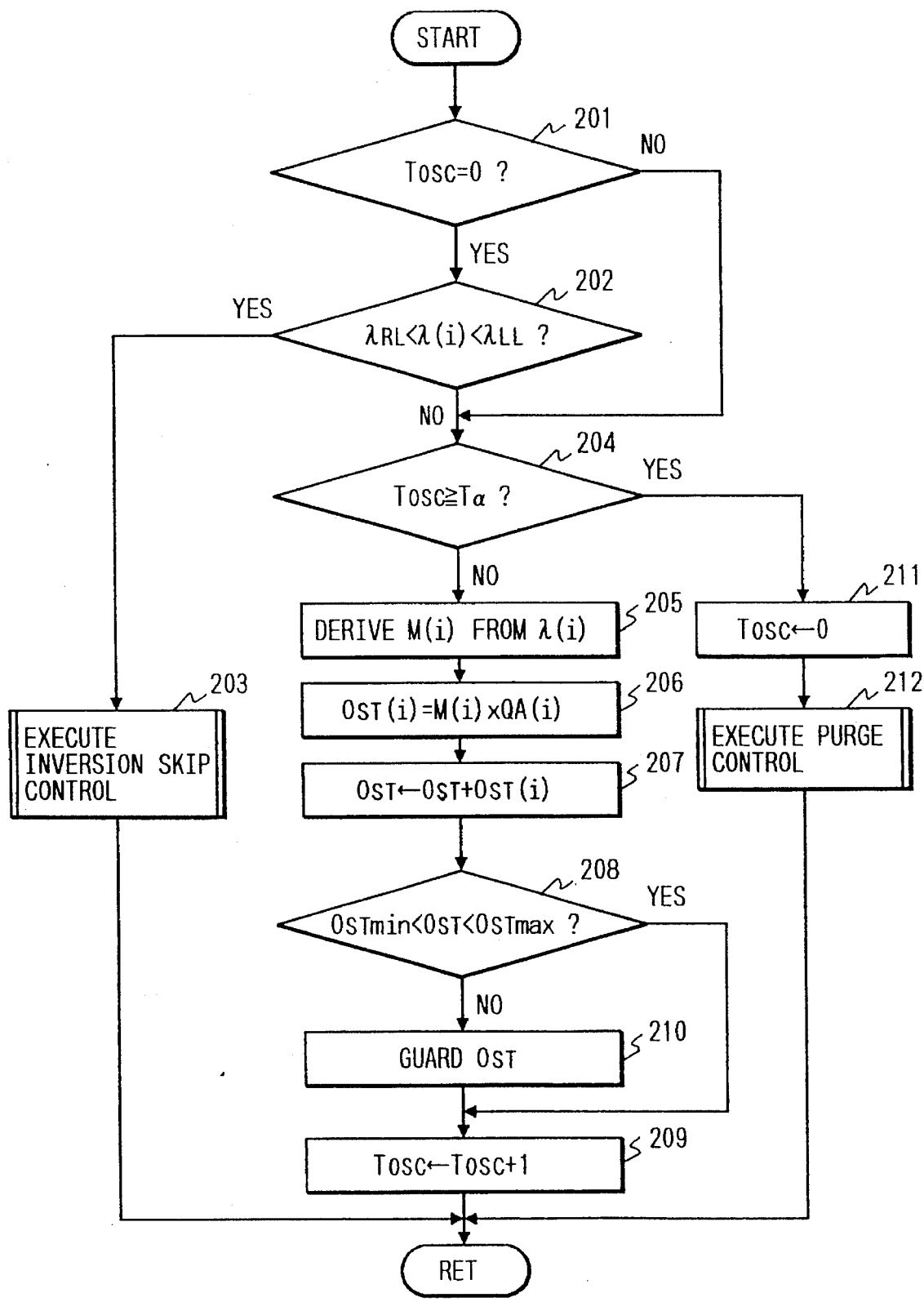
FIG. 4 is a flowchart of a routine for determining whether the engine is under a steady driving condition or a transitional driving condition, according to the first preferred embodiment.

FIG. 4 is a flowchart of the routine for determining whether the engine is under the steady driving condition or the transitional driving condition.

Figure 6:
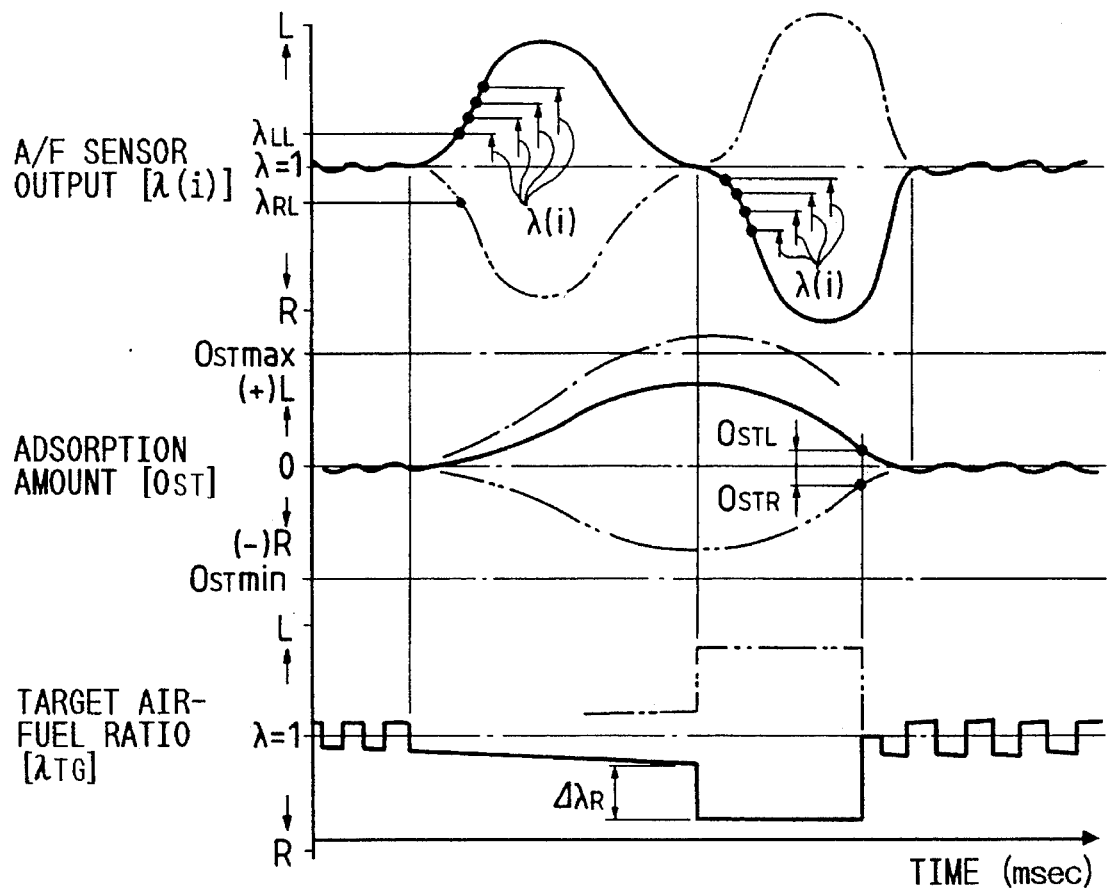
FIG. 6 is a time chart showing a relation among an output of an air-fuel ratio sensor disposed upstream of a three way catalytic converter, an adsorption amount of the three way catalytic converter and a target air-fuel ratio.

At a first step 201, the CPU 32 determines whether or not an adsorption amount deriving counter TOSC is reset, i.e. whether its value is 0 (zero). If answer at the step 201 is YES, a step 202 checks whether the air-fuel ratio λ monitored by the A/F sensor 26 is converged in a range between a preset rich limit value λRL and a preset lean limit value λLL, wherein λRL>λ=1>λLL. At the step 202, λ(i) is used since the air-fuel ratio λ is sampled successively as shown in FIG. 6. If answer at the step 202 is YES, i.e. the monitored air-fuel ratio λ(i) is within the given range so that the engine 1 can be determined under the steady driving condition, a step 203 executes an inversion skip control. As will be described later in detail, this inversion skip control is performed for holding the actual air-fuel ratio λ near the stoichiometric air-fuel ratio λ=1.

On the other hand, if answer at the step 202 is NO, i.e. the air-fuel ratio λ(i) is not within the given range defined by the preset rich and lean limit values λRL and λLL so that the engine 1 can be determined under the transitional driving condition, the routine proceeds to a step 204. The step 204 judges whether the value of the counter TOSC has reached a preset sapling time Tα. Since the counter TOSC is reset as determined at the step 201, the step 204 produces a negative answer so that the routine proceeds to a step 205.

Figure 5:
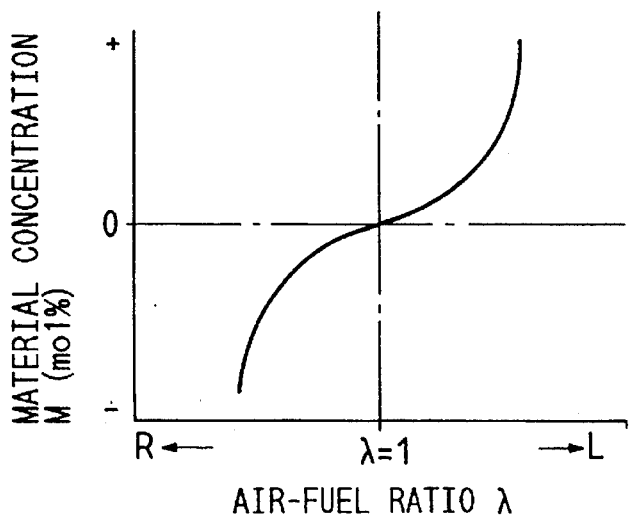
FIG. 5 is a map prestored in a ROM for deriving a material concentration based on an air-fuel ratio.

At the step 205, a current material concentration M(i) is derived based on the air-fuel ratio λ(i) monitored by the A/F sensor 26, using a map in FIG. 5 prestored in the ROM 33. As is well known, as the harmful components in the exhaust gas, NOx and $O_2$ are increased when the air-fuel ratio λ deviates to the lean side with respect to the stoichiometric air-fuel ratio λ=0, while CO and HC are increased when the air-fuel ratio λ deviates to the rich side. On the other hand, since the map in FIG. 5 defines the material concentration M in terms of $O_2$ in this preferred embodiment, the material concentration M is set as a positive value on the lean side as representing an excess of $O_2$, while, is set as a negative value on the rich side as representing a shortage of $O_2$ required by CO and HC.

After deriving the material concentration M(i) at the step 205, the routine proceeds to a step 206 where an adsorption amount OST(i) of $O_2$ adsorbed to or stored in the three way catalytic converter 13 is derived from the derived material concentration M(i) and an intake air quantity QA(i) using the following equation:

$$OST(i)=M(i) \times QA(i)$$

In this equation, in consideration of an air-flow delay in the engine 1, the intake air quantity QA(i) represents a value corresponding to the air flow which provides the air-fuel ratio λ(i) from which the material concentration M(i) is derived at the step 205. Specifically, as is well known in the art, the intake air quantity QA(i) is derived based on the engine speed Ne and the intake air pressure PM. However, since the speed sensor 25 for monitoring the engine speed Ne and the intake air pressure sensor 22 for monitoring the intake air pressure PM are respectively arranged upstream of the A/F sensor 26 for monitoring the air-fuel ratio λ(i), a value detected 1.5 times before (that is, a mean value of the current and last values) is applied for the engine speed Ne, and a value detected 3 times before is applied for the intake air pressure PM. Accordingly, the intake air quantity QA(i) is derived from the following equation:

$$QA(i) \propto Ne(I-1.5) \times PM(I-3)$$

After deriving the adsorption amount OST(i) at the step 206, the routine proceeds to a step 207 where a total adsorption amount OST is derived by OST←OST+OST(i). Subsequently, a step 208 determines whether the total adsorption amount OST derived at the step 207 is within a range defined by a preset minimum adsorption amount OSTmin and a preset maximum adsorption amount OSTmax. Here, the minimum adsorption amount OSTmin represents a maximum adsorption amount of the three way catalytic converter 13 for CO and HC when the air-fuel ratio λ is on the rich side with respect to the stoichiometric air-fuel ratio. As described before, since the adsorption amount is defined in temps of $O_2$, the maximum adsorption amount for CO and HC takes a negative value so as to be defined as "the minimum adsorption amount OSTmin". On the other hand, the maximum adsorption amount OSTmax represents a maximum adsorption amount of the three way catalytic converter 13 for $O_2$ when the air-fuel ratio λ is on the lean side. As is known, the absolute values of these minimum and maximum adsorption amounts OSTmin and OSTmax, respectively, are decreased as the deterioration of the three way catalytic converter 13 advances. The minimum and maximum adsorption amounts OSTmin and OSTmax are updated by a later described adsorption amount learning control so that the newest data is used at the step 208.

When the step 208 determines that the current total adsorption amount OST is between the minimum and maximum adsorption amounts OSTmin and OSTmax, the routine proceeds to a step 209 where the counter TOSC is counted up by a value "1", and then returns to the step 201. Since the value of the counter TOSC is not 0 (zero) this time, the routine proceeds to the step 204 bypassing the step 202. The step 204 checks whether the value of the counter TOSC has reached the sampling time Tα. If answer at the step 204 is again negative, the steps 205 to 207 derive a current value of the adsorption amount OST(i) from a current value of the monitored air-fuel ratio λ(i) and further derive a current value of the total adsorption amount OST by adding the current value of the adsorption amount OST(i) to the last value of the total adsorption amount OST. Accordingly, this process continues until the sapling time Tα has elapsed.

Although the deviated air-fuel ratio λ is gradually restored to the stoichiometric air-fuel ratio λ=1, the sampling time Tα is preset to be longer than a time period expected to be required for the normal restoration of the air-fuel ratio λ to the stoichiometric air-fuel ratio. Accordingly, the adsorption amount OST(i) continues to be sampled until the air-fuel ratio λ is restored to the stoichiometric air-fuel ratio. As a result, the total adsorption amount OST accumulated by the adsorption amounts OST(i) represents a total amount of the harmful components (that is, NOx at the deviation to the lean side and CO and HC at the deviation to the rich side) which have been adsorbed to or stored in the three way catalytic converter 13 due to the deviation of the air-fuel ratio λ toward the lean or rich side with respect to the stoichiometric air-fuel ratio.

On the other hand, when the total adsorption amount OST exceeds the range between the minimum and maximum adsorption amounts OSTmin and OSTmax as indicated by a one-dot chain line in FIG. 6, the step 208 produces a negative answer so that the total adsorption amount OST is guarded by the minimum and maximum adsorption amounts OSTmin and OSTmax at a subsequent step 210. Specifically, when the total adsorption amount OST exceeds the range between the minimum and maximum adsorption amounts OSTmin and OSTmax, it is considered that the three way catalytic converter 13 has been saturated on the rich or lean side so as not to adsorb the harmful components, such as, CO, HC and NOx any more. This means that those harmful components are emitted from the three way catalytic converter 13 so that the absolute values of the minimum and maximum adsorption amounts OSTmin and OSTmax do not increase any more. In this regard, the minimum adsorption amount OSTmin represents a saturated adsorption amount of the three way catalytic converter 13 on the rich side, and the maximum adsorption amount OSTmax represents a saturated adsorption amount of the three way catalytic converter 13 on the lean side. Accordingly, at the step 210, the total adsorption amount OST is set to the minimum adsorption amount OSTmin when it becomes equal to or smaller than the minimum adsorption amount OSTmin, on the other hand, the total adsorption amount OST is set to the maximum adsorption amount OSTmax when it becomes equal to or greater than the maximum adsorption amount OSTmax.

Referring back to the step 204, when the value of the counter TOSC has reached the sampling time Tα, the routine proceeds to a step 211 where the counter TOSC is reset to 0 (zero), and further proceeds to a step 212 where a purge control is performed. As will be described later in detail, the purge control is performed for eliminating the harmful components adsorbed by the three way catalytic converter 13.

Now, the inversion skip control executed at the steady driving condition will be described hereinbelow.

Figure 7:
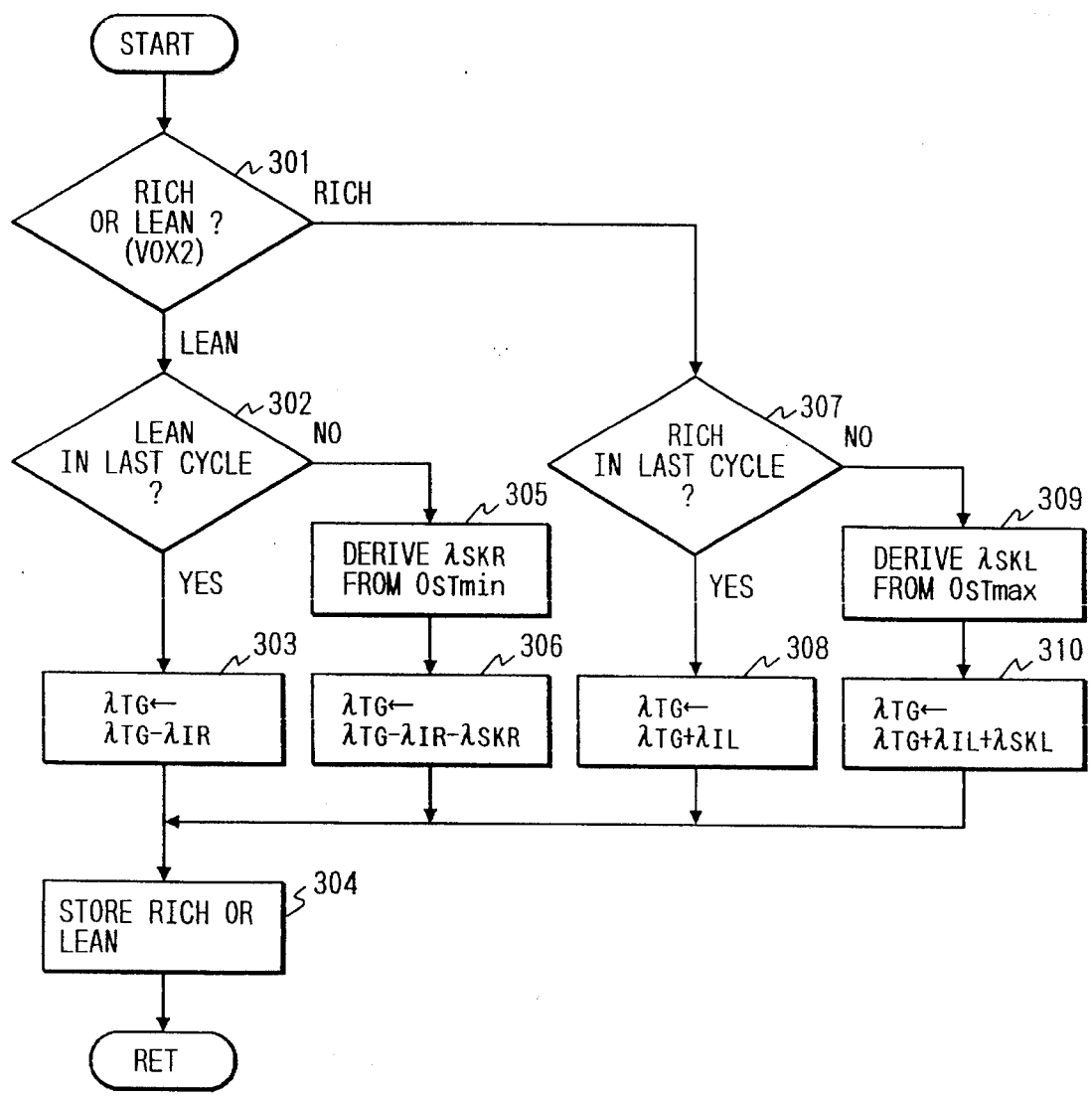
FIG. 7 is a flowchart of an inversion skip control routine according to the first preferred embodiment.

FIG. 7 is a flowchart showing a routine of the inversion skip control, which is a subroutine corresponding to the step 203 in FIG. 4.

Figure 8:
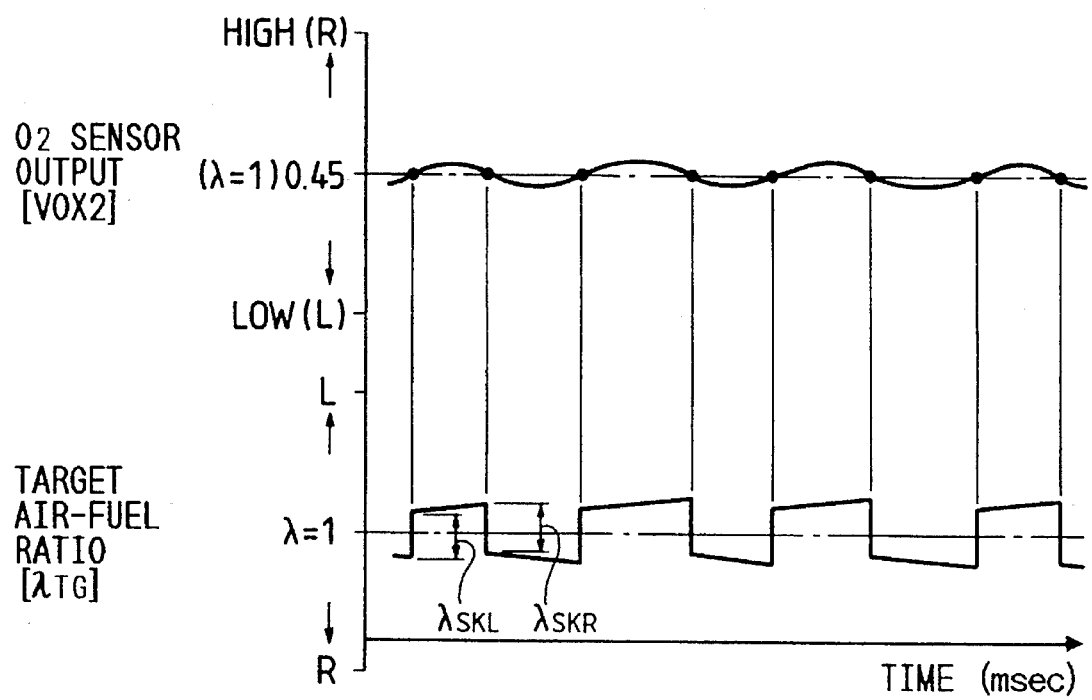
FIG. 8 is a time chart showing a relation between an output of an $O_2$ sensor downstream of the three way catalytic converter and the target air-fuel ratio during the inversion skip control of FIG. 7.

At a first step 301, the CPU 32 determines whether the output voltage VOX2 of the $O_2$ sensor 27 is higher (rich) or lower (lean) than 0.45 V which represents a value corresponding to the stoichiometric air-fuel ratio $\lambda=1$. If "lean" is determined, then the routine proceeds to a step 302 where it is checked whether or not answer at the step 301 was lean in the last cycle of this routine. The step 302 determines this based on rich/lean data stored at a step 304 which stores such rich/lean data per execution of this routine. If answer at the step 302 is positive, i.e. the air-fuel ratio $\lambda$ is held on the lean side, then a step 303 corrects the target air-fuel ratio $\lambda$TG to be a richer value ($\lambda$TG←$\lambda$TG−$\lambda$IR, wherein $\lambda$IR represents a rich integral amount), that is, the target air-fuel ratio $\lambda$TG is corrected in a direction opposite to that of the deviation of the air-fuel ratio $\lambda$ with respect to the stoichiometric air-fuel ratio. Subsequently, at the step 304, "lean" is stored in the RAM 34 as a polarity of the air-fuel ratio $\lambda$. Since the rich integral amount $\lambda$IR is set to be a very small value, the target air-fuel ratio $\lambda$TG gradually decreases on the rich side as shown in FIG. 8.

Figure 9:
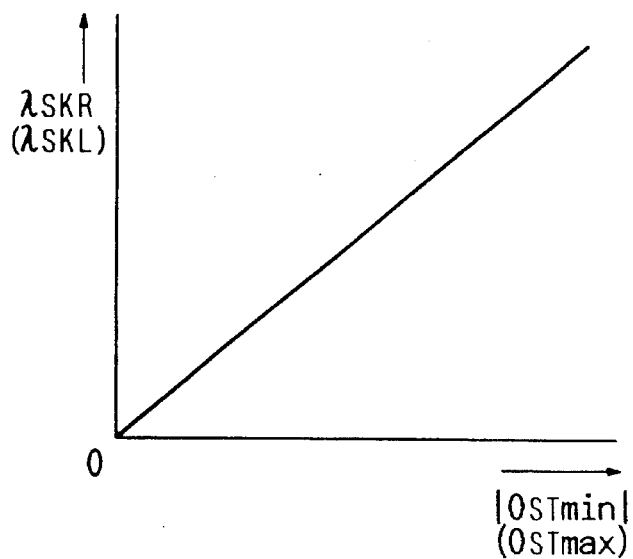
FIG. 9 is a map prestored in the ROM for deriving a skip amount from a minimum or maximum adsorption amount of the three way catalytic converter.

On the other hand, if answer at the step 302 is negative, i.e. "rich" is stored at the step 304 in the last cycle of this routine so that the inversion of the air-fuel ratio $\lambda$ from rich to lean across the stoichiometric air-fuel ratio $\lambda=1$ has been occurred, the routine proceeds to a step 305 where a rich skip amount $\lambda$SKR is derived based on a current value of the minimum adsorption amount OSTmin, using a map in FIG. 9 prestored in the ROM 33. As described before, the minimum adsorption amount OSTmin is updated by the later described adsorption amount learning control. As seen in FIG. 9, a magnitude of the rich skip amount $\lambda$SKR is directly proportional to the absolute value of the minimum adsorption amount OSTmin. Accordingly, as the absolute value of the minimum adsorption amount OSTmin decreases due to the deterioration of the three way catalytic converter 13, the rich skip amount $\lambda$SKR is set to be smaller. Subsequently, a step 306 corrects the target air-fuel ratio to be a richer value ($\lambda$TG←$\lambda$TG−$\lambda$IR−$\lambda$SKR), that is, the target air-fuel ratio $\lambda$TG is corrected in a direction opposite to that of the deviation of the air-fuel ratio $\lambda$ with respect to the stoichiometric air-fuel ratio. Subsequently, at the step 304, "lean" is stored in the RAM 34 as a polarity of the air-fuel ratio $\lambda$. Since the rich skip amount $\lambda$SKR is a sufficiently large value in comparison with the rich integral amount $\lambda$IR, the target air-fuel ratio $\lambda$TG rapidly and largely drops in a skipped manner from lean to rich across the stoichiometric air-fuel ratio $\lambda=1$, as shown in FIG. 8.

Referring back to the step 301, if "rich" is determined, a step 307 determines whether the air-fuel ratio $\lambda$ was rich in the last cycle of this routine, as executed at the step 302. If answer at the step 307 is positive, then the routine proceeds to a step 308 where the target air-fuel ratio $\lambda$TG is gradually increased by a lean integral amount $\lambda$IL ($\lambda$TG←$\lambda$TG+$\lambda$IL) on the lean side. On the other hand, if answer at the step 307 is negative, i.e. the air-fuel ratio $\lambda$ was lean in the last cycle of this routine so that the inversion of the air-fuel ratio $\lambda$ from lean to rich has been caused, the routine proceeds to a step 309 where a lean skip amount $\lambda$SKL is derived from the maximum adsorption amount OSTmax using the map of FIG. 9. Subsequently, a step 310 rapidly and largely increases the target air-fuel ratio $\lambda$TG in a skipped manner from rich to lean, i.e. across the stoichiometric air-fuel ratio $\lambda=1$, by the lean skip amount $\lambda$SKL ($\lambda$TG←$\lambda$TG+$\lambda$IL+$\lambda$SKL). As in case of the foregoing rich skip amount $\lambda$SKR, as the maximum adsorption amount OSTmax is decreased due to the deterioration of the three way catalytic converter 13, the lean skip amount $\lambda$SKL is set to be smaller. From the step 308 or the step 310, the routine proceeds to the step 304 where "rich" is stored in the RAM 34 as a polarity of the air-fuel ratio $\lambda$.

The target air-fuel ratio thus derived is used at the step 104 in FIG. 3 to derive the air-fuel ratio correction coefficient FAF. Thereafter, the step 105 derives the fuel injection amount TAU based on the air-fuel ratio correction coefficient FAF so that the actual fuel injection amount injected from the fuel injection valve 7 is controlled by the derived fuel injection amount TAU. As described before, since the fuel injection amount deriving routine in FIG. 3 is executed per 360° CA, the air-fuel ratio correction coefficient FAF and the fuel injection amount TAU are updated per 360° CA. Accordingly, the target air-fuel ratio $\lambda$TG set in the inversion skip control routine is immediately reflected on the air-fuel ratio correction coefficient FAF and the fuel injection amount TAU. As a result, the fuel injection amount TAU is controlled highly responsive to the deviation of the air-fuel ratio $\lambda$ detected by the $O_2$ sensor 27.

Further, as described above, when the inversion of the air-fuel ratio $\lambda$ between rich and lean across the stoichiometric air-fuel ratio $\lambda=1$ is caused, the target air-fuel ratio $\lambda$TG is increased or decreased in a skipped manner by means of the lean skip amount $\lambda$SKL or the rich skip amount $\lambda$SKR which are sufficiently larger than the lean integral amount $\lambda$IL or the rich integral amount $\lambda$IR. In general, the internal combustion engine, including the three way catalyzer 13, is the system which basically represents a large delay. Accordingly, when the air-fuel ratio $\lambda$ of the exhaust gas downstream of the three way catalytic converter 13 is inverted between rich and lean, the air-fuel ratio $\lambda$ upstream of the three way catalytic converter 13 has already been largely deviated from the stoichiometric air-fuel ratio $\lambda=1$ toward the rich or lean side. Therefore, by increasing or decreasing the target air-fuel ratio $\lambda$TG in the skipped manner as described above, the large deviation of the air-fuel ratio $\lambda$, which is otherwise caused downstream of the three-way catalytic converter 13 thereafter, is effectively suppressed.

Accordingly, as shown in FIG. 8, the output voltage VOX2 of the $O_2$ sensor 27 fluctuates at short cycles and with small amplitudes with respect to 0.45 V ($\lambda=1$) so that the air-fuel ratio $\lambda$ of the exhaust gas having passed through the three way catalytic converter 13 is converged to the stoichiometric air-fuel ratio $\lambda=1$. This means that the $O_2$ sensor 27 always detects the air-fuel ratio $\lambda$ near the stoichiometric air-fuel ratio $\lambda=1$ where the $O_2$ sensor 27 is highly sensitive or responsive. Still, since the three way catalytic converter 13 is always held at a state where substantially no harmful components are adsorbed or stored therein, a time for purifying the harmful components in the exhaust gas is largely diminished. As a result, the $O_2$ sensor 27 can reliably detect even the slight deviation of the air-fuel ratio $\lambda$, which, in turn, serves converging the air-fuel ratio $\lambda$ to the stoichiometric air-fuel ratio $\lambda=1$.

In addition, as described before, when no inversion of the air-fuel ratio $\lambda$ is generated, the target air-fuel ratio $\lambda$TG is gradually increased or decreased by the lean integral amount $\lambda$IL or the rich integral amount $\lambda$IR in a direction opposite to that of the deviation of the air-fuel ratio $\lambda$. Accordingly, the air-fuel ratio $\lambda$ downstream of the three way catalytic converter 13 is converged to the stoichiometric air-fuel ratio $\lambda=1$ more delicately and reliably.

On the other hand, when the minimum and maximum adsorption amounts OSTmin and OSTmax are increased and decreased, respectively, due to the deterioration of the three way catalytic converter 13, a smaller value is derived for the rich skip amount $\lambda$SKR or the lean skip amount $\lambda$SKL based on the map of FIG. 9. As a result, the excess correction beyond the adsorption or storage limit of the three way catalytic converter 13 is effectively prevented.

Now, the purge control to be executed when the air-fuel ratio $\lambda$ is deviated to a certain extent at the transitional driving condition, will be described hereinbelow.

Figure 10:
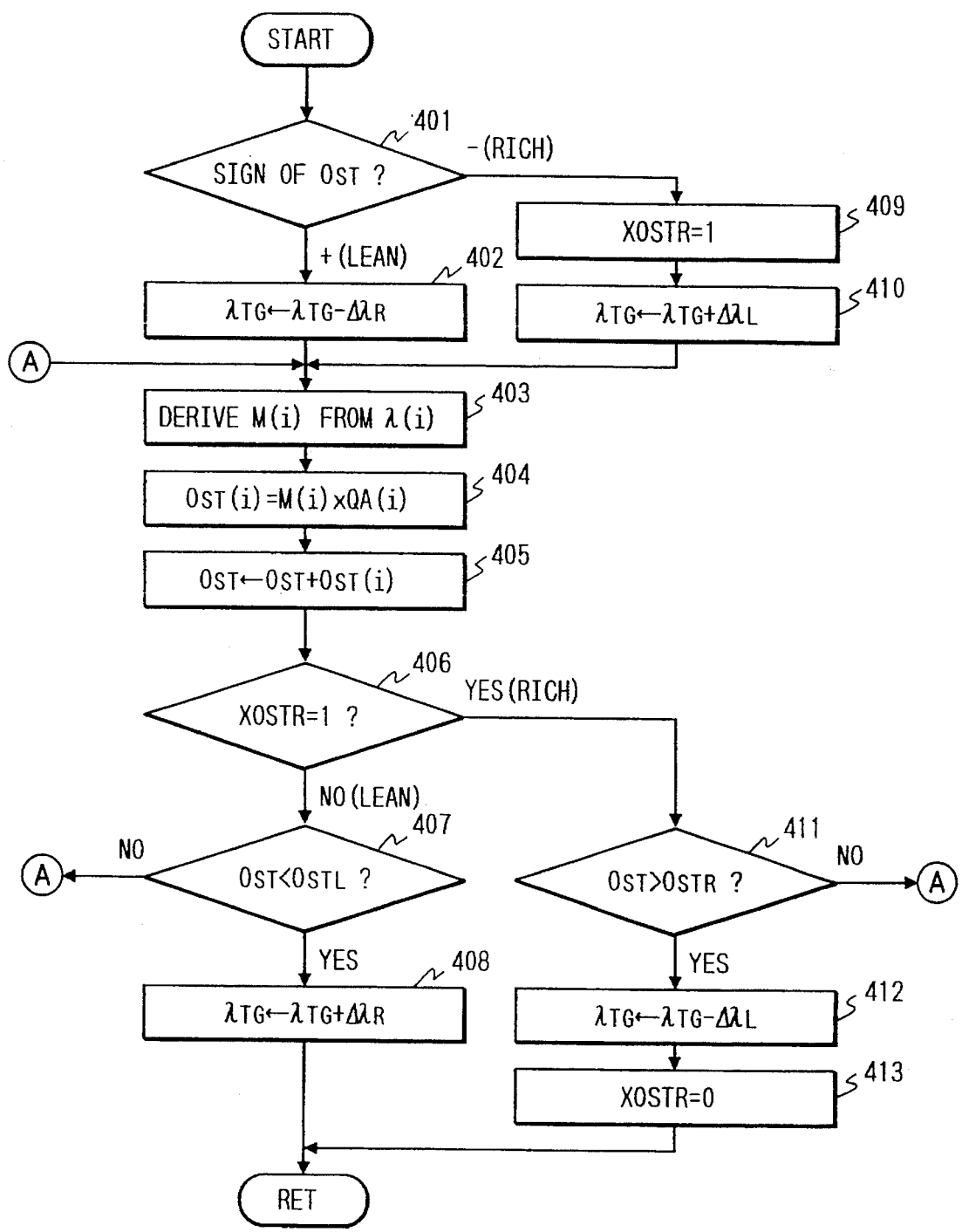
FIG. 10 is a flowchart of a purge control routine according to the first preferred embodiment.

FIG. 10 shows a flowchart of a routine of the purge control, which is a subroutine corresponding to the step 212 in FIG. 4.

At a first step 401, the CPU 32 determines whether a sign of the total adsorption amount OST derived at the step 207 in FIG. 4 is positive or negative. Specifically, since the adsorption amount of the harmful components in the three way catalytic converter 13 is increased due to the deviation of the air-fuel ratio $\lambda$ when the purge control is executed, the step 401 determines whether the adsorbed harmful components are caused by the deviation of the air-fuel ratio $\lambda$ on the lean side or the rich side.

Assuming that the air-fuel ratio $\lambda$ is deviated to the lean side as represented by a solid line in FIG. 6, the step 401 determines that the sign is positive (lean) so that a step 462 decreases the target air-fuel ratio $\lambda$TG by a rich purge correction amount $\Delta\lambda$R ($\lambda$TG←$\lambda$TG−$\Delta\lambda$R). The rich purge correction amount $\Delta\lambda$R is set to a value larger than the rich and lean skip amount $\lambda$SKR, $\lambda$SKL to be used in the inversion skip control. As a result, the target air-fuel ratio $\lambda$TG set in the inversion skip control routine is largely corrected toward the rich side by the rich purge correction amount $\Delta\lambda$R so that the actual air-fuel ratio $\lambda$(i) monitored by the A/F sensor 26 will also be corrected toward the rich side. Subsequently, a step 403 derives a current value M(i) of the material concentration M from the air-fuel ratio $\lambda$(i) detected by the A/F sensor 26 using the map of FIG. 5, as executed at the step 205 in FIG. 4. Then, a step 404 derives an adsorption amount OST(i) from the material concentration M(i) and the intake air quantity QA(i) based on the following equation:

$$OST(i)=M(i) \times QA(i)$$

Further, at a step 405, the total adsorption amount OST derived at the step 207 in FIG. 4 is updated by the adsorption amount OST(i) derived at the step 404 (OST←OST+OST(i)). As shown in FIG. 5, since the air-fuel ratio $\lambda$(i) is corrected toward the rich side across the stoichiometric air-fuel ratio, a polarity of the material concentration M(i) becomes negative so that a polarity of the adsorption amount OST(i) also becomes negative. As a result, the total adsorption amount OST is decreased by the adsorption amount OST(i) at the step 405. This means that, the correction of the air-fuel ratio $\lambda$ to the rich side across the stoichiometric air-fuel ratio decreases the adsorption amount of $O_2$ and NOx in the three way catalytic converter 13. This change of the adsorption amount in the three way catalytic converter 13 is estimated based on the variation in the air-fuel ratio $\lambda$ monitored by the A/F sensor 26, in this purge control routine. Hereinbelow, "purge" is defined as a phenomenon wherein the harmful components in the three way catalytic converter 13 are neutralized by the air-fuel ratio control so that the adsorption amount is reduced.

Thereafter, the routine proceeds to a step 406 which determines whether or not an adsorption amount rich flag XOSTR is set. When the flag XOSTR is set, this means that the air-fuel ratio $\lambda$ before the target air-fuel ratio $\lambda$TG is corrected at the step 402 is rich. Since the flag XOSTR is not set this time, the routine proceeds to a step 407 which determines whether the total adsorption amount OST derived at the step 405 is decreased less than a lean purge completion value OSTL. If answer at the step 407 is negative, the execution of the steps 403 to 407 is repeated so as to gradually decrease the total adsorption amount OST. When the total adsorption amount OST becomes less than the lean purge completion value OSTL, the routine proceeds to a step 408 where the target air-fuel ratio $\lambda$TG is returned to the value before corrected at the step 402 ($\lambda$TG←$\lambda$TG+$\Delta\lambda$R), and is terminated. As a result, the adsorption amount of $O_2$ (NOx) in the three way catalytic converter 13 is decreased to almost 0 (zero) when this purge control routine is finished.

In consideration of the air-flow delay in the engine 1, a timing of finishing the purge control is advanced by three engine rotations relative to a timing when $O_2$ (NOx) adsorbed in the three way catalytic converter 13 is completely purged. Specifically, the lean purge completion value OSTL is derived by the following equation:

$$OSTL=-M(i) \times QA(i) \times 3$$

wherein, the material concentration M(i) and the intake air quantity QA are the newest data, respectively, during the purge control routine.

Further, since the material concentration M(i) is a negative value in the purge control as described above and since the lean purge completion value OSTL is a positive value as understood from FIG. 5, a sign of the material concentration M(i) is inverted in the above equation.

On the other hand, when the air-fuel ratio $\lambda$ is deviated to the rich side with respect to the stoichiometric air-fuel ratio $\lambda=1$ as indicated by a two-dot chain line in FIG. 6, the purge control is executed in the following manner:

The step 401 determines that the sign of the total adsorption amount OST is negative (rich). Subsequently, the flag XOSTR is set at a step 409. This means that the air-fuel ratio $\lambda$ before the target air-fuel ratio $\lambda$TG is corrected at a subsequent step 410 is rich. Thereafter, the step 410 largely corrects the target air-fuel ratio $\lambda$TG toward the lean side across the stoichiometric air-fuel ratio by a lean purge correction amount $\Delta\lambda$L ($\lambda$TG←$\lambda$TG+$\Delta\lambda$L). Subsequently, the step 403 derives a current value M(i) of the material concentration M, the step 404 derives the adsorption amount OST(i), and the step 405 derives the total adsorption amount OST, as described above. In this purge control routine, since the air-fuel ratio $\lambda$(i) will be corrected to the lean side across the stoichiometric air-fuel ratio, signs of the material concentration M(i) and the adsorption amount OST(i) respectively become positive. Accordingly, the total adsorption amount OST is increased by the adsorption amount OST(i) derived at the step 404. Thereafter, since the flag XOSTR is set at the step 409, the step 406 produces a positive answer this time so that the routine proceeds to a step 411. The step 411 determines whether the total adsorption amount OST is greater than a rich purge completion value OSTR. The rich purge completion value OSTR is derived in the same manner as that for deriving the lean purge completion value OSTL. Specifically, since the material concentration M(i) is a positive value in this purge control and since the rich purge completion value OSTR is a negative value as understood from FIG. 5, a sign of the material concentration M(i) should also be inverted for deriving the rich purge completion value OSTR.

If answer at the step 411 is negative, the execution of the steps 403 to 406 and 411 is repeated to increase the total adsorption amount OST until the step 411 produces a positive answer. when the step 411 produces the positive answer, i.e. the total adsorption amount OST becomes greater than the rich purge completion value OSTR, the routine proceeds to a step 412 where the target air-fuel ratio λTG is returned to the value (λTG←λTG− ΔλL) before the target air-fuel ratio λTG is corrected at the step 410. The routine further proceeds to a step 413 where the flag XOSTR is cleared, and is terminated.

Now, the adsorption amount learning control for updating the minimum adsorption amount OSTmin and the maximum adsorption amount OSTmax of the three way catalytic converter 13 which are used at the step 208 in FIG. 4 and the steps 305 and 309 in FIG. 7, will be described hereinbelow.

Figure 11:
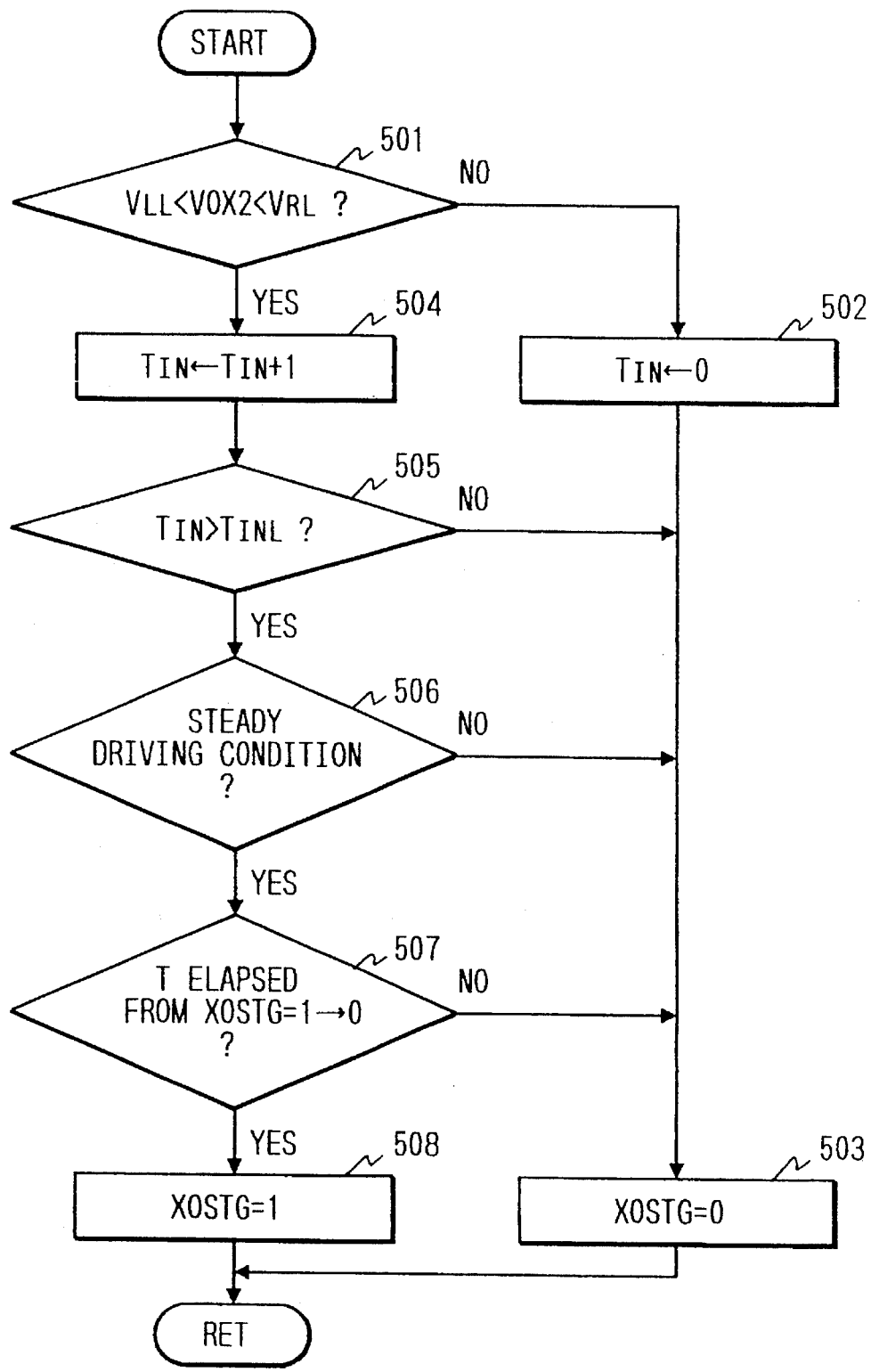
FIG. 11 is a flowchart of a learning start determining routine according to the first preferred embodiment.
Figure 12:
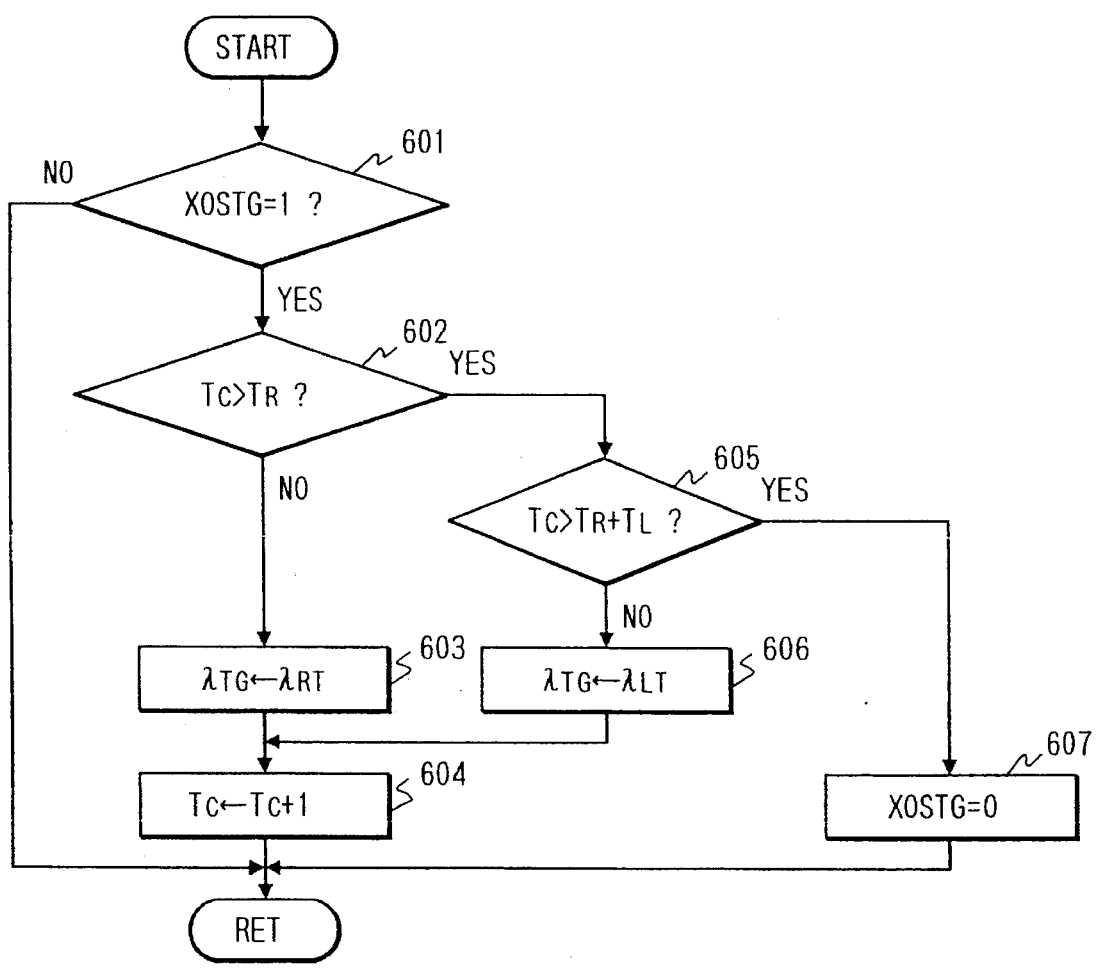
FIG. 12 is a flowchart of an air-fuel ratio deviation control routine according to the first preferred embodiment.
Figure 13:
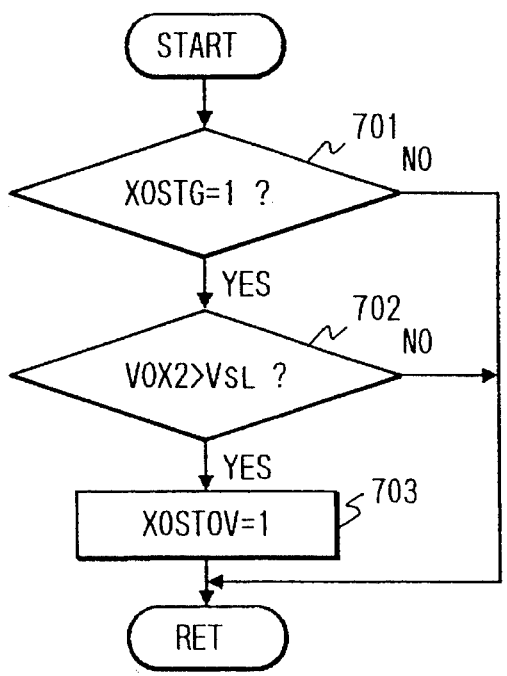
FIG. 13 is a flowchart of a saturation determining routine according to the first preferred embodiment.
Figure 14:
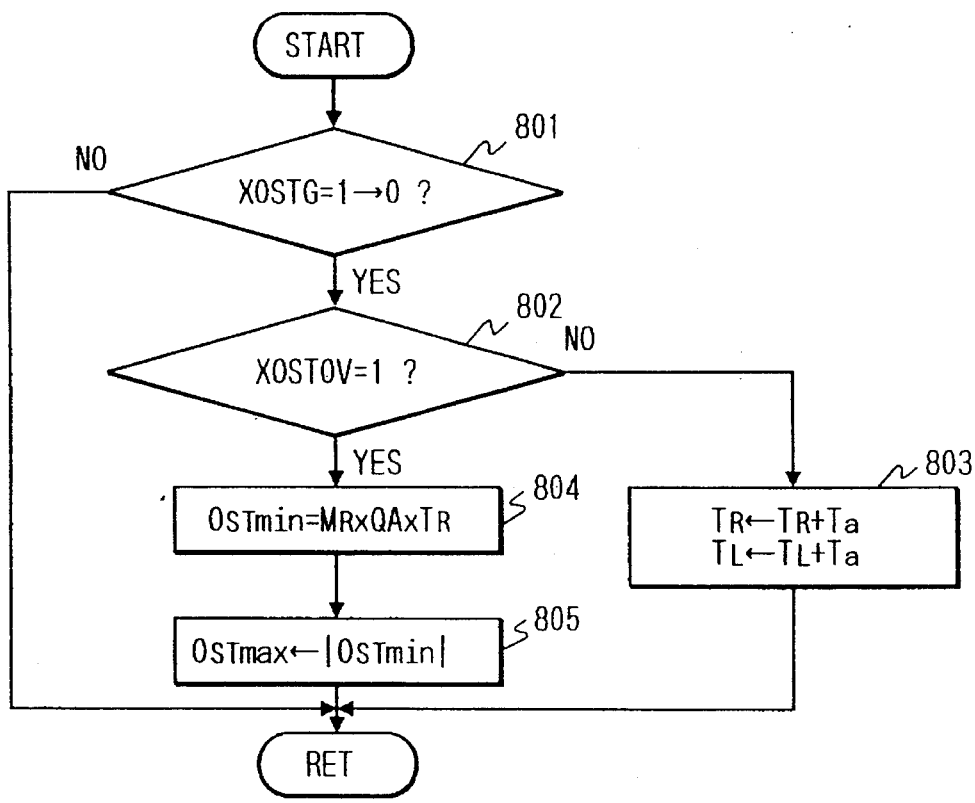
FIG. 14 is a flowchart of an adsorption amount deriving routine according to the first preferred embodiment.

FIG. 11 shows a flowchart of a learning start determining routine, FIG. 12 shows a flowchart of an air-fuel ratio deviation control routine, FIG. 13 shows a flowchart of a saturation determining routine, and FIG. 14 shows a flowchart of a saturated adsorption amount deriving routine.

The CPU 32 receives a detection signal from a vehicular speed sensor (not shown) per given interval, and these routines are executed by the CPU 32 when the vehicle travels every 2,000 km calculated using the detection signal from the vehicular speed sensor.

In FIG. 11, at a first step 501, the CPU 32 determines whether the monitored output voltage VOX2 of the $O_2$ sensor 27 is within a range defined by a preset rich limit value VRL and a preset lean limit value VLL (VRL>λ= 1>VLL). If answer at the step 501 is negative, the routine proceeds to a step 502 as determining that the air-fuel ratio λ is so deviated that a condition is not suitable for executing the adsorption amount learning control. At the step 502, a waiting time counter TIN is reset to 0 (zero). Subsequently, the routine proceeds to a step 503 where a learning executing flag XOSTG is cleared.

On the other hand, when the output voltage VOX2 of the $O_2$ sensor 27 is between the rich limit value VRL and the lean limit value VLL as determined at the step 501, a step 504 increases the waiting time counter TIN by a value "1", and a subsequent step 505 determines whether a value of the waiting time counter TIN exceeds a preset waiting time TINL.

When the waiting time TINL has elapsed as determined at the step 505, the routine proceeds to a step 506 which determines whether or not the engine 1 is under the steady driving condition. Specifically, this determination is made based on, such as, the engine speed Ne monitored by the speed sensor 25 and the intake air pressure PM monitored by the intake air pressure sensor 22. The step 506 produces a positive answer when these monitored values are substantially constant. In response to the positive answer at the step 506, the routine proceeds to a step 507 which determines whether a preset learning interval time T has elapsed from a time point when the learning executing flag XOSTG was cleared (XOSTG=1←0). If the learning interval time T has elapsed as determined at the step 507, the routine proceeds to a step 508 where the learning executing flag XOSTG is set, and this routine is terminated.

On the other hand, if the output voltage VOX2 of the $O_2$ sensor 27 deviates from the range between the rich limit value VRL and the lean limit value VLL before the steps 505 to 507 all produce the positive answers, then the routine executes the steps 502 and 503 to repeat the process from the step 501.

Figure 15:
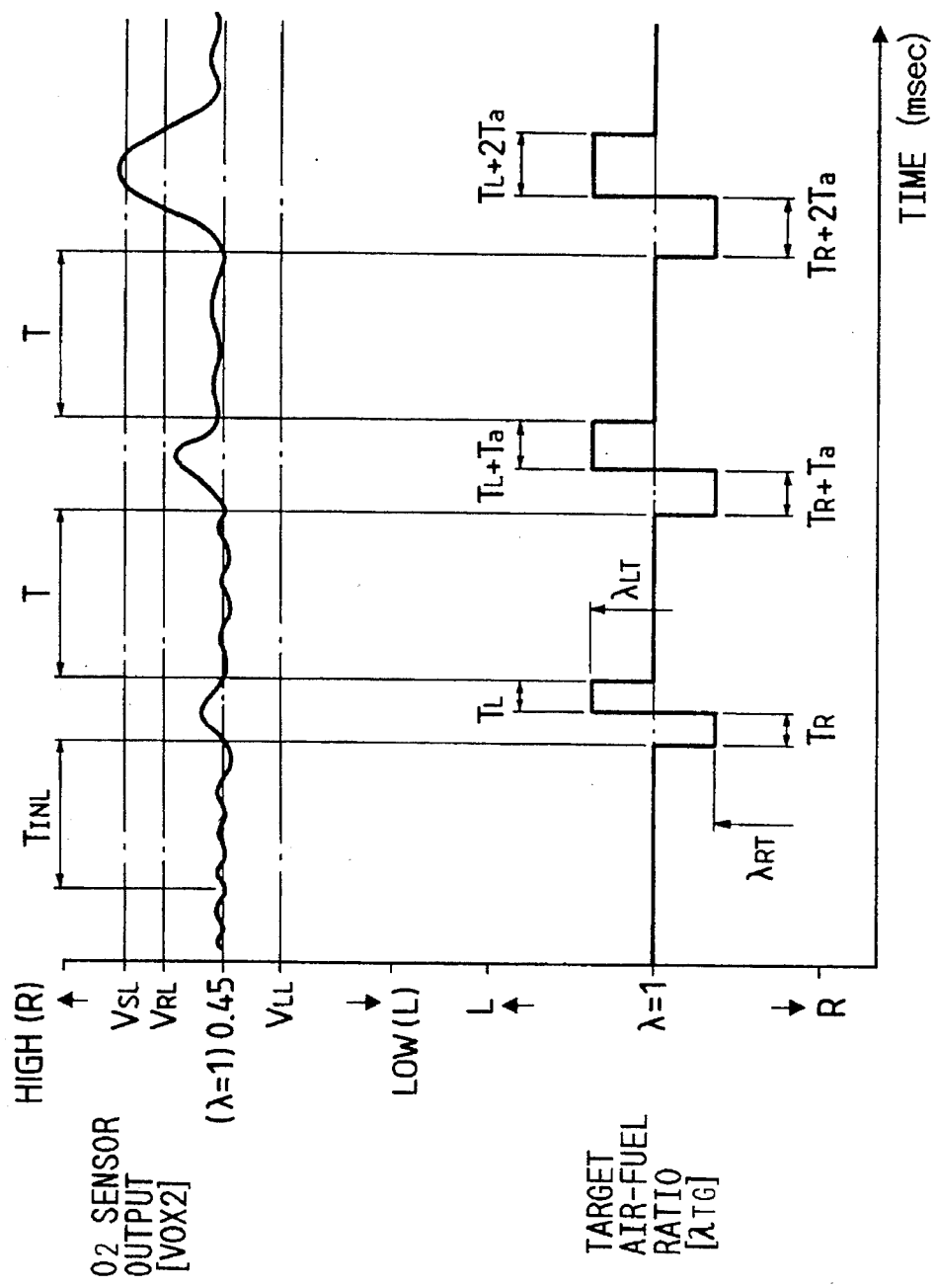
FIG. 15 is a time chart showing a relation between the output of the $O_2$ sensor and the target air-fuel ratio during the air-fuel ratio deviation control of FIG. 12.

Referring now to FIG. 12, when the learning execution flag XOSTG is set at the step 508 in FIG. 11, the routine proceeds from a step 601 to a step 602 which determines whether a value of a correction executing counter Tc exceeds a preset rich correction time TR, i.e. whether the rich correction time TR has elapsed. If the rich correction time TR has not elapsed as determined at the step 602, the routine proceeds to a step 603 where the target air-fuel ratio λTG is set to a preset rich target air-fuel ratio λRT. Thereafter, a step 604 increases the correction executing counter Tc by a value "1", and the routine returns to the step 601. Accordingly, as shown in FIG. 15, the target air-fuel ratio λTG is held at the rich target air-fuel ratio λRT which is on the rich side with respect to the stoichiometric air-fuel ratio λ=1 until the rich correction time TR has elapsed as determined at the step 602. As a result, CO and HC increase in the exhaust gas to be adsorbed to the three way catalytic converter 13. The $O_2$ sensor 27 produces the output voltage VOX2 on the rich side depending on the adsorption amount in the three way catalytic converter 13.

When the rich correction time TR has elapsed as determined at the step 602, a step 605 determines whether the value of the correction executing counter Tc exceeds a value which is a sum of the rich correction time TR and a preset lean correction time TL, that is, whether the lean correction time TL has elapsed after the rich correction time TR elapsed. If answer at the step 605 is negative, the target air-fuel ratio λTG is set to a preset lean target air-fuel ratio λLT at a step 606. Subsequently, the routine proceeds to the step 604 where the correction executing counter Tc is increased by "1", and returns to the step 601. Accordingly, as shown in FIG. 15, the target air-fuel ratio λTG is held at the lean target air-fuel ratio λRT which is on the lean side with respect to the stoichiometric air-fuel ratio λ=1 until the lean correction time TL has elapsed as determined at the step 605. As a result, $O_2$ increases in the exhaust gas to purge CO and HC adsorbed to the three way catalytic converter 13 during the rich correction so that the output voltage VOX2 of the $O_2$ sensor 27 is restored to near the stoichiometric air-fuel ratio λ=1. When the sum of the rich correction time TR and the lean correction time TL has elapsed, the routine proceeds to a step 607 where the leaning execution flag XOSTG is cleared, and is terminated.

Referring now to FIG. 13, when the learning executing flag XOSTG is set at the step 508 in FIG. 11, a step 701 produces a positive answer so that the routine proceeds to a step 702. The step 702 determines whether or not the output voltage VOX2 exceeds a preset saturation determining level VSL which is set greater than the rich limit value VRL at the step 501 in FIG. 11, due to the rich correction of the target air-fuel ratio λTG executed at the step 603 in FIG. 12. If the step 702 determines that the output voltage VOX2 does not exceed the saturation determining level VSL, then the routine is terminated. On the other hand, the step 702 produces a positive answer, then the routine proceeds to a step 703 where a saturation determining flag XOSTOV is set, and is terminated. The saturation determining level VSL is preset as representing the output voltage VOX2 which is produced from the $O_2$ sensor 27 when the three way catalytic converter 13 is saturated, that is, when the adsorption amount of CO and HC exceeds the adsorption limit so that adsorbed CO and HC start to be emitted from the three way catalytic converter 13.

Referring now to FIG. 14, when the learning execution flag XOSTG is cleared at the step 607 in FIG. 12, the routine proceeds from a step 801 to a step 802 as determining that one cycle of the air-fuel ratio deviation control has been completed. The step 802 determines whether or not the saturation determining flag XOSTOV is set. If the flag XOSTOV is not set, the routine proceeds to a step 803 as determining that the adsorption amount of CO and HC do not exceed the adsorption limit of the three way catalytic converter 13 by the last cycle of the air-fuel ratio deviation control. At the step 803, the rich correction time TR and the lean correction time TL are increased by a preset time Ta, respectively.

Referring back to FIGS. 11 and 12, when the learning interval time T has elapsed from a time point when the learning execution flag XOSTG was cleared at the step 607 in FIG. 12, the routine proceeds from the step 507 to the step 508 in FIG. 11 so that the learning execution flag XOSTG is set. Accordingly, the air-fuel ratio deviation control routine in FIG. 12 is again executed. Since the rich correction time TR has been prolonged by the added time Ta at the step 803 in FIG. 14, the adsorption amount in the three way catalytic converter 13 is increased in comparison with that in the last cycle of this air-fuel ratio deviation control routine. As appreciated, since the lean correction time TL has been also prolonged by the added time Ta, the air-fuel ratio λ is restored to the stoichiometric air-fuel ratio λ=1 when the air-fuel ratio deviation control is completed. If the step 702 in FIG. 13 still determines that the output voltage VOX2 of the $O_2$ sensor 27 does not exceed the saturation determining level VSL, the rich correction time TR and the lean correction time TL are further prolonged at the step 803 in FIG. 14. On the other hand, the step 702 determines that the output voltage VOX2 exceeds the saturation determining level VSL, the saturation determining flag XOSTOV is set at a step 703.

In response to the setting of the saturation determining flag XOSTOV at the step 703, the routine proceeds from the step 802 to a step 804 in FIG. 14. At the step 804, a current value of the minimum adsorption amount OSTmin of CO and HC in the three way catalytic converter 13, representative of the lack of $O_2$ required by CO and HC as described before, is derived based on the following equation:

*OSTmin=MR×QA×TR* wherein, MR represents the material concentration M corresponding to the rich target air-fuel ratio λRT and thus derived from the rich target air-fuel ratio λRT using the map of FIG. 10. Accordingly, MR is a negative value, and thus the minimum adsorption amount OSTmin also becomes a negative value.

The routine further proceeds to a step 805 where a current value of the maximum adsorption amount OSTmax is set to the absolute value of the minimum adsorption amount OSTmin derived at the step 804, and is terminated.

The minimum adsorption amount OSTmin and the maximum adsorption amount OSTmax thus derived are used at the step 208 in FIG. 4 and at the steps 305 and 309 in FIG. 7 as described before. Accordingly, the inversion skip control and the purge control are performed based on the minimum and maximum adsorption amounts OSTmin and OSTmax which are updated in consideration of the deterioration of the three way catalytic converter 13 so that the emission of the harmful components is effectively prevented over a long term.

Now, a second preferred embodiment of the present invention will be described hereinbelow.

The second preferred embodiment differs from the first preferred embodiment in a learning control, wherein the system learns the target air-fuel ratio λTG per given engine operating range when the air-fuel ratio λ downstream of the three way catalytic converter 13 monitored by the $O_2$ sensor 27 converges to the stoichiometric air-fuel ratio λ=1.

The following description mainly refers to the difference over the first preferred embodiment.

Figure 16:
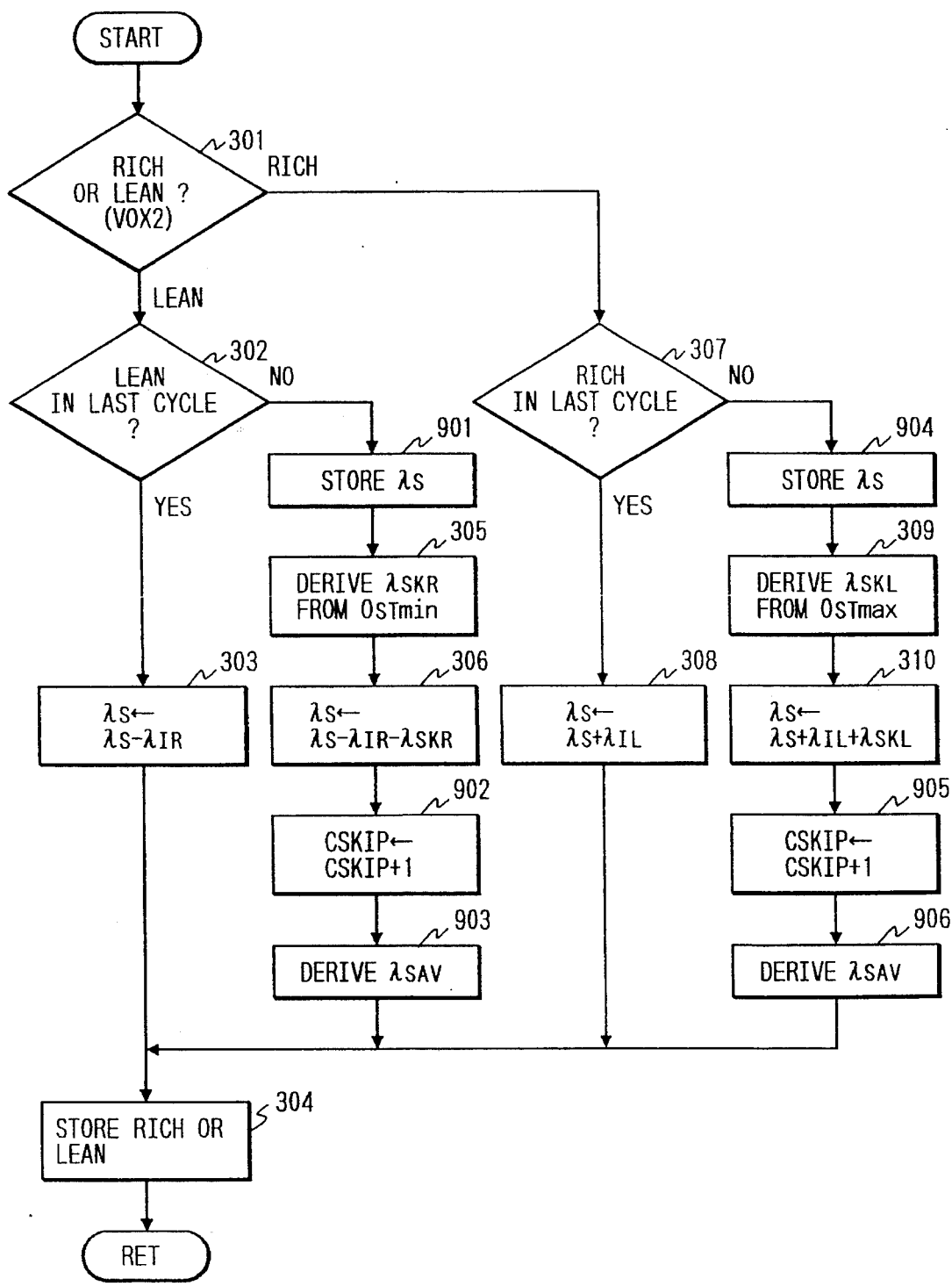
FIG. 16 is a flowchart of an inversion skip control routine according to a second preferred embodiment of the present invention.
Figure 17:
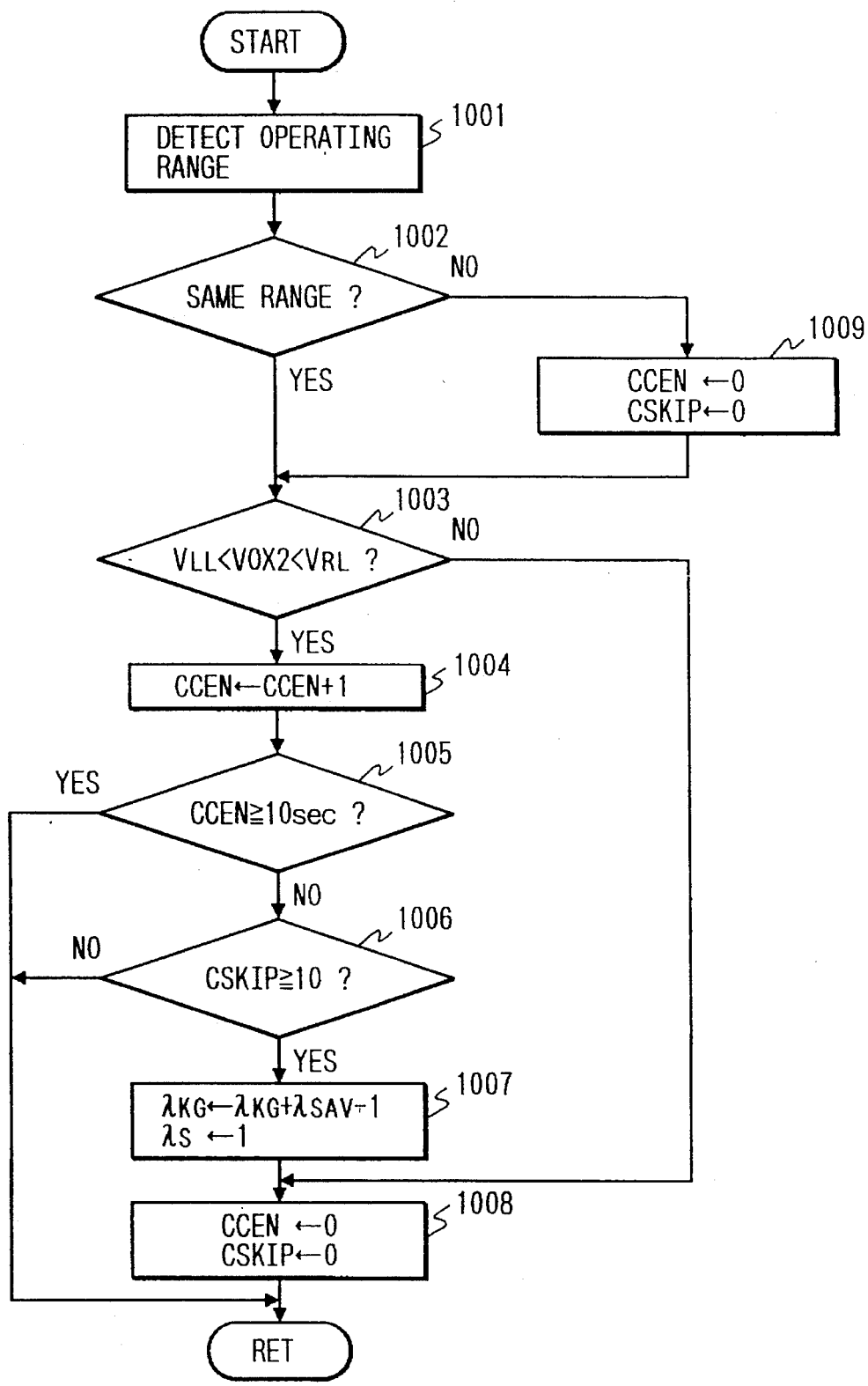
FIG. 17 is a flowchart of a target air-fuel ratio learning routine according to the second preferred embodiment.
Figures 18, 19:
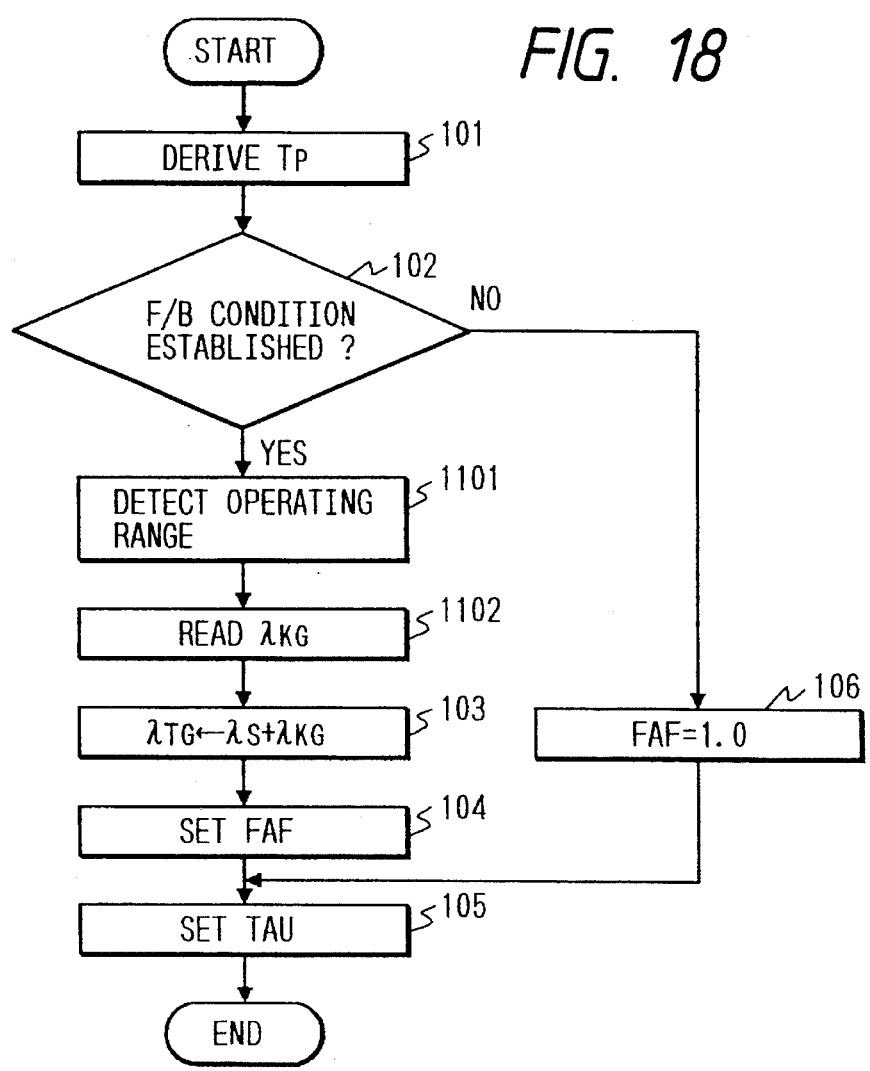
FIG. 18 is a flowchart of a fuel injection amount deriving routine according to the second preferred embodiment.
FIG. 19 is an explanatory diagram showing one example of setting engine operating ranges.

FIG. 16 shows a flowchart of an inversion skip control routine to be executed by the CPU 32, according to the second preferred embodiment, FIG. 17 shows a flowchart of a target air-fuel ratio learning routine to be executed by the CPU 32, according to the second preferred embodiment, and FIG. 18 shows a flowchart of a fuel injection amount deriving routine to be executed by the CPU 32, according to the second preferred embodiment.

The routine in FIG. 16 is similar to the routine in FIG. 7 of the first preferred embodiment, and differs in that a basic target air-fuel ratio λS is corrected in place of the target air-fuel ratio λTG at the steps 303, 306, 308 and 310 and that steps 901 to 906 are newly added.

When the inversion of the output voltage VOX2 of the $O_2$ sensor 27 from rich to lean across the stoichiometric air-fuel ratio λ=1 has occurred as determined at the step 302, the routine proceeds to the step 901 where a current value of the basic target air-fuel ratio λS is stored in the RAM 34. Subsequently, the step 305 derives the rich skip amount λSKR, and the step 306 corrects the basic target air-fuel ratio λS to the rich side (λS←λS−λIR−λSKR). Subsequently, the routine proceeds to the step 902 where a skip number counter CSKIP for counting the number of skips is increased by "1", and further proceeds to the step 903 where a mean air-fuel ratio λSAV is derived by averaging the basic air-fuel ratio λS stored in the RAM 34 and the basic air-fuel ratio λS derived at the step 306. Then, the routine proceeds to the step 304, and is terminated.

Similarly, when the inversion of the output voltage VOX2 of the $O_2$ sensor 27 from lean to rich across the stoichiometric air-fuel ratio λ=1 has occurred as determined at the step 307, the routine proceeds to the step 904 where a current value of the basic target air-fuel ratio λS is stored in the RAM 34. Subsequently, the step 309 derives the lean skip amount λSKL, and the step 310 corrects the basic target air-fuel ratio λS to the lean side (λS←λS+λIL+λSKL). Subsequently, the routine proceeds to the step 905 where the skip number counter CSKIP is increased by "1", and further proceeds to the step 906 where a mean air-fuel ratio λSAV is derived by averaging the basic target air-fuel ratio λS stored in the RAM 34 and the basic air-fuel ratio λS derived at the step 310. Then, the routine proceeds to the step 304, and is terminated.

As described above, in the routine of FIG. 16, when the air-fuel ratio λ downstream of the three way catalytic converter 13 is inverted between rich and lean to skip the basic target air-fuel ratio λS, the mean air-fuel ratio λSAV is derived by averaging the basic target air-fuel ratios λS before and after the skip correction, and the skip number counter CSKIP is increased one by one.

Referring now to FIG. 17, a step 1001 detects the engine operating range, and a step 1002 determines whether or not the detected engine operating range is the same as that which was detected in the last cycle of this routine. As shown in FIG. 19, in this preferred embodiment, the engine operating rages are defined in terms of the intake air quantities QA, the throttle opening degrees TH and the vehicular speeds. Leaned values $\lambda KGO$ to $\lambda KGi$ are learned per engine operating range, as will be described hereinbelow.

If answer at the step 1002 is positive, i.e. the detected operating range is the same as that in the last cycle of this routine, a step 1003 determines whether the output voltage VOX2 of the $O_2$ sensor 27 is converged within a range defined by a preset rich limit value VRL and a preset lean limit value VLL (VRL>$\lambda$=1>VLL). If the step 1003 produces a positive answer, the routine proceeds to a step 1004 as determining that the air-fuel ratio $\lambda$ downstream of the three way catalytic converter 13 is stable. The step 1004 increases a skip time counter CCEN by "1". Subsequently, a step 1005 determines whether a value of the skip time counter CCEN has reached 10 sec. In response to a negative answer at the step 1005, a step 1006 determines whether a value of the skip number counter CSKIP is equal to or greater than "10".

When the value of the skip time counter CCEN reaches 10 sec before the value of the skip number counter CSKIP becomes equal to or greater than "10", this routine is terminated. When the skip number is small per unit time as noted above, it may be decided that the air-fuel ratio $\lambda$ downstream of the three way catalytic converter 13 is not frequently inverted between rich and lean so that the air-fuel ratio $\lambda$ is not converged to the stoichiometric air-fuel ratio $\lambda$=1. Accordingly, the target air-fuel ratio learning control is not performed as determining that the target air-fuel ratio $\lambda TG$ at this time is not a value for holding the three way catalytic converter 13 at the neutral state.

On the other hand, when the step 1006 produces a positive answer, that is, the value of the skip number counter CSKIP becomes equal to or greater than "10" before the value of the skip time counter CCEN reaches 10 sec, the routine proceeds to a step 1007. Specifically, when the skip number per unit time is large, it may be decided that the downstream air-fuel ratio $\lambda$ is frequently inverted between rich and lean so as to converge to the stoichiometric air-fuel ratio $\lambda$=1. Accordingly, the step 1007 is executed as determining that the target air-fuel ratio $\lambda TG$ at this time is a value for holding the three way catalytic converter 13 at the neutral state.

At the step 1007, a learned value $\lambda KG$ for the corresponding engine operating range is updated using the mean air-fuel ratio $\lambda SAV$ currently derived at the step 903 or 906 in FIG. 16. Specifically, the step 1007 derives the learned value $\lambda KG$ based on the following equation:

$$\lambda KG \leftarrow \lambda KG + \lambda SAV - 1$$

In the equation, a value "1" is subtracted so as to reflect only a deviation of the mean air-fuel ratio $\lambda SAV$ relative to $\lambda S$=1 upon the learned value $\lambda KG$. Accordingly, the step 1007 also sets the basic target air-fuel ratio $\lambda S$ to a value "1". It is to be noted that, since the basic target air-fuel ratio $\lambda S$ will be corrected immediately thereafter in the inversion skip control, the basic target air-fuel ratio $\lambda S$ is held at "1" only when updating the learned value $\lambda KG$. This is necessary since the target air-fuel ratio $\lambda TG$ is derived by adding the learned value $\lambda KG$ to the basic target air-fuel ratio $\lambda S$ ($\lambda TG \leftarrow \lambda S + \lambda KG$) at the step 103 of the later described fuel injection amount deriving routine in FIG. 18. Accordingly, if the basic target air-fuel ratio $\lambda S$ is not set to "1" when updating the learned value $\lambda KG$, the learned value $\lambda KG$ is reflected on the target air-fuel ratio $\lambda TG$ twice or double.

Subsequently, the routine proceeds to a step 1008 where the skip time counter CCEN and the skip number counter CSKIP are reset, respectively, and is terminated.

In the manner as described above, the basic target air-fuel ratios $\lambda S$ at the time of the convergence of the downstream air-fuel ratio $\lambda$ to near the stoichiometric air-fuel ratio $\lambda$=1 are reflected on the learned value $\lambda KG$ for the corresponding engine operating range. The learned value $\lambda KG$ for each engine operating range is stored in a predetermined area of the backup RAM 35 so that the memory data is maintained even after a vehicular ignition switch turns off.

On the other hand, when the output voltage VOX2 deviates from the range between the rich limit value VRL and the lean limit value VLL at the step 1003 before the value of the skip time counter CCEN reaches 10 sec at the step 1005, the routine proceeds to the step 1008 to reset the skip time counter CCEN and the skip number counter CSKIP and returns to the step 1001 to again determine whether to execute the step 1007. Further, when the engine operating range changes from that in the last cycle of this routine at the step 1002 before the value of the skip time counter CCEN reaches 10 sec at the step 1005, the routine proceeds to a step 1009 where the skip time counter CCEN and the skip number counter CSKIP are reset, respectively. In this case, the following steps are executed for a new engine operating range after the change.

Further, although the step 1007 updates the learned value $\lambda KG$ based on the basic target air-fuel ratios $\lambda S$, other methods may be applied therefore. For example, the learned value $\lambda KG$ is increased or decreased per given amount, such as, 0.001 (0.1%) which corresponds to 1 LSB (least significant bit) in the CPU 32, and the learned value $\lambda KG$ is learned based on a corresponding variation of the downstream air-fuel ratio $\lambda$.

Referring now to FIG. 18, the fuel injection amount deriving routine according to the second preferred embodiment will be described. The routine of FIG. 18 is similar to the routine of FIG. 3 of the first preferred embodiment, and differs in that the process at the step 103 is changed, and steps 1101 and 1102 are newly added.

When the step 102 determines that the feedback control condition of the air-fuel ratio $\lambda$ is established, the routine proceeds to the step 1101 which detects a current engine operating range, and further proceeds to the step 1102 which reads out the corresponding learned value $\lambda KG$ from the backup RAM 35 based on the detected engine operating range. Subsequently, the step 103 derives the target air-fuel ratio $\lambda TG$ by adding the read-out learned value $\lambda KG$ to the basic target air-fuel ratio $\lambda S$ currently derived at the step 303, 306, 308 or 310 in FIG. 16 ($\lambda TG \leftarrow \lambda S + \lambda KG$). Thereafter, as described in the first preferred embodiment, the step 104 sets the air-fuel ratio correction coefficient FAF, the step 105 sets the fuel injection amount TAU, and this routine is terminated.

In the routine of FIG. 18, the learned value $\lambda KG$ corresponding to the detected engine operating range is selected among the learned values $\lambda KG$ stored in the backup RAM 35, and used for deriving the target air-fuel ratio $\lambda TG$. However, other manners may be applied therefore. For example, the linear interpolation is made to the learned values $\lambda KG$ stored in the backup RAM 35 so as to derive the learned value $\lambda KG$ which corresponds to a current engine operating range more precisely, and this learned value $\lambda KG$ is used for deriving the target air-fuel ratio $\lambda TG$.

Further, when deriving the target air-fuel ratio $\lambda TG$, various other correction amounts may be added. For example, a correction amount is added for periodically fluctuating the target air-fuel ratio $\lambda TG$ so as to perform the so-called dither control as disclosed in, such as, Japanese First (unexamined) Patent Publication No. 3-185244, or a correction amount which depends on, such as, an engine cooling water temperature Thw may be added.

In the second preferred embodiment, as described above, the basic target air-fuel ratios at the time of the air-fuel ratio $\lambda$ downstream of the three way catalytic converter 13 converging to near the stoichiometric air-fuel ratio $\lambda=1$ are learned to update the learned value $\lambda KG$ for each engine operating range, and this learned value $\lambda KG$ is reflected on the target air-fuel ratio $\lambda TG$.

It has been confirmed by the inventors of the present invention that the target air-fuel ratio $\lambda TG$ which can hold the three way catalytic converter 13 at the neutral state differs per engine operating range due to variation, such as, in gas purification factor of the three way catalytic converter 13 depending on temperature variation and in gas exchange speed of the A/F sensor 26 due to flow rate variation of the exhaust gas. As indicated by two-dot chain lines in FIG. 20, in the first preferred embodiment where no learning control of the target air-fuel ratio $\lambda TG$ is performed, the target air-fuel ratio $\lambda TG$ (represented by the basic target air-fuel ratio $\lambda S$ in FIG. 20) is corrected to be richer by the rich integral amount $\lambda IR$ after the output voltage VOX2 of the $O_2$ sensor 27 starts to deviate toward the leaner side due to the change in engine operating range. Specifically, the correction of the target air-fuel ratio $\lambda TG$ is not performed until the harmful components on the lean side is adsorbed by the three way catalytic converter 13 to a certain extent so that the downstream air-fuel ratio $\lambda$ starts to reveal the deviation. Further, as seen from the inversion skip control in FIG. 7, while the downstream air-fuel ratio $\lambda$ is deviated from the stoichiometric air-fuel ratio $\lambda=1$ in one direction, i.e. on one of the rich and lean sides, only the moderate correction based on the rich or lean integral amount $\lambda IR$ or $\lambda IL$ is performed. Accordingly, the correction delay of the target air-fuel ratio $\lambda TG$ is caused to generate the fluctuation of the downstream air-fuel ratio $\lambda$ or the hunting so that the three way catalytic converter 13 is likely to deviate from the neutral state.

On the other hand, in the second preferred embodiment, as indicated by solid lines, when the engine operating condition is changed due to, such as, increment of the intake air quantity QA, the learned value $\lambda KG$ corresponding to a new engine operating condition is read out to immediately correct the target air-fuel ratio $\lambda TG$ to the rich side. As a result, the correction delay due to the change in engine operating range is prevented to hold the three way catalytic converter 13 more reliably so that the output voltage VOX2 of the $O_2$ sensor 27 representative of the downstream air-fuel ratio $\lambda$ continues to converge to the stoichiometric air-fuel ratio $\lambda=1$.

Now, a third preferred embodiment of the present invention will be described hereinbelow.

The third preferred embodiment differs from the second preferred embodiment in that a control target value VOX2TG for the $O_2$ sensor 27 is variably set depending on the monitored engine operating condition.

The following description mainly refers to the difference over the second preferred embodiment.

Figure 21:
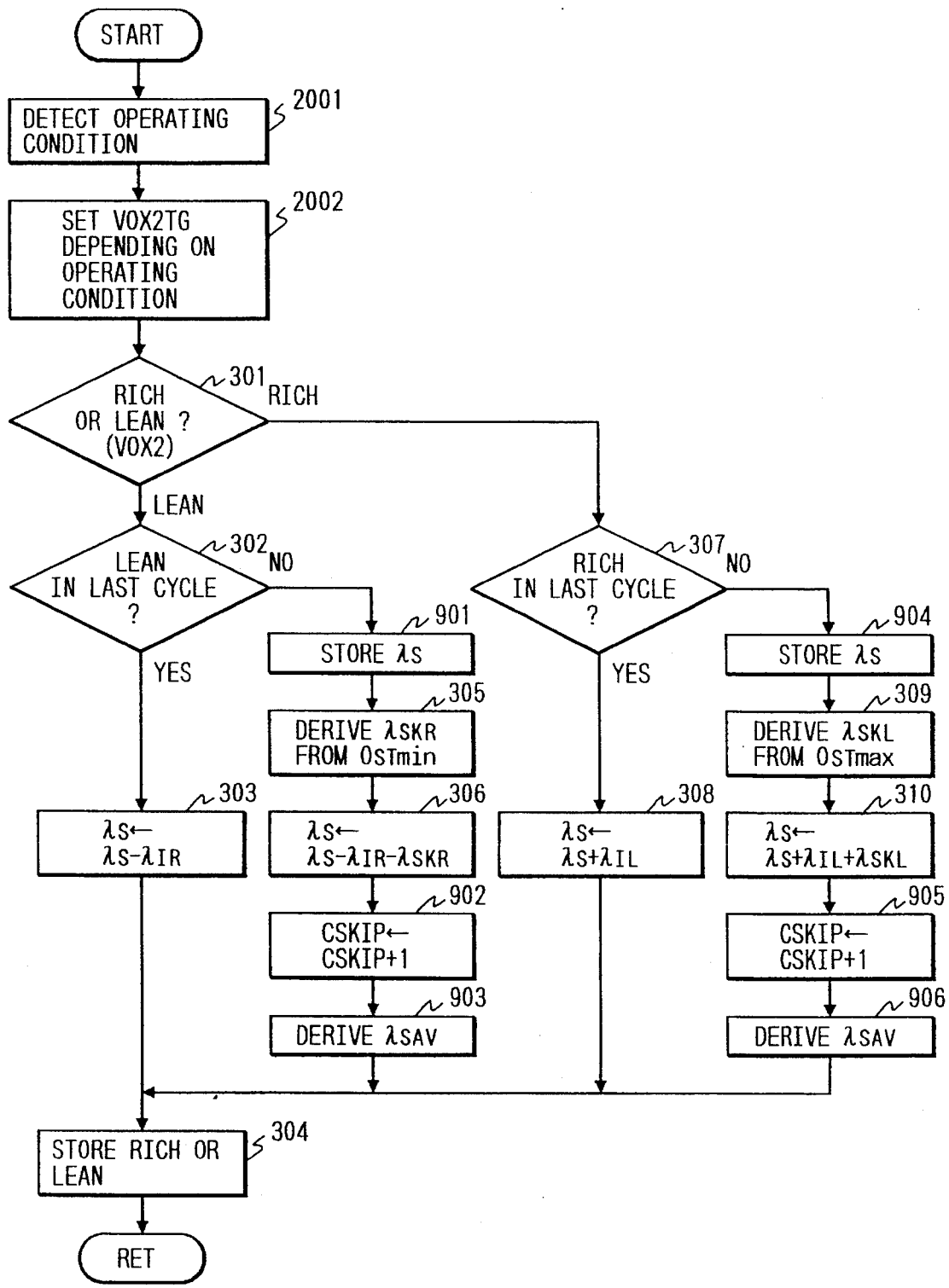
FIG. 21 is a flowchart of an inversion skip control routine according to a third preferred embodiment of the present invention.

FIG. 21 shows a flowchart of an inversion skip control routine to be executed by the CPU 32, according to the third preferred embodiment.

The routine of FIG. 21 is the same as the inversion skip control routine of FIG. 16 except for steps 2001 and 2002 which are newly added.

Figure 23:
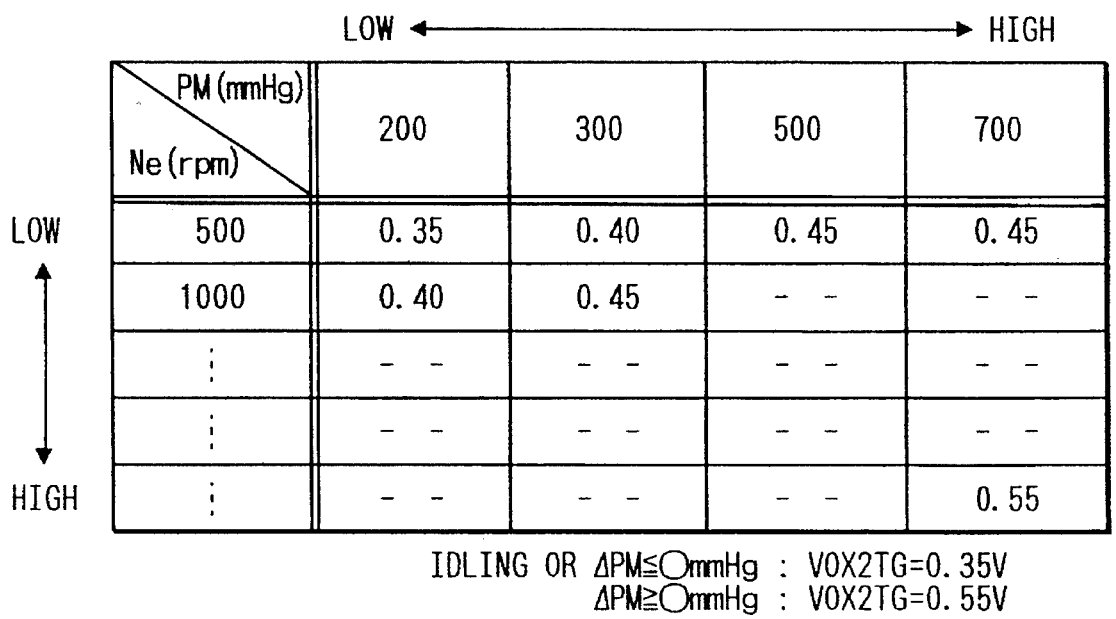
FIG. 23 is a map prestored in the ROM for deriving a control target value depending on an engine operating condition.
Figure 24:
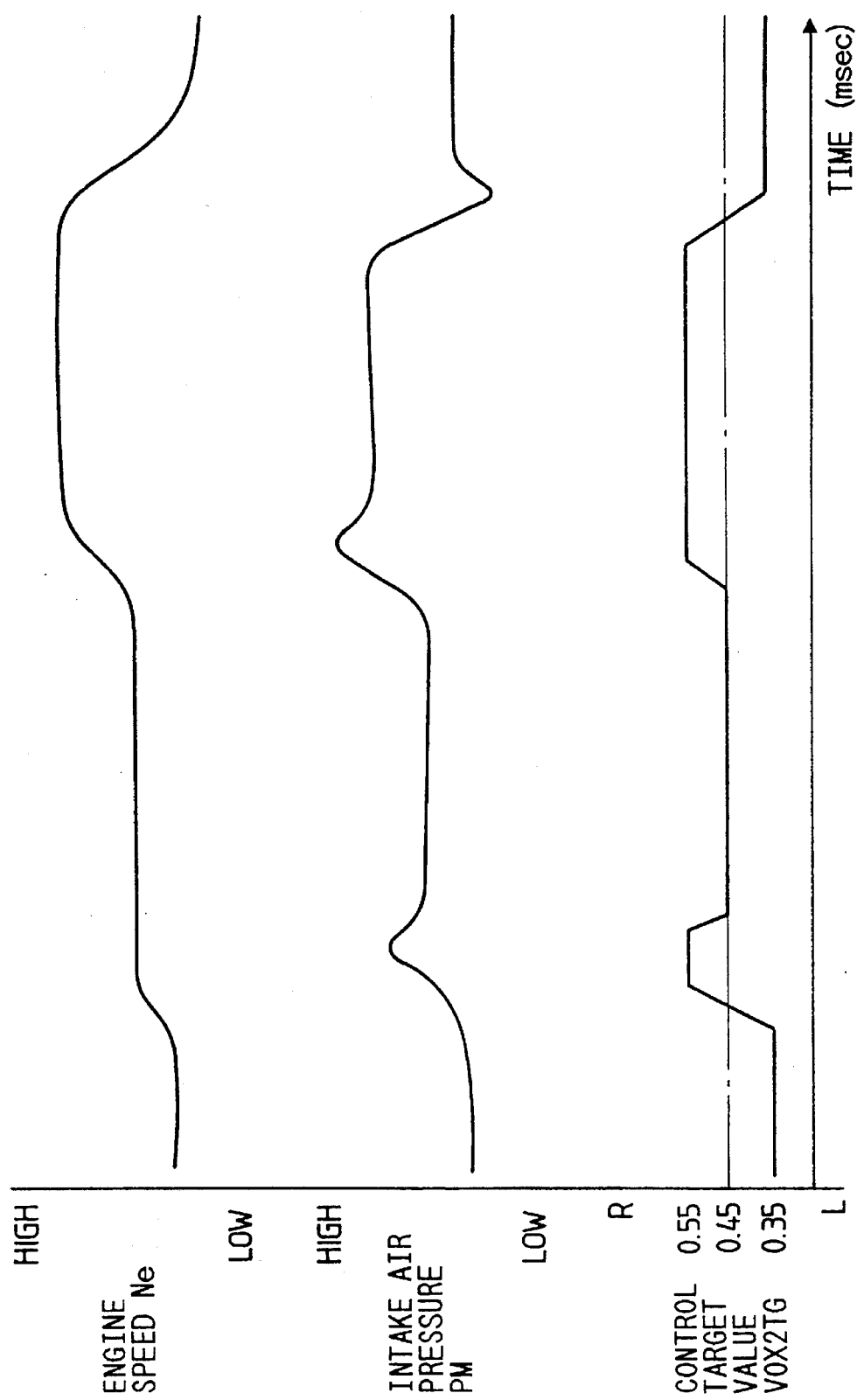
FIG. 24 is a time chart showing a relation among an engine speed, an intake air pressure and the control target value.

At the step 2001, a current engine operating condition is detected based on the monitored engine speed Ne and the monitored intake air pressure PM. Subsequently, the routine proceeds to the step 2002 where the control target voltage VOX2TG is set based on the detected engine operating condition, using a map as shown in FIG. 23. In this map, the control target voltage VOX2TG is accessible in terms of the engine speed Ne and the intake air pressure PM during the steady driving condition. During the steady driving condition, the control target voltage VOX2TG takes a value between 0.35 V and 0.55 V depending on the monitored engine speed Ne and the monitored intake air pressure PM. On the other hand, the control target voltage VOX2TG is set to 0.35 V under an engine idling or under a deceleration equal to or greater than a preset level. Further, the control target voltage VOX2TG is set to 0.55 V under an acceleration equal to or greater than a preset level. The relationship among the engine speed Ne, the intake air pressure PM and the control target voltage VOX2TG is clearly shown in a time chart of FIG. 24.

Thereafter, the routine proceeds to the step 301 where the output voltage VOX2 of the $O_2$ sensor 27 is compared with the control target voltage VOX2TG set at the step 2002. If the output voltage VOX2 is equal to or greater than the control target voltage VOX2TG (VOX2$\geq$VOX2TG), "rich" is determined. On the other hand, if the output voltage VOX2 is less than the control target voltage VOX2TG (VOX2<VOX2TG), "lean" is determined. Thereafter, the routine proceeds to the step 302 or 307 according to answer at the step 301 and then executes the following steps as described in the second preferred embodiment.

The setting of the control target voltage VOX2TG on the rich side relative to the stoichiometric air-fuel ratio $\lambda=1$ may be linked with a timing when the EGR (exhaust gas recirculation) is inactive.

The advantages of the third preferred embodiment will be described hereinbelow.

Figure 22:
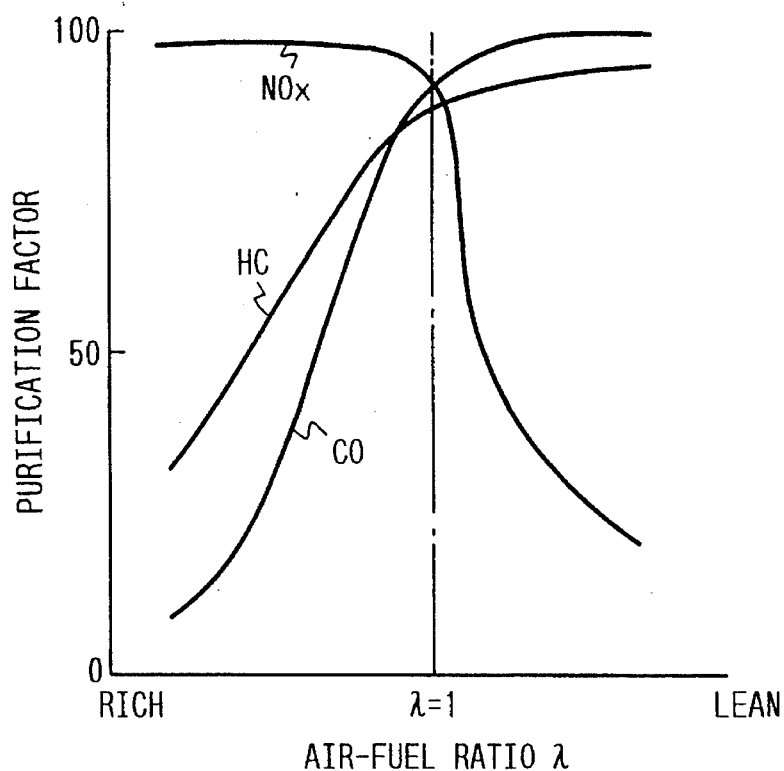
FIG. 22 is a graph showing a relation between purification factors of the three way catalytic converter for CO, HC and NOx and the air-fuel ratio.

The three way catalytic converter 13 changes it purification factors for CO, HC and NOx depending on the air-fuel ratio $\lambda$, as shown in FIG. 22. Since all these harmful components are well purified at the stoichiometric air-fuel ratio $\lambda=1$, the air-fuel ratio has been controlled to the stoichiometric air-fuel ratio $\lambda=1$. However, since a particular component increases in the exhaust gas under a particular engine operating condition (for example, NOx increases under acceleration, and HC increases under engine idling or deceleration), the harmful components can be suppressed on the whole by controlling the air-fuel ratio $\lambda$ to increase the purification efficiency of the increased component under the corresponding engine operating condition. On the other hand, when the air-fuel ratio $\lambda$ is changed as largely deviating from the stoichiometric air-fuel ratio $\lambda=1$, the purification efficiency of the other component is largely reduced to raise a problem.

Accordingly, in this preferred embodiment, the control target voltage VOX2TG for the $O_2$ sensor 27 is variably set to a proper value depending on the monitored engine operating condition so as to realize the air-fuel ratio $\lambda$ which can increase the purification efficiency of the increased component, while not largely reducing the purification efficiency of the other component.

Now, a fourth preferred embodiment of the present invention will be described hereinbelow.

The fourth preferred embodiment differs from the first preferred embodiment in that the rich and lean integral amounts $\lambda IR$ and $\lambda IL$ and the skip amounts $\lambda SKR$ and $\lambda SKL$ are varied depending on variation in the intake air quantity QA.

The following description mainly refers to the difference over the first preferred embodiment.

Figure 25:
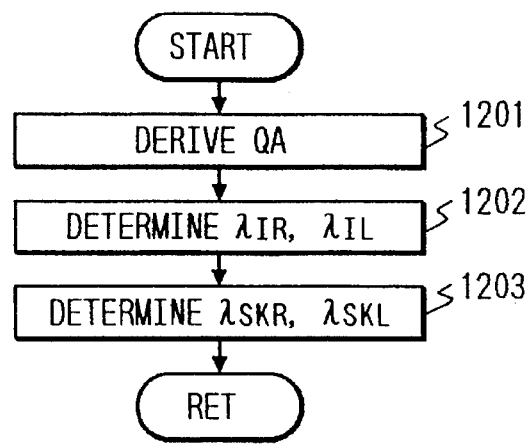
FIG. 25 is a flowchart of an integral/skip amount setting routine according to a fourth preferred embodiment of the present invention.

FIG. 25 shows a flowchart of a routine to be executed by the CPU 32 for setting the rich and lean integral amounts λIR and λIL and the rich and lean skip amounts λSKR and λSKL, according the fourth preferred embodiment.

The routine in FIG. 25 is executed at the same timing with the inversion skip control routine shown in FIG. 7.

At a step 1201, a current value of the intake air quantity QA is derived based on the engine speed Ne monitored by the speed sensor 25 and the intake air pressure PM monitored by the intake air pressure sensor 22. Subsequently, a step 1202 determines the integral amounts λIR and λIL from the derived intake air quantity QA using a map of FIG. 26 prestored in the ROM 33. Further, a step 1203 determines the skip amounts λSKR and λSKL from the intake air quantity using a map of FIG. 27.

The integral amounts λIR, λIL and the skip amounts λSKR, λSKL thus determined are respectively used at the steps 303, 306, 308 and 310 of the inversion skip control routine in FIG. 7.

Figure 26:
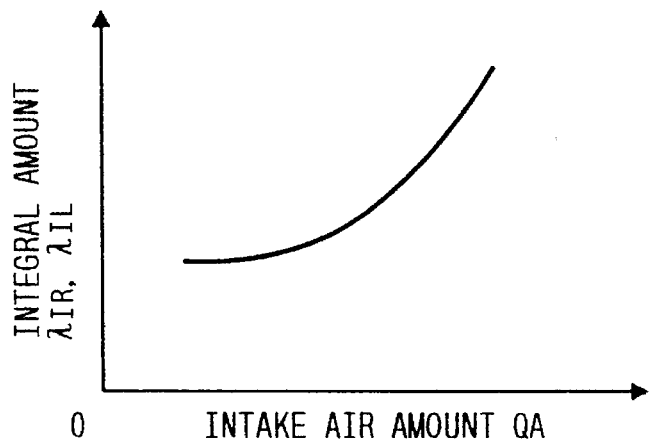
FIG. 26 is a map prestored in the ROM for setting the integral amount based on the intake air quantity.
Figure 27:
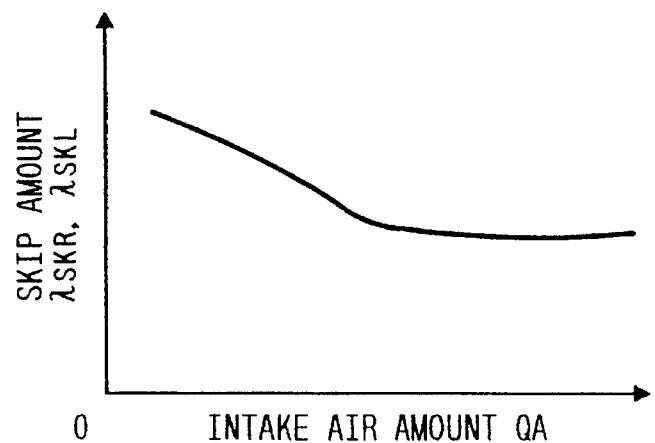
FIG. 27 is a map prestored in the ROM for setting the skip amount based on the intake air quantity.

As seen from FIGS. 26 and 27, the integral amounts λIR, λIL gradually increase according to increment of the intake air quantity QA and the skip amounts λSKR, λSKL gradually decrease according to increment of the intake air quantity QA while its lower limit is restricted at a region of the intake air quantity QA greater than a predetermined level. These characteristics are defined such that the integral amounts λIR, λIL and the skip amounts λSKR, λSKL respectively always give a constant influence to the downstream air-fuel ratio λ irrespective of variation in intake air quantity QA. Specifically, it has been confirmed by the inventors of the present invention that, when the intake air quantity QA varies, a temperature of the three way catalytic converter 13, gas exchange speeds of the A/F sensor 26 and the O₂ sensor 27, a required correction timing of the fuel injection amount and the like are changed so that a variation rate (the influence of the integral amounts λIR, λIL and the skip amounts λSKR, λSKL) of the downstream air-fuel ratio λ corresponding to the correction of the target air-fuel ratio λTG changes. Accordingly, when the influence to the downstream air-fuel ratio λ is large, the integral amounts λIR, λIL and the skip amounts λSKR, λSKL are set to be smaller, while, set to be greater when the influence is small. This serves to prevent the excess correction or the correction delay when the target air-fuel ratio λTG is corrected at the steps 303, 306, 308 and 310 in the inversion skip control routine in FIG. 7.

The characteristics shown in FIGS. 26 and 27 have been respectively obtained through experiments. Accordingly, depending on the specification of the engine 1 or the contents of the air-fuel ratio control, reverse characteristics may be defined, wherein, for example, the integral amounts λIR, λIL gradually decrease according to increment of the intake air quantity QA.

Now, a fifth preferred embodiment of the present invention will be described hereinbelow.

The fifth preferred embodiment differs from the first preferred embodiment in that an integral amount λI (corresponding to the rich and lean integral amounts λIR and λIL in the first preferred embodiment) and a skip amount λSK (corresponding to the rich and lean skip amounts λSKR and λSKL in the first preferred embodiment) which are used in the inversion skip control, are varied depending on variation in output voltage VOX2 of the O₂ sensor 27.

The following description mainly refers to the difference over the first preferred embodiment.

Figure 28:
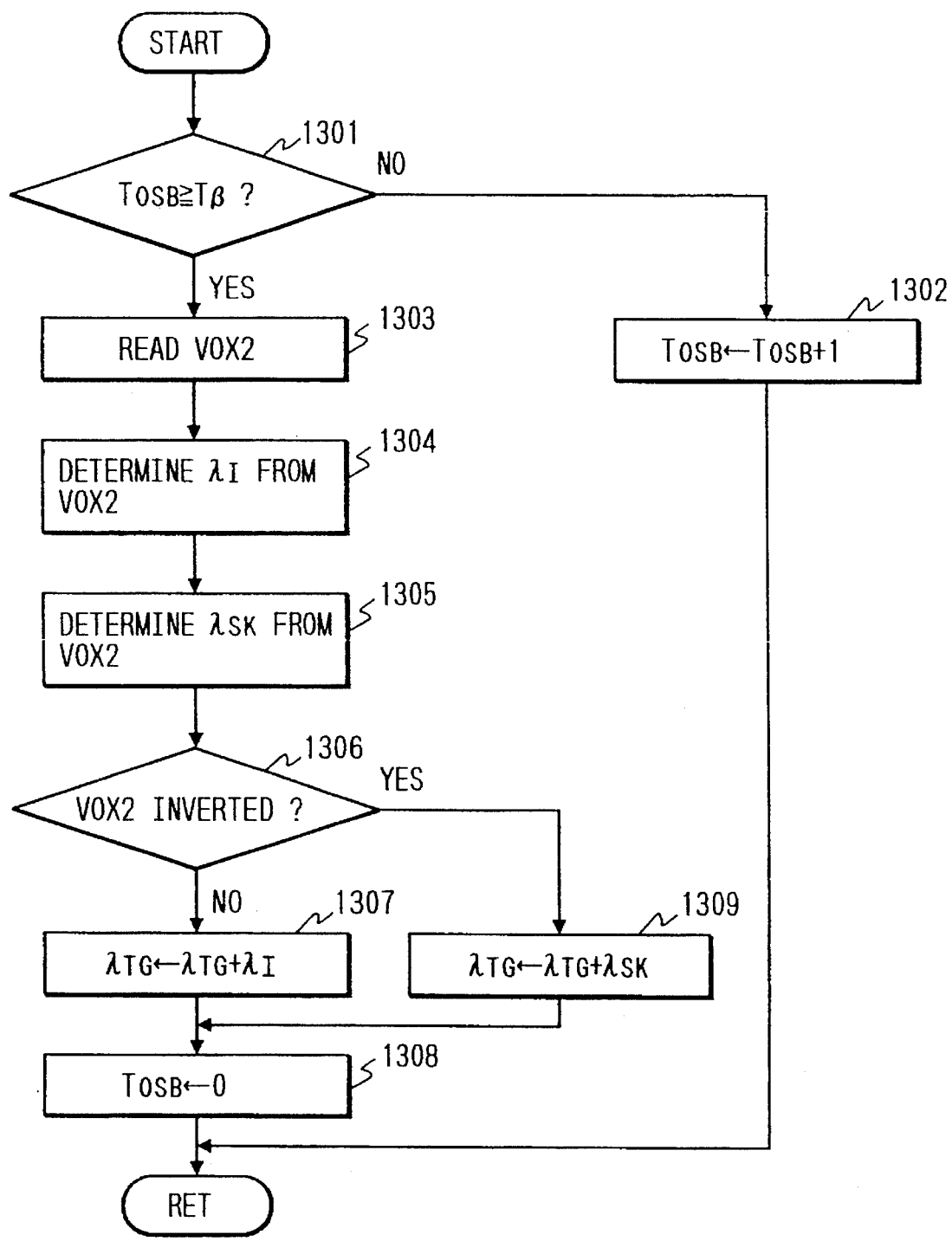
FIG. 28 is a flowchart of a target air-fuel ratio setting routine according to a fifth preferred embodiment.

FIG. 28 shows a flowchart of an inversion skip control routine to be executed by the CPU 32 for deriving the target air-fuel ratio λTG with the variable integral amount λI or the variable skip amount λSK, according to the fifth preferred embodiment. The routine of FIG. 28 corresponds to the inversion skip control routine shown in FIG. 7.

At a step 1301, it is determined whether a value of an interval counter TOSB indicative of an elapsed time from a correction of the target air-fuel ratio λTG in the last cycle of this routine, has reached a preset interval time Tβ. If answer at the step 1301 is negative, i.e. the interval time Tβ has not reached, the routine proceeds to a step 1302 where the interval counter TOSB is increased by "1", and is terminated.

Figure 29:
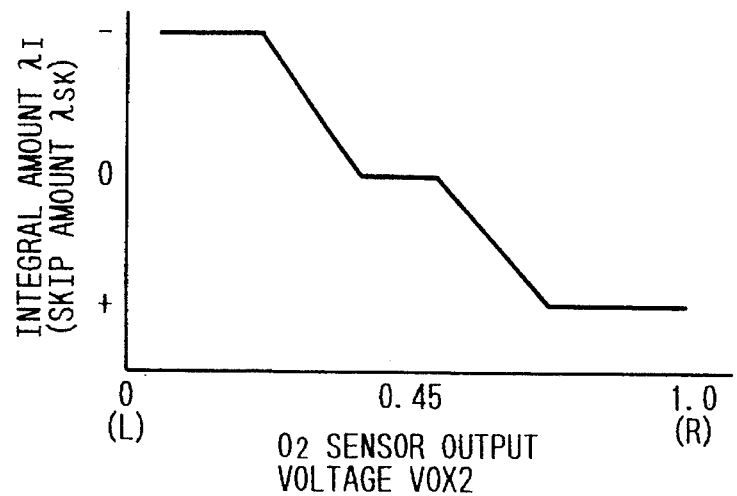
FIG. 29 is a map prestored in the ROM for setting the integral amount based on the output voltage of the $O_2$ sensor.

When the value of the interval counter TOSB becomes equal to or greater than the interval time Tβ after the step 1302 was executed repeatedly, the routine proceeds to a step 1303 which reads in the output voltage VOX2 of the O₂ sensor 27, and further to a step 1304 which determines the integral amount λI from the output voltage VOX2 using a map of FIG. 29 prestored in the ROM 33. As seen from FIG. 29, the integral amount λI increases on a positive side according to variation of the output voltage VOX2 toward a richer side and increases on a negative side according to variation of the output voltage VOX2 toward a leaner side. The integral amount λI holds a constant value of 0 (zero) across the stoichiometric air-fuel ratio λ=1 (0.45 V). The integral amount λI is constant at regions where the output voltage VOX2 is richer than a preset value and leaner than a preset value.

Subsequently, a step 1305 determines the skip amount λSK based on the output voltage VOX2. Although not shown, a map similar to the map of FIG. 29 is used for determining the skip amount λSK. In the map, the skip amount λSK, similar to the integral amount λI, generally increases on a positive side and a negative side as the output voltage VOX2 goes away from the stoichiometric air-fuel ratio λ=1.

The routine further proceeds to a step 1306 which determines whether the output voltage VOX2 has been inverted. If no inversion has occurred, i.e. the air-fuel ratio λ downstream of the three way catalytic converter 13 is held on the rich or lean side, a step 1307 corrects the target air-fuel ratio λTG by the integral amount λI (λTG←λTG+λI). Subsequently, the routine proceeds to a step 1308 which resets the interval counter TOSB, and is terminated. On the other hand, if the output voltage VOX2 has been inverted as determined at the step 1306, i.e. the downstream air-fuel ratio λ has been inverted between rich and lean relative to the stoichiometric air-fuel ratio λ=1, a step 1309 corrects the target air-fuel ratio λTG by the skip amount λSK (λTG←λTG+λSK). Thereafter, the routine proceeds to the step 1308, and is terminated.

As described above, the integral amount λI and the skip amount λSK are set to be positive in response to the output voltage VOX2 being on the rich side, so as to correct the target air-fuel ratio λTG toward the lean side. On the other hand, when the output voltage VOX2 is on the lean side, the integral amount λI and the skip amount λSK are set to be negative so as to correct the target air-fuel ratio λTG toward the rich side. Accordingly, the target air-fuel ratio λTG is controlled in a manner similar to the time chart of FIG. 8. Moreover, since the integral amount λI and the skip amount λSK are set to be a larger positive value and a larger negative value as the output voltage VOX2 goes away from 0.45 V corresponding to the stoichiometric air-fuel ratio λ=1, that is, as a larger correction of the target air-fuel ratio λTG is required, the target air-fuel ratio λTG is always corrected properly. As a result, the downstream air-fuel ratio λ can be quickly converged to the stoichiometric air-fuel ratio λ=1.

Further, since the interval counter TOSB is reset at the step 1308 after the target air-fuel ratio λTG was corrected at the step 1307 or 1309, the correction of the target air-fuel ratio λTG is not performed until the interval time Tβ again elapses at the step 1301. This makes it possible to perform a next correction of the target air-fuel ratio λTG based on the output voltage VOX2 upon which the current correction of the target air-fuel ratio λTG is reflected.

Now, a sixth preferred embodiment of the present invention will be described hereinbelow.

The sixth preferred embodiment differs from the first preferred embodiment in how to derive the target air-fuel ratio λTG.

The following description mainly refers to the difference over the first preferred embodiment.

In this preferred embodiment, the output voltages VOX2 of the $O_2$ sensor 27 are averaged to derive an averaged output voltage VOX2AV which is used for setting the target air-fuel ratio λTG.

Figure 30:
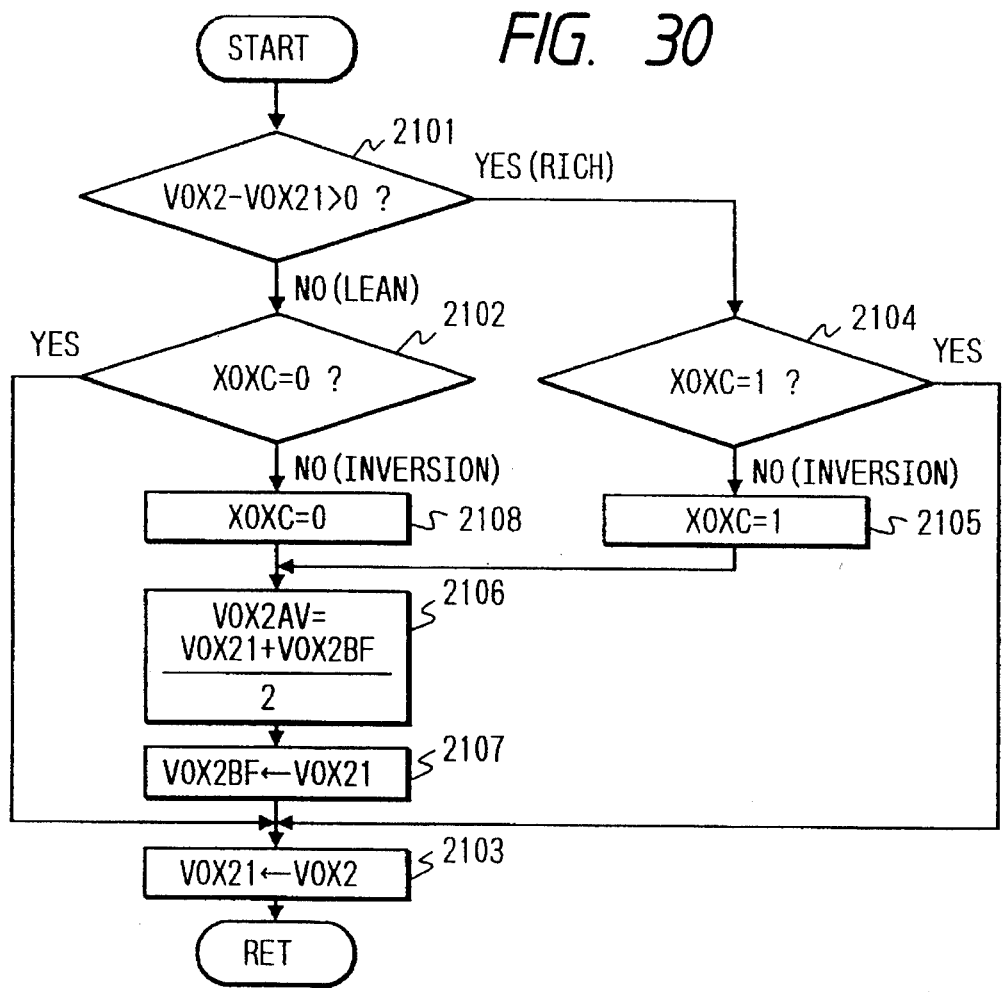
FIG. 30 is a flowchart of an $O_2$ sensor output voltage averaging routine according to a sixth preferred embodiment of the present invention.

FIG. 30 shows a flowchart of a routine to be executed by the CPU 32 for averaging the output voltages VOX2 of the $O_2$ sensor 27. The routine of FIG. 30 is executed per 32 msec, i.e. at every timing when the output voltage VOX2 of the $O_2$ sensor 27 is read in by the CPU 32.

The explanation will be made hereinbelow assuming that, in FIG. 31, a point A represents an output voltage VOX21 which was read in in the last cycle of this routine, and a point B, which is located on a position leaner than the point A, represents a current output voltage VOX2, and that a rich side variation flag XOXC is being cleared. The rich side variation flag XOXC represents, when it is set, that the output voltage VOX2 was varying toward the rich side in the last cycle of this routine.

In FIG. 30, a step 2101 determines whether VOX2–VOX21 is greater than 0 (zero). Since VOX2–VOX21 is less than 0 this time, answer at the step 2101 becomes negative (lean) so that the routine proceeds to a step 2102 which determines whether the rich side variation flag XOXC is cleared. As described above, since the rich side variation flag XOXC is cleared, the routine proceeds to a step 2103 as determining that VOX21 is not a peak value since VOX21 and VOX2 both have been varied toward the lean side. At the step 2103, VOX2 is stored in the RAM 34 as VOX21 for a subsequent cycle of this routine.

Figure 31:
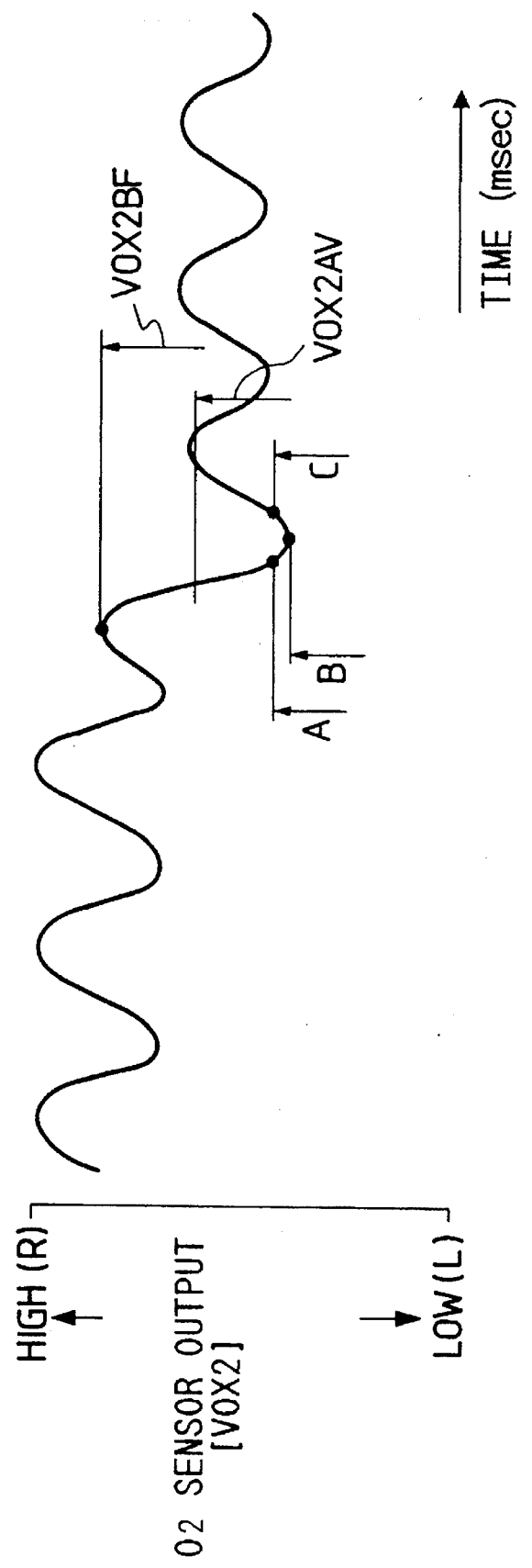
FIG. 31 is a time chart showing details of sapling the output voltage of the $O_2$ sensor, corresponding to a portion A in FIG. 35.

Subsequently, when a new output voltage VOX2 at a point C in FIG. 31 is read in, the step 2101 produces a positive answer (rich) this time so that the routine proceeds to a step 2104 which determines whether the rich side variation flag XOXC is set. Since the rich side variation flag XOXC is cleared, the step 2104 produces a negative answer (inversion) so that the routine proceeds to a step 2105 as determining that VOX21 (point B) is a peak value since VOX21 was varied toward the lean side (to the point B) while VOX2 was varied toward the rich side (to the point C). At the step 2105, the rich side variation flag XOXC is set. Subsequently, the routine proceeds to a step 2106 which derives an output voltage VOX2AV by averaging VOX21 (point B) and a newest peak value VOX2BF stored in the RAM 34. The last peak value VOX2BF represents a peak value when VOX2 was varied toward the rich side last time. Thereafter, a step 2107 stores VOX21 (point B) in the RAM 34 as a newest peak value VOX2BF, and this routine is terminated.

To the contrary, when the inversion has been caused from rich to lean as determined at the step 2102, the routine proceeds to a step 2108 which resets the rich side variation flag XOXC, and further to the step 2106 where the averaged output voltage VOX2AV is derived.

Through the above described averaging routine, the ripple fluctuation of the output voltage VOX2 caused due to the fluctuation of the air-fuel ratio λ is eliminated so that the setting of the target air-fuel ratio λTG can be performed more reliably.

Figure 32:
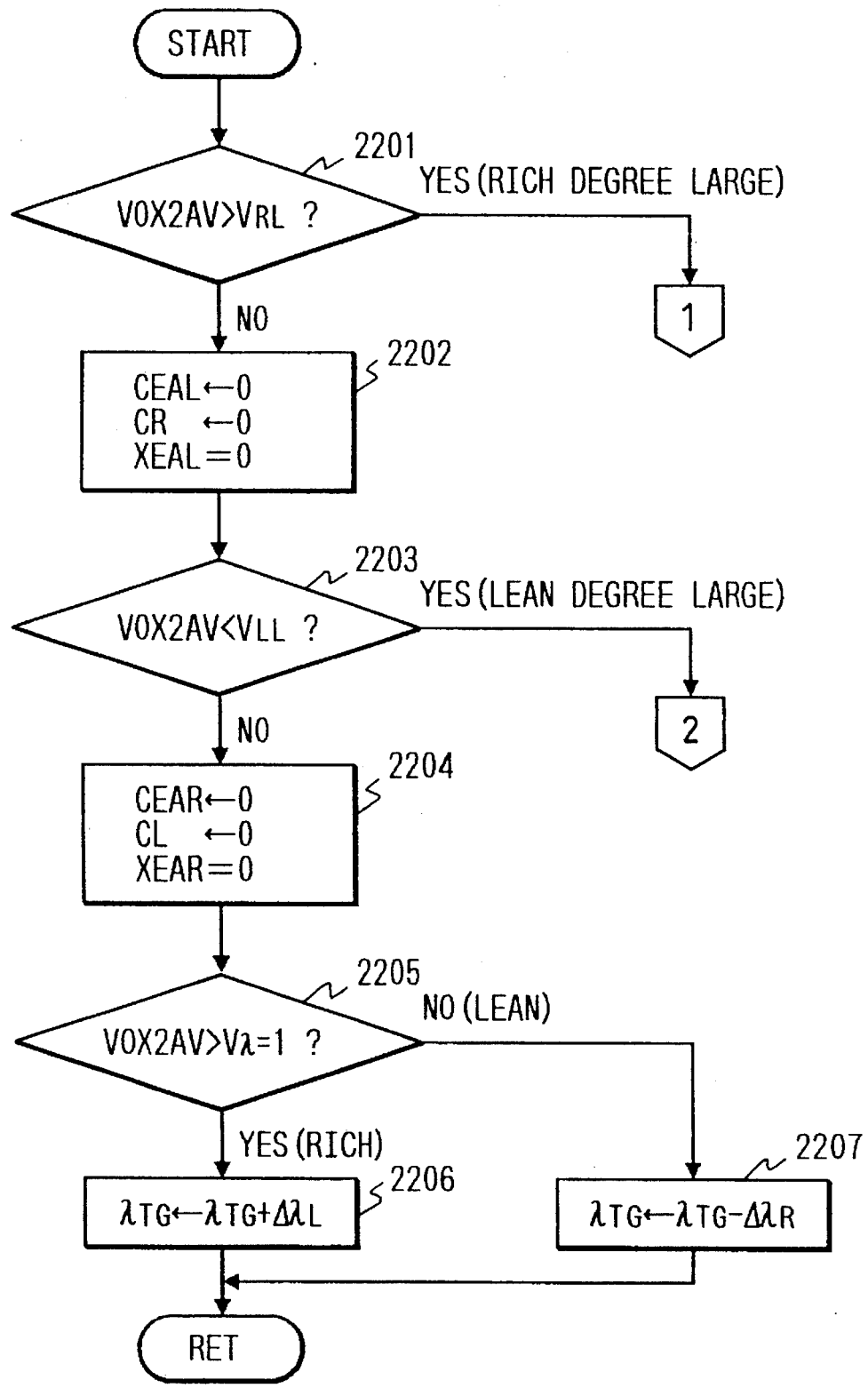
FIGS. 32 to 34 show a flowchart of a saturation skip control routine according to the sixth preferred embodiment.
Figure 33:
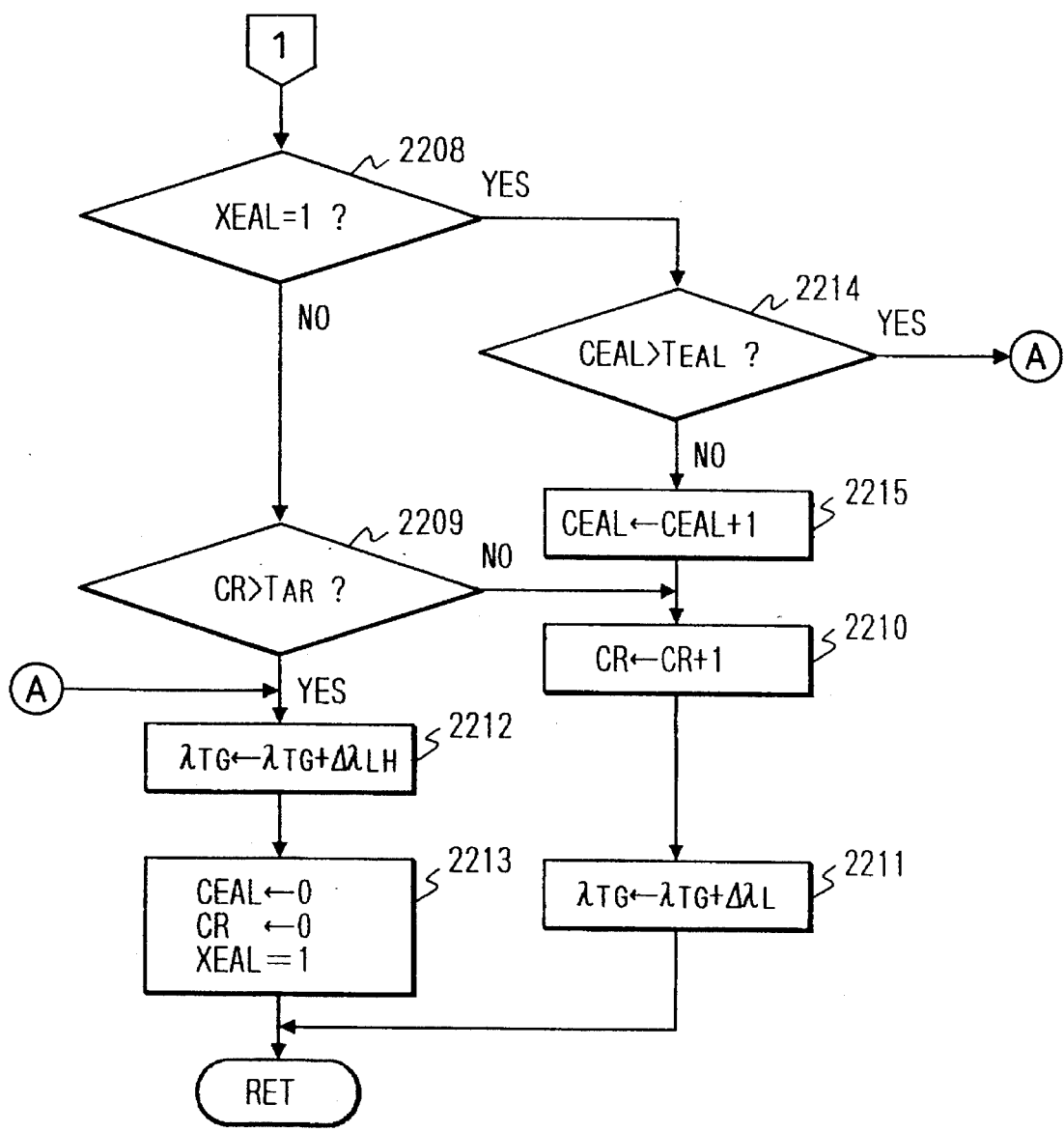
Figure 34:
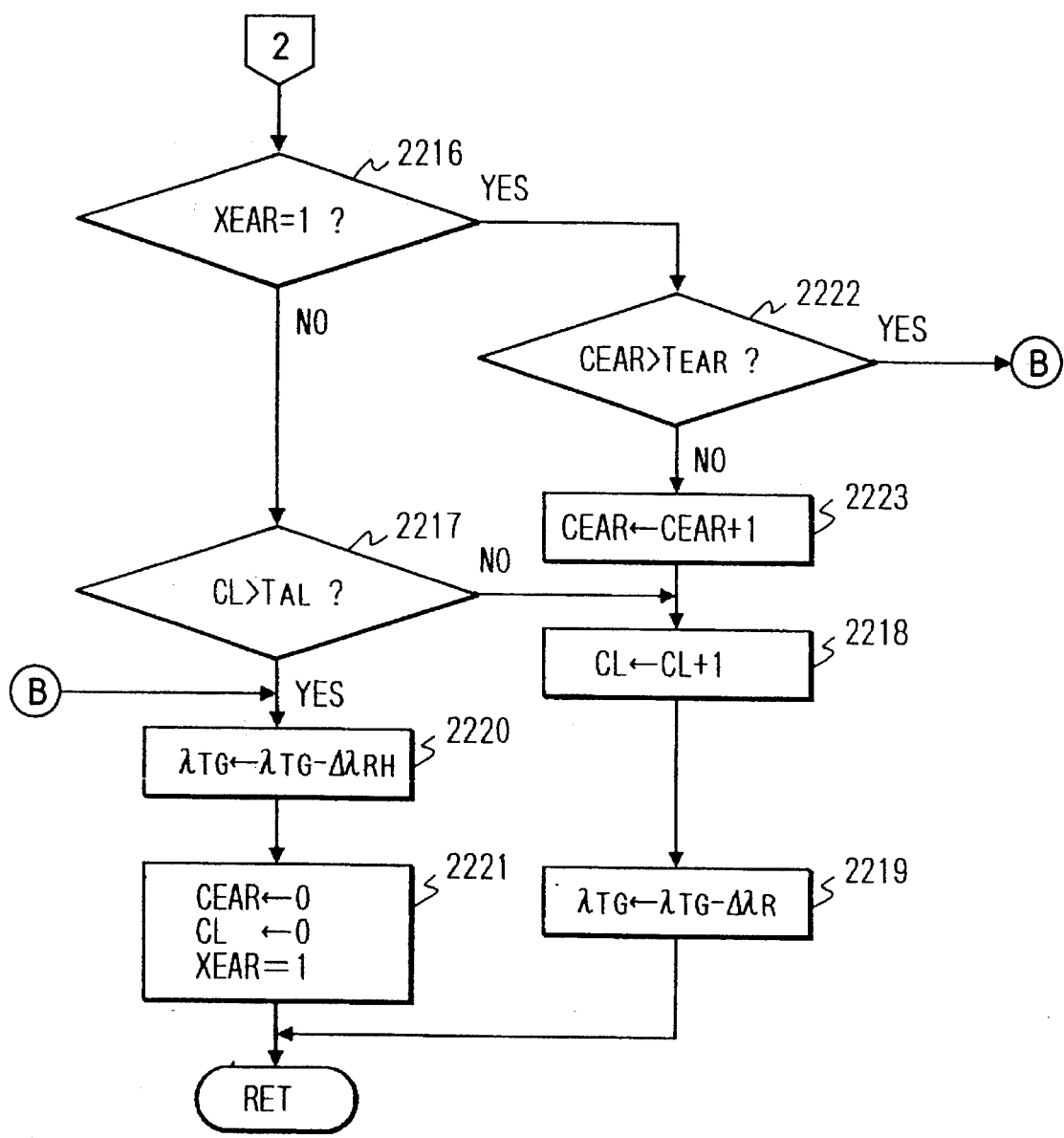

Referring now to FIGS. 32 to 34, a saturation skip control routine will be described hereinbelow, wherein the target air-fuel ratio λTG is set based on the output voltage VOX2AV derived as described above.

The routine shown in FIGS. 32 to 34 is a subroutine corresponding to the step 103 in FIG. 3.

A step 2201 determines whether the output voltage VOX2AV is greater than a preset rich side limit value VRL. IF answer at the step 2201 is negative, i.e. the output voltage VOX2AV is equal to or lower than the rich side limit value VRL, the routine proceeds to a step 2202 as determining that the air-fuel ratio λ downstream of the three way catalytic converter 13 is not largely deviated to the rich side. At the step 2202, a lean interval counter CEAL and a rich staying counter CR are reset, and a lean skip execution flag XEAL is cleared. Subsequently, a step 2203 determines whether the output voltage VOX2AV is lower than a preset lean side limit value VLL. If answer at the step 2203 is negative, the routine proceeds to a step 2204 as determining that the air-fuel ratio λ is not largely deviated to the lean side. At the step 2204, a rich interval counter CEAR and a lean staying counter CL are reset, and a rich skip execution flag XEAR is cleared.

Figure 35:
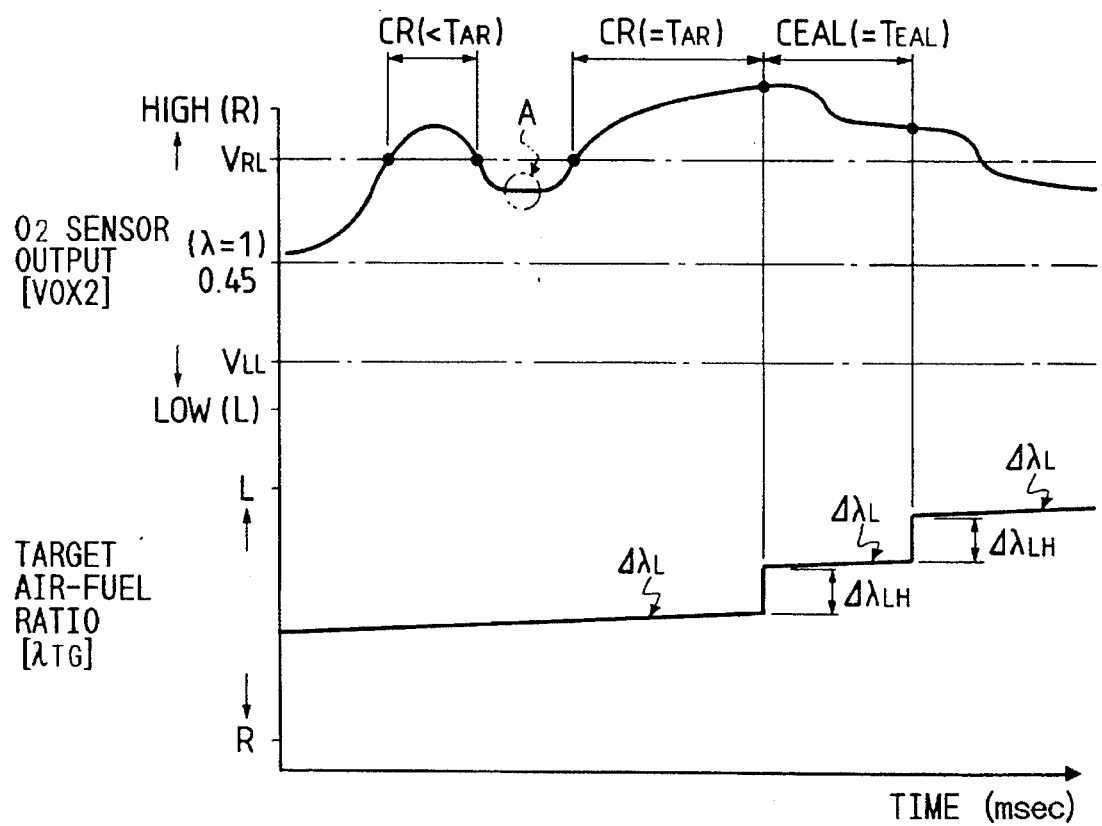
FIGS. 35 is a time chart showing a relation between the output voltage of the $O_2$ sensor and the target air-fuel ratio during the saturation skip control of FIGS. 32 to 34.

Thereafter, the routine proceeds to a step 2205 which determines whether the output voltage VOX2AV is greater than an output voltage Vλ=1 corresponding to the stoichiometric air-fuel ratio λ=1. If answer at the step 2205 is positive (rich), a step 2206 increases the target air-fuel ratio λTG by a lean integral amount ΔλL (λTG←λTG+ΔλL). Accordingly, as shown in FIG. 35, the target air-fuel ratio λTG gradually increases to the lean side. On the other hand, if answer at the step 2205 is negative (lean), a step 2207 gradually decreases the target air-fuel ratio λTG by a rich integral amount ΔλR (λTG←λTG–ΔλR). Specifically, when the output voltage VOX2AV is not largely deviated (VLL<VOX2AV<VRL), the delicate correction of the target air-fuel ratio λTG is performed by the lean integral amount ΔλL or the rich integral amount ΔλR so as to converge the air-fuel ratio λ downstream of the three way catalytic converter 13 to the stoichiometric air-fuel ratio λ=1.

On the other hand, if the step 2201 determines that the output voltage VOX2AV is higher than the rich side limit value VRL, the routine proceeds to a step 2208 (FIG. 33) as determining that the air-fuel ratio λ is largely deviated to the rich side. The step 2208 determines whether the lean skip execution flag XEAL is set. Since the lean skip execution flag XEAL is cleared at the step 2202, the routine proceeds to a step 2209 which determines whether a value of the rich staying counter CR exceeds a preset rich staying time TAR. Since answer at the step 2209 is negative this time, a step 2210 increases the rich staying counter CR by "1". Then, the routine proceeds to a step 2211 which increases the target air-fuel ratio λTG by the lean integral amount ΔλL (λTG←λTG+ΔλL) as at the step 2206, and returns to the step 2201.

Thereafter, the steps 2201, 2208 to 2211 are repeatedly executed. When the output voltage VOX2AV becomes equal to or lower than the rich side limit value VRL at the step 2201 before the value of the rich staying counter CR exceeds the rich staying time TAR at the step 2209, then the Step 2202 and the following steps are executed as described above. On the other hand, if the value of the rich staying counter CR exceeds the rich staying time TAR at the step 2209, then the routine proceeds to a step 2212.

In this preferred embodiment, the rich side limit value VRL and the rich staying time TAR are provided for determining saturation of the three way catalytic converter 13 on the rich side. Specifically, when the output voltage VOX2AV continuously exceeds the rich side limit value VRL for the rich staying time TAR, it is considered that the three way catalytic converter 13 has been saturated on the rich side so that CO and HC can not be adsorbed in the three way catalytic converter 13 any more. In this case, the correction of the target air-fuel ratio λTG by the lean integral amount ΔλL is considered to be insufficient.

Accordingly, the step 2212 increases the target air-fuel ratio λTG by a lean skip amount ΔλLH (λTG←λTG+ΔλLH). Since the lean skip amount ΔλLH is set to be a sufficiently large value in comparison with the lean integral amount ΔλL, the target air-fuel ratio λTG is rapidly increased to the lean side in a skipped manner as shown in FIG. 35. Subsequently, the routine proceeds to a step 2213 where the lean interval counter CEAL and the rich staying counter CR are reset, and the lean skip execution flag XEAL is set.

Now, since the lean skip execution flag XEAL is set at the step 2213, the step 2208 produces a positive answer so that the routine proceeds to a step 2214 which determines whether a value of the lean interval counter CEAL exceeds a preset lean interval time TEAL. IF the step 2214 produces a negative answer, a step 2215 increases the lean interval counter CEAL by "1". Then, the routine executes the steps 2210 and 2211 as described above, and returns to the step 2201. When the output voltage VOX2AV continues to exceed the rich side limit value VRL at the step 2201 even after the correction of the target air-fuel ratio λTG by the lean skip amount ΔλLH was executed at the step 2212 so that the lean interval time TEAL has elapsed at the step 2214, the routine proceeds to a step 2212 which again corrects the target air-fuel ratio λTG by the lean skip amount ΔλLH.

The lean interval time TEAL at the step 2214 represents a time required for the correction of the target air-fuel ratio λTG to be reflected on the output voltage VOX2AV of the $O_2$ sensor 27. Accordingly, at a time point when the lean interval time TEAL has elapsed, it can be precisely determined based on the output voltage VOX2AV whether or not the three way catalytic converter 13 is saturated.

The target air-fuel ratio λTG is corrected to the lean side by the lean skip amount ΔλLH per the lean interval time TEAL until the output voltage VOX2AV becomes equal to or lower than the rich side limit value VRL. When the output voltage VOX2AV becomes equal to or lower than the rich side limit value VRL, the normal correction by the lean integral amount ΔλL is restored at the step 2206.

On the other hand, if the step 2203 determines that the output voltage VOX2AV is lower than the lean side limit value VLL, i.e. the air-fuel ratio λ is largely deviated to the lean side, the routine executes the process similar to the foregoing steps 2201 and 2208 to 2215. Specifically, the routine proceeds to steps 2216 to 2218 (FIG. 34) so as to increase the lean staying counter CL by "1". When a value of the lean staying counter CL exceeds a preset lean staying time TAL at the step 2217, the routine proceeds to a step 2220. As described above in connection with the rich side limit value VRL and the rich staying time TAR, the lean side limit value VLL and the lean staying time TAL are provided for determining saturation of the three way catalytic converter 13 on the lean side. Specifically, when the output voltage VOX2AV is continuously held below the lean side limit value VLL for the lean staying time TAL, it is considered that the three way catalytic converter 13 has been saturated on the lean side so that NOx can not be adsorbed in the three way catalytic converter 13 any more. In this case, the correction of the target air-fuel ratio λTG by the rich integral amount ΔλR is considered to be insufficient. Accordingly, a step 2220 increases the target air-fuel ratio λTG by a rich skip amount ΔλRH (λTG←λTG−ΔλRH) to the rich side in a skipped manner.

Subsequently, at a step 2221, the rich interval counter CEAR, the lean staying counter CL are reset, and the rich skip execution flag XEAR is set. Thereafter, until the output voltage VOX2AV becomes equal to or greater than the lean side limit value VLL at the step 2203, the correction of target air-fuel ratio λTG by the rich skip amount ΔλRH is performed at the step 2220 every time the value of the rich interval counter CEAR exceeds the rich interval time TEAR.

The target air-fuel ratio λTG thus derived is used at the step 104 in FIG. 3 for deriving the air-fuel ratio correction coefficient FAF. Further, the fuel injection amount TAU is derived based on the thus derived air-fuel ratio correction coefficient FAF at the step 105, so as to control the actual fuel injection amount supplied from the fuel injection valve.

Now, a seventh preferred embodiment of the present invention will be described hereinbelow.

Figure 36:
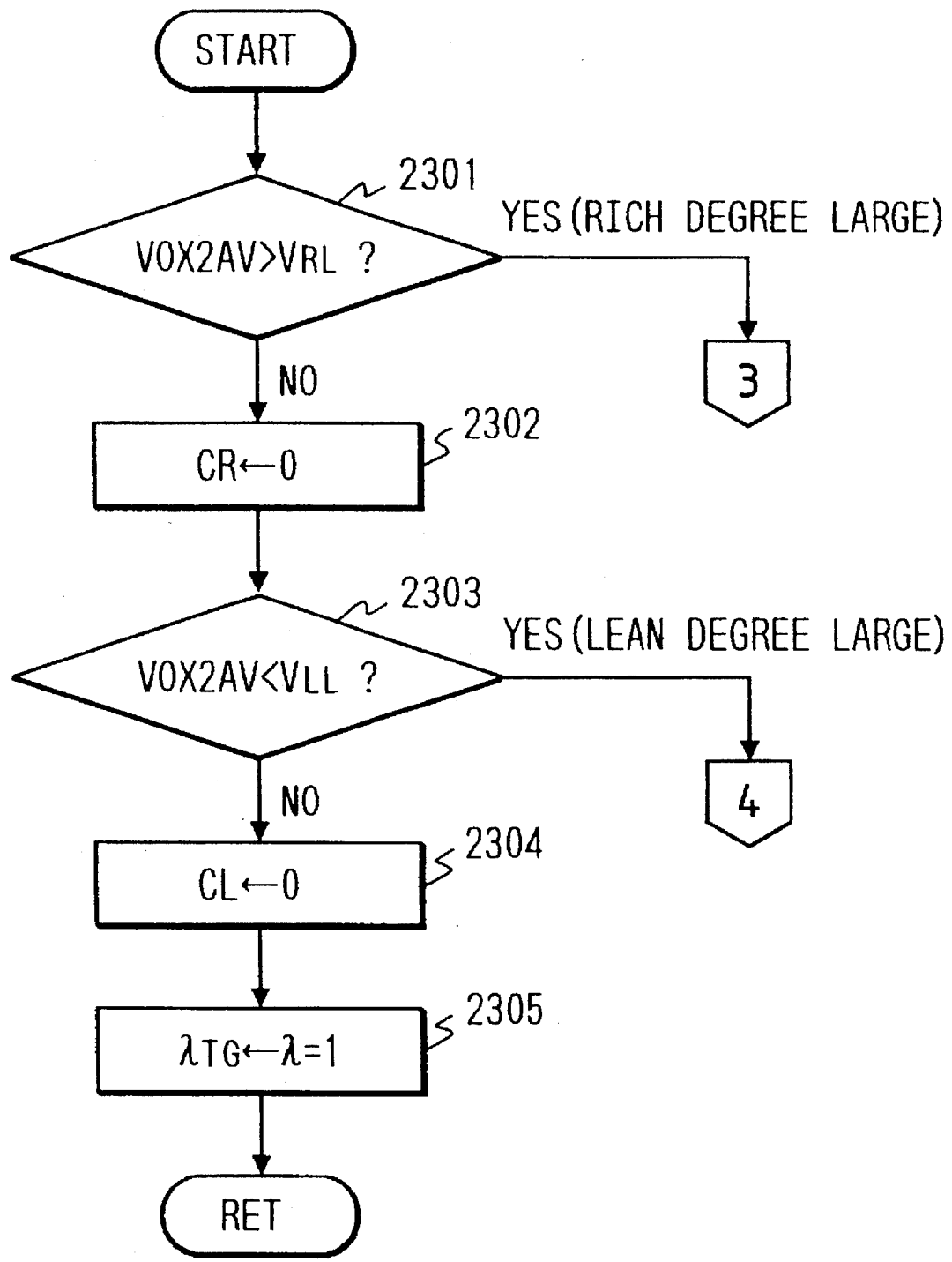
FIGS. 36 to 38 show a flowchart of a saturation skip control routine according to a seventh preferred embodiment of the present invention.
Figure 37:
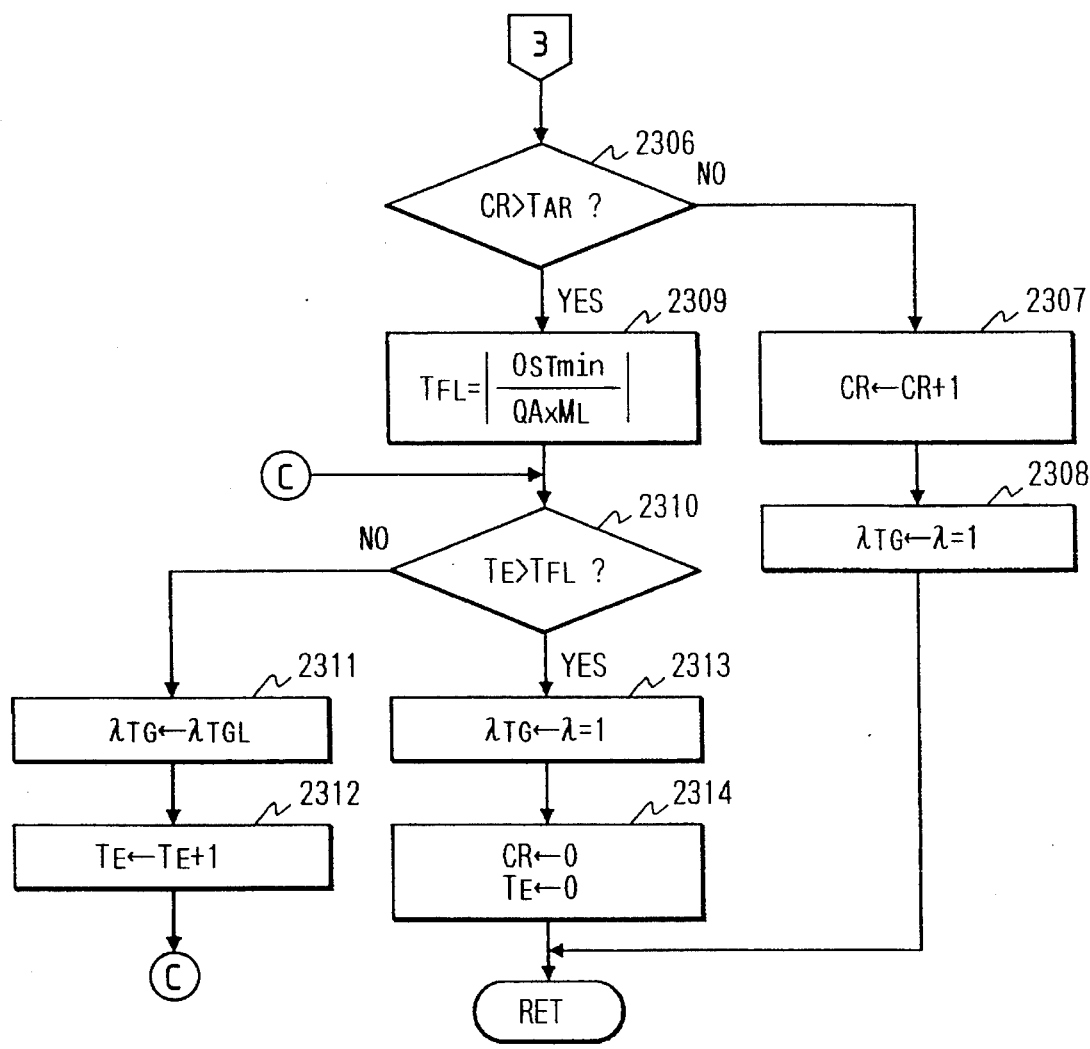
Figure 38:
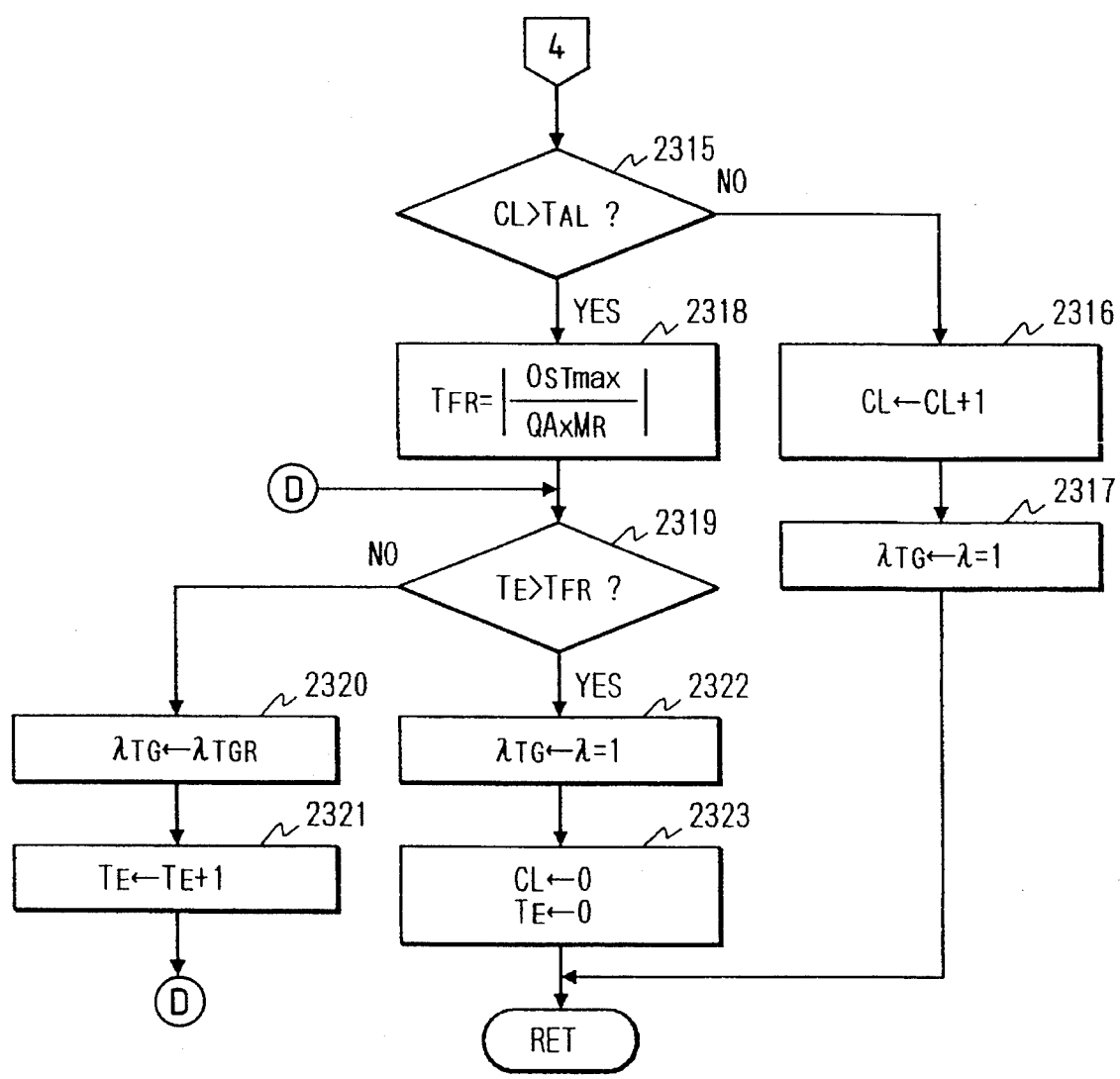

The seventh preferred embodiment differs from the sixth preferred embodiment in that the saturation skip control routine of FIGS. 32 to 34 are replaced by a saturation skip control routine of FIGS. 36 to 38.

The following description mainly refers to the difference over the sixth preferred embodiment.

Figure 39:
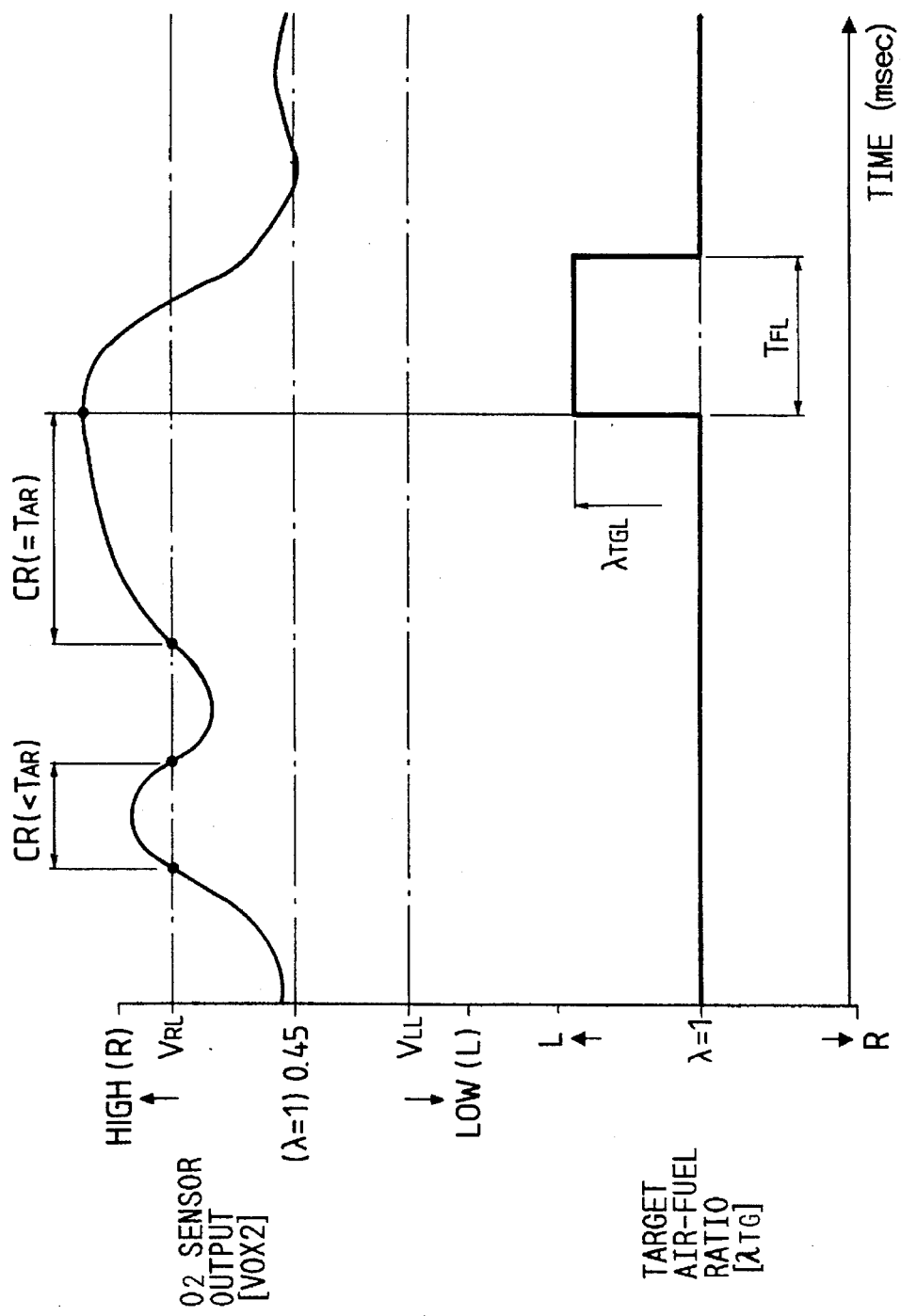
FIG. 39 is a time chart showing a relation between the output voltage of the $O_2$ sensor and the target air-fuel ratio during the saturation skip control of FIGS. 36 to 38.

In FIGS. 36 to 38, a step 2301 determines whether the output voltage VOX2AV of the $O_2$ sensor 27 is higher than the rich side limit value VRL. If answer at the step 2301 is negative, a step 2302 resets the rich staying counter CR. Subsequently, a step 2303 determines whether the output voltage VOX2AV is lower than the lean side limit value VLL. If answer at the step 2303 is negative, a step 2304 resets the lean staying counter CL. Subsequently, the routine proceeds to a step 2305 where the target air-fuel ratio λTG is set to the stoichiometric air-fuel ratio λ=1. Specifically, when the air-fuel ratio λ is not largely deviated (VLL<VOX2AV<VRL), the target air-fuel ratio λTG is held at the stoichiometric air-fuel ratio λ=1 as shown in FIG. 39.

On the other hand, if the output voltage VOX2AV exceeds the rich side limit value VRL at the step 2301, a step 2306 (FIG. 37) determines whether a value of the rich staying counter CR exceed the rich staying time TAR. Since the rich staying time TAR is not exceeded this time, the step 2306 produces a negative answer so that the routine proceeds to a step 2307 which increases the rich staying counter CR by "1". Subsequently, the routine proceeds to a step 2308 where the target air-fuel ratio λTG is set to the stoichiometric air-fuel ratio λ=1 as at the step 2305, and returns to the step 2301.

When the output voltage VOX2AV continues to exceed the rich side limit value VRL at the step 2301 so that the rich staying time TAR has elapsed, the routine proceeds to a step 2309 as determining that the three way catalytic converter 13 is saturated on the rich side. The step 2309 derives a lean time TFL based on the following equation:

$$TFL = |OSTmin/(QA \times ML)|$$

In this equation, OSTmin represents the minimum adsorption amount of the three way catalytic converter 13, i.e. the saturated adsorption amount of the three way catalytic converter 13 on the rich side. Since the minimum adsorption amount OSTmin has been described in detail in the foregoing first preferred embodiment, no further explanation thereof will be made hereinbelow. Further, ML in the equation represents a material concentration corresponding to a preset lean target air-fuel ratio λTGL as shown in a map of FIG. 40. The characteristic of this map is the same as that of the map shown in FIG. 5. Accordingly, in the above equation, the product of the material concentration ML and the intake air amount QA derived based on the engine speed Ne and the intake air pressure PM represents a supply amount of $O_2$ per unit time. Further, the minimum adsorption amount OSTmin used in the above equation is updated through the adsorption amount learning control as shown in FIGS. 11 to 14 so that the up-to-date value thereof is used in the above equation (at the step 2309).

After the lean time TFL is derived at the step 2309, the routine proceeds to a step 2310 which determines whether a value of an execution counter TE exceeds the lean time TFL. Since the lean time TFL is not exceeded this time, the step 2310 produces a negative answer so that the routine proceeds to a step 2311 where the target air-fuel ratio λTG set to the stoichiometric air-fuel ratio λ=1 at the step 2305 is set to the above-noted lean target air-fuel ratio λTGL. Subsequently, the routine proceeds to a step 2312 which increases the execution counter TE by "1", and then returns to the step 2310 to repeat the execution of the steps 2310 to 2312 until the value of the execution counter TE exceeds the lean time TFL at the step 2310, i.e. until the lean time TFL has elapsed at the step 2310. If the lean time TFL has elapsed at the step 2310, the routine proceeds to a step 2313 where the target air-fuel ratio λTG is returned to the stoichiometric air-fuel ratio λ=1. Subsequently, at a step 2314, the rich staying counter CR and the execution counter TE are reset, and then the routine returns to the step 2301.

Accordingly, as shown in FIG. 39, when the output voltage VOX2AV of the $O_2$ sensor 27 continues to exceed the rich side limit value VRL for the rich staying time TAR, the target air-fuel ratio λTG is continuously set to the lean target air-fuel ratio λTGL for the lean time TFL. As a result, CO and HC adsorbed in the three way catalytic converter 13 react with increased $O_2$ in the exhaust gas so as to be substantially completely purged so that the output voltage VOX2AV is quickly restored to near the stoichiometric air-fuel ratio λ=1.

On the other hand, when the output voltage VOX2AV becomes lower than the lean side limit value VLL at the step 2303, the routine executes the process as at the foregoing steps 2301 and 2306 to 2314. Specifically, the routine proceeds from the step 2303 to steps 2315 to 2317 so as to increase the lean staying counter CL by "1". When the value of the lean staying counter CL exceeds a preset lean staying time TAL at the step 2315, the routine proceeds to a step 2318 as determining that the three way catalytic converter 13 is saturated on the lean side. At the step 2318, a rich time TFR is derived based on the following equation:

$$TFL=|OSTmax/(QA \times MR)|$$

Figure 40:
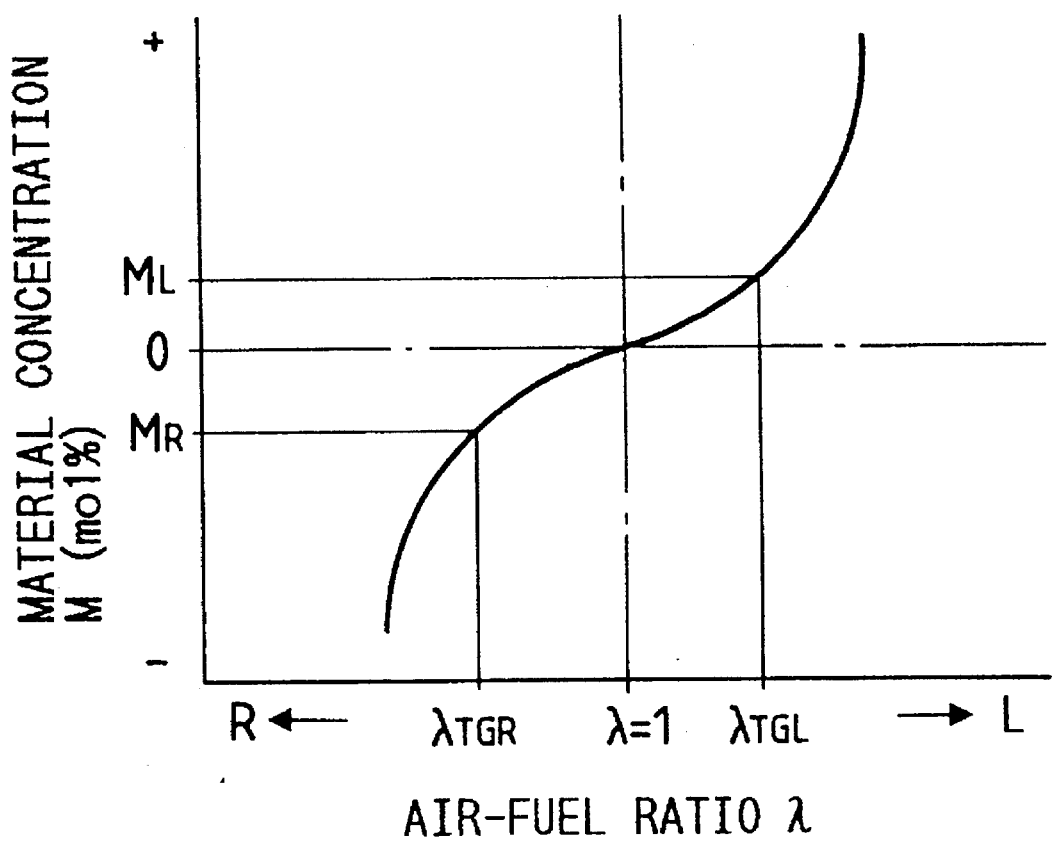
FIG. 40 is a map prestored in the ROM for deriving the material concentration based on the air-fuel ratio.

In this equation, OSTmax represents the minimum adsorption amount of the three way catalytic converter 13, i.e. the saturated adsorption amount of the three way catalytic converter 13 on the lean side. Since the maximum adsorption amount OSTmax has been described in detail in the foregoing first preferred embodiment, no further explanation thereof will be made hereinbelow. Further, MR in the equation represents a material concentration corresponding to a preset rich target air-fuel ratio λTGR and takes a negative value, as shown in the map of FIG. 40. Accordingly, in the above equation, the absolute value of the product of the material concentration MR and the intake air amount QA represents a supply amount of CO and HC per unit time. Further, as the minimum adsorption amount OSTmin, the maximum adsorption amount OSTmax used in the above equation is updated through the adsorption amount learning control as shown in FIGS. 11 to 14 so that the up-to-date value thereof is used in the above equation (at the step 2318).

Subsequently, the routine repeats steps 2319 to 2321 to set the target air-fuel ratio λTG to the rich target air-fuel ratio λTGR until the value of the execution counter TE exceeds the rich time TFR at the step 2319. When the rich time TFR has elapsed at the step 2319, the routine proceeds to a step 2322 where the target air-fuel ratio λTG is returned to the stoichiometric air-fuel ratio λ=1. Accordingly, when the output voltage VOX2AV continues to be below the lean side limit value VLL for the lean staying time TAL, the target air-fuel ratio λTG is continuously set to the rich target air-fuel ratio λTGR for the rich time TFR. Accordingly, $O_2$ adsorbed in the three way catalytic converter 13 react with increased CO and HC in the exhaust gas so as to be substantially completely purged so that the output voltage VOX2AV is quickly restored to near the stoichiometric air-fuel ratio λ=1.

As in the sixth preferred embodiment, the target air-fuel ratio λTG thus derived is used at the step 104 in FIG. 3 for deriving the air-fuel ratio correction coefficient FAF. Further, the fuel injection amount TAU is derived based on the thus derived air-fuel ratio correction coefficient FAF at the step 105, so as to control the actual fuel injection amount supplied from the fuel injection valve.

In this preferred embodiment, when the three way catalytic converter 13 is saturated, substantially all the harmful components adsorbed in the three way catalytic converter 13 are purged at a time using the saturated adsorption amount, i.e. the minimum or maximum adsorption amount OSTmin, OSTmax, the lean or rich target air-fuel ratios λTGL, λTGR and the lean or rich time TFL, TFR so that the adsorption capacity of the three way catalytic converter 13 is quickly restored to the neutral state.

Further, in this preferred embodiment, the output voltage VOX2AV averaged through the averaging routine in FIG. 30 may be used in the adsorption amount learning control in FIGS. 11 to 14.

Now, an eighth preferred embodiment of the present invention will be described hereinbelow.

The eighth preferred embodiment differs from the foregoing preferred embodiments in how to derive the air-fuel ratio correction coefficient FAF.

The following description mainly refers to the difference over the foregoing preferred embodiments.

Figure 41:
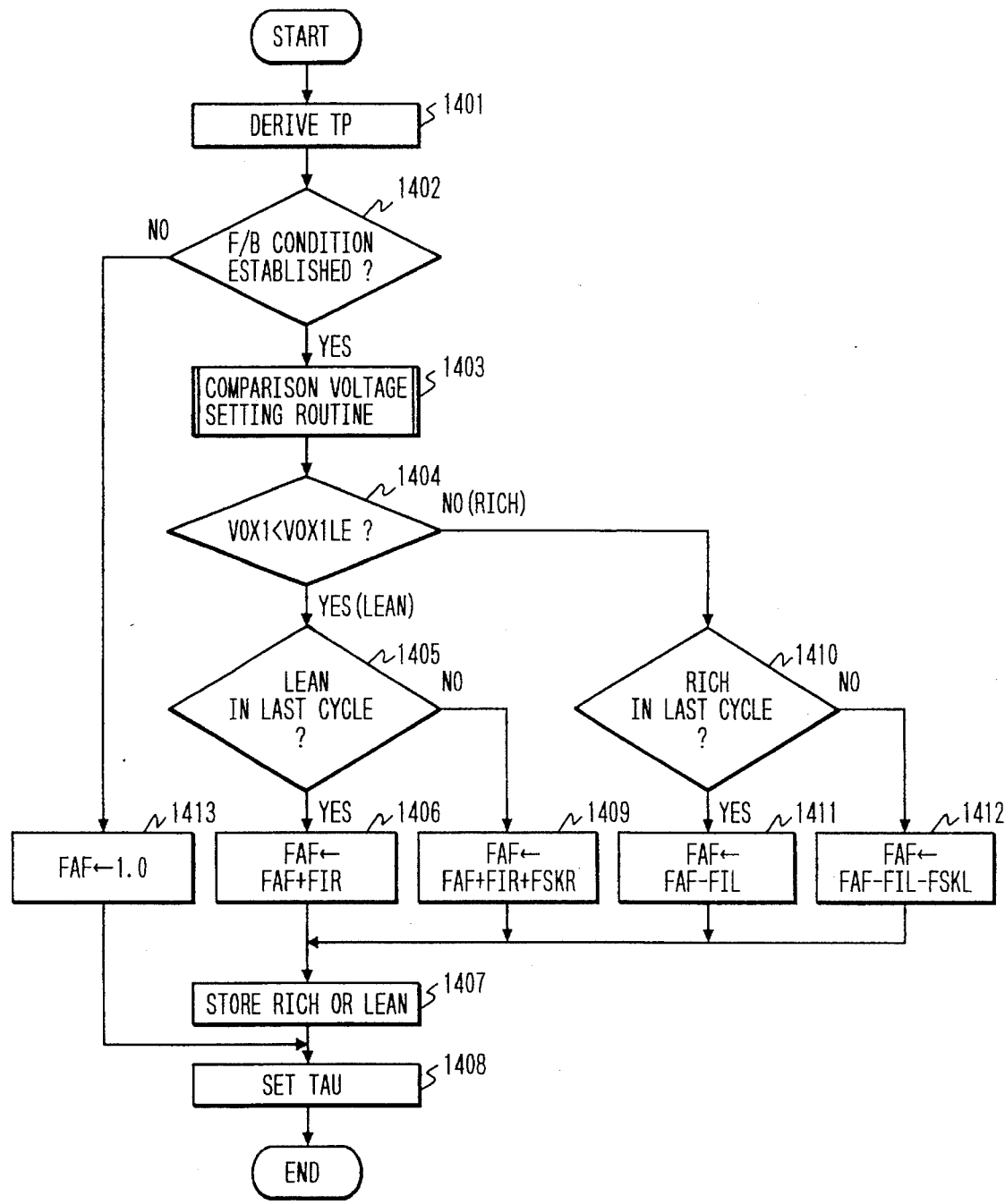
FIG. 41 is a flowchart of a fuel injection amount deriving routine according to an eighth preferred embodiment of the present invention.
Figure 42:
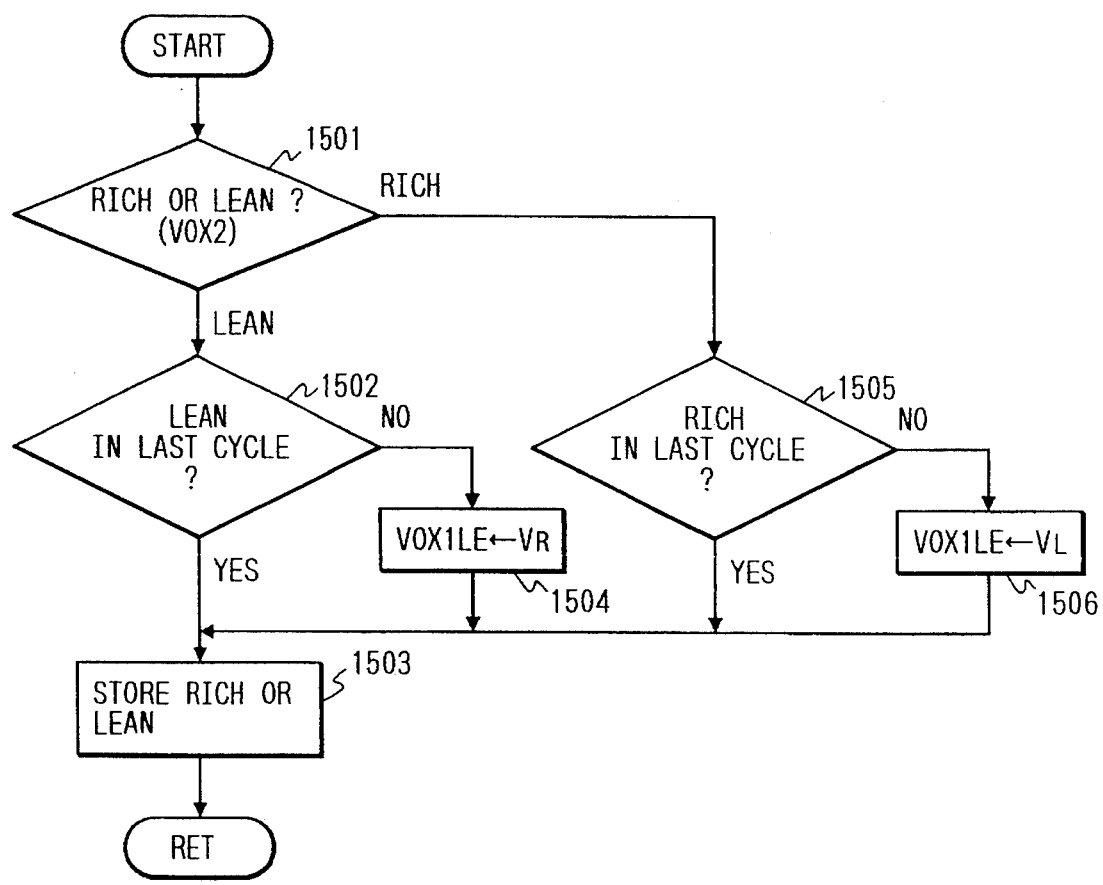
FIG. 42 is a flowchart of a comparison voltage setting routine according to the eighth preferred embodiment.

FIG. 41 shows a flowchart of a fuel injection amount deriving routine to be executed by the CPU 32, according to the eighth preferred embodiment, and FIG. 42 shows a flowchart of a comparison voltage setting routine to be executed by the CPU 32, according to the eighth preferred embodiment.

In this preferred embodiment, in place of the A/F sensor 26, an $O_2$ sensor 41 is arranged upstream of the three way catalytic converter 13 as shown in FIG. 1. Hereinbelow, the $O_2$ sensor 41 will be referred to as "the upstream $O_2$ sensor 41", and the $O_2$ sensor 27 will be referred to as "the downstream $O_2$ sensor 27" so as to make clear distinction therebetween.

Referring to FIG. 41, at a step 1401, the basic fuel injection amount Tp is derived in the same manner as at the step 101 in FIG. 3. A subsequent step 1402 determines whether the feedback control condition for the air-fuel ratio λ is established in the same manner as at the step 102 in FIG. 3. When the step 1402 determines that the feedback control condition is established, the routine proceeds to a step 1403 where the comparison voltage setting routine shown in FIG. 42 is executed.

In FIG. 42, a step 1501 determines whether the output voltage VOX2 of the downstream $O_2$ sensor 27 is higher (rich) or lower (lean) than 0.45 V. If answer at the step 1501 is "lower (lean)", the routine proceeds to a step 1502 which determines whether the output voltage VOX2 was on the lean side in the last cycle of this routine. If answer at the step 1502 is positive, the routine proceeds to a step 1503 which stores "lean" in the RAM 34 as a polarity of the air-fuel ratio λ downstream of the three way catalytic converter 13, and is terminated. On the other hand, if the step 1502 determines that the output voltage VOX2 was on the rich side in the last cycle of this routine, the routine proceeds to a step 1504 where a comparison voltage VOX1LE is set to VR which is a preset rich side voltage. Accordingly, the comparison voltage VOX1LE is set on the rich side. Subsequently, "lean" is stored in the RAM 34 at the step 1503.

On the other hand, if answer at the step 1501 is "higher (rich)", the routine proceeds to a step 1505 which determines whether the output voltage VOX2 was on the rich side in the last cycle of this routine. If answer at the step 1505 is positive, the routine proceeds to the step 1503 which stores "rich" in the RAM 34. On the other hand, if the step 1505 determines that the output voltage VOX2 was on the lean side in the last cycle of this routine, the routine proceeds to a step 1506 where the comparison voltage VOX1LE is set to VL which is a preset lean side voltage. Accordingly, the comparison voltage VOX1LE is set on the lean side. Thereafter, "rich" is stored in the RAM 34 at the step 1503.

Figure 43:
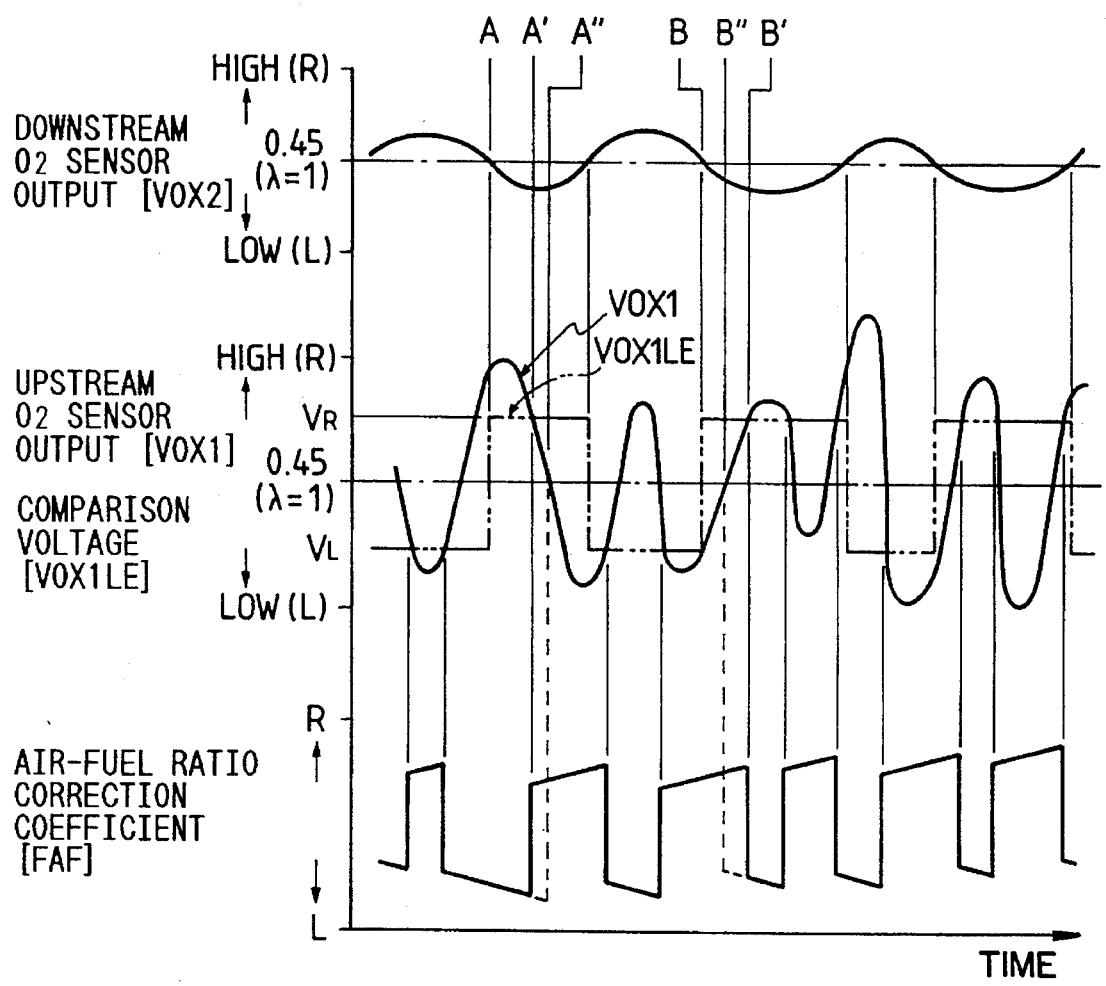
FIG. 43 is a time chart showing a relation among the output voltage of the downstream $O_2$ sensor, an output voltage of an upstream $O_2$ sensor, the comparison voltage and an air-fuel ratio correction coefficient in the eighth preferred embodiment.

Accordingly, as shown in FIG. 43, when the output voltage VOX2 has been inverted between rich and lean, the comparison voltage VOX1LE is set on a side opposite to a direction of the inversion at the step 1504 or 1506. As seen in FIG. 43, the rich side voltage VR and the lean side voltage VL are set at intervals equal to each other with respect to the stoichiometric air-fuel ratio λ=1. Further, an interval between the rich and lean Side voltages VR and VL is set to be smaller than a detection range of the air-fuel ratio λ by the upstream $O_2$ sensor 41.

Referring back to FIG. 41, the routine now proceeds to a step 1404 which determines whether an output voltage VOX1 of the upstream $O_2$ sensor 41 is smaller than the comparison voltage VOX1LE which was set in the routine of FIG. 42. If answer at the step 1404 is positive, i.e. the output voltage VOX1 is lean with respect to the comparison voltage VOX1LE, the routine proceeds to a step 1405 which determines whether the output voltage VOX1 was lean relative to the comparison voltage VOX1LE in the last cycle of this routine. If answer at the step 1405 is positive, a step 1406 corrects the air-fuel ratio correction coefficient FAF by a rich integral amount FIR (FAF←FAF+FIR) so that the air-fuel ratio correction coefficient FAF is corrected to be a larger (richer) value. This rich integral value FIR is set to be very small so that, as shown in FIG. 43, the air-fuel ratio correction coefficient FAF gradually increases on the rich side. Subsequently, the routine proceeds to a step 1407 which stores "lean" in the RAM 34 as a polarity of the air-fuel ratio λ upstream of the three way catalytic converter 13. The routine further proceeds to a step 1408 where, as at the step 105 in FIG. 3, the fuel injection amount TAU is set based on the basic fuel injection amount Tp, the air-fuel ratio correction coefficient FAF and another known correction coefficient FALL, using the following equation:

$$TAU=Tp+FAF+FALL$$

After setting the fuel injection amount TAU, this routine is terminated.

On the other hand, if answer at the step 1405 is that the output voltage VOX1 was rich relative to the comparison voltage VOX1LE, a step 1409 corrects the air-fuel ratio correction coefficient FAF by the rich integral amount FIR and a rich skip amount FSKR (FAF←FAF+FIR+FSKR) so that the air-fuel ratio correction coefficient FAF is corrected to be a larger (richer) value. This rich skip amount FSKR is set to be sufficiently large in comparison with the rich integral value FIR. Accordingly, as shown in FIG. 43, the air-fuel ratio correction coefficient FAF is rapidly increased in a skipped manner from the lean side to the rich side. Subsequently, the routine proceeds to the step 1407 which stores "lean" in the RAM 34. Thereafter, the step 1408 sets the fuel injection amount TAU, and this routine is terminated.

On the other hand, if the step 1404 determines that the output voltage VOX1 of the upstream $O_2$ sensor 41 is equal to or greater than the comparison voltage VOX1LE, i.e. rich relative to the comparison voltage VOX1LE, a step 1410 determines whether the output voltage VOX1 was higher (rich) than the comparison voltage VOX1LE in the last cycle of this routine. If answer at the step 1401 is "higher (rich)", the routine proceeds to a step 1411 which corrects the air-fuel ratio correction coefficient FAF by a lean integral amount FIL (FAF←FAF−FIL) so that the air-fuel ratio correction coefficient FAF gradually decreases on the lean side. On the other hand, if answer at the step 1410 is that the output voltage VOX1 was lean relative to the comparison voltage VOX1LE, a step 1412 corrects the air-fuel ratio correction coefficient FAF by the lean integral amount FIL and a lean skip amount FSKL (FAF←FAF−FIL−FSKL) so that the air-fuel ratio correction coefficient FAF rapidly decreases in a skipped manner from the rich side to the lean side.

The routine proceeds to the step 1407 from the step 1411 or 1412 to store "rich" in the RAM 34, and further proceeds to the step 1408 to set the fuel injection amount TAU, and is terminated.

As described above, the air-fuel ratio correction coefficient FAF is controlled by the integral amounts FIR, FIL and the skip amounts FSKR, FSKL so as to deviate between the rich and lean sides with respect to the comparison voltage VOX1LE. Since the comparison voltage VOX1LE is always set on a side opposite to the inversion direction of the output voltage VOX2 of the downstream $O_2$ sensor 27, the air-fuel ratio correction coefficient FAF is also corrected to a side opposite to the inversion direction of the output voltage VOX2 so that the downstream air-fuel ratio λ deviated to the rich or lean side is restored to the stoichiometric air-fuel ratio λ=1 quickly.

For example, when the comparison voltage VOX1LE is set on the rich side at points A and B, a timing of the air-fuel ratio correction coefficient FAF skipping to the rich side is advanced from a point A" to a point A', and a timing of the air-fuel ratio correction coefficient FAF skipping to the lean side is retarded from a point B" to a point B'. Accordingly, the air-fuel ratio correction coefficient FAF is controlled to the rich side as a whole so that the downstream air-fuel ratio λ deviated to the lean side is effectively corrected to the rich side. On the other hand, when the comparison voltage VOX1LE is set on the lean side, the air-fuel ratio correction coefficient FAF is controlled to the lean side as opposed to the above so that the downstream air-fuel ratio λ deviated to the rich side is effectively corrected to the lean side.

Figure 52:
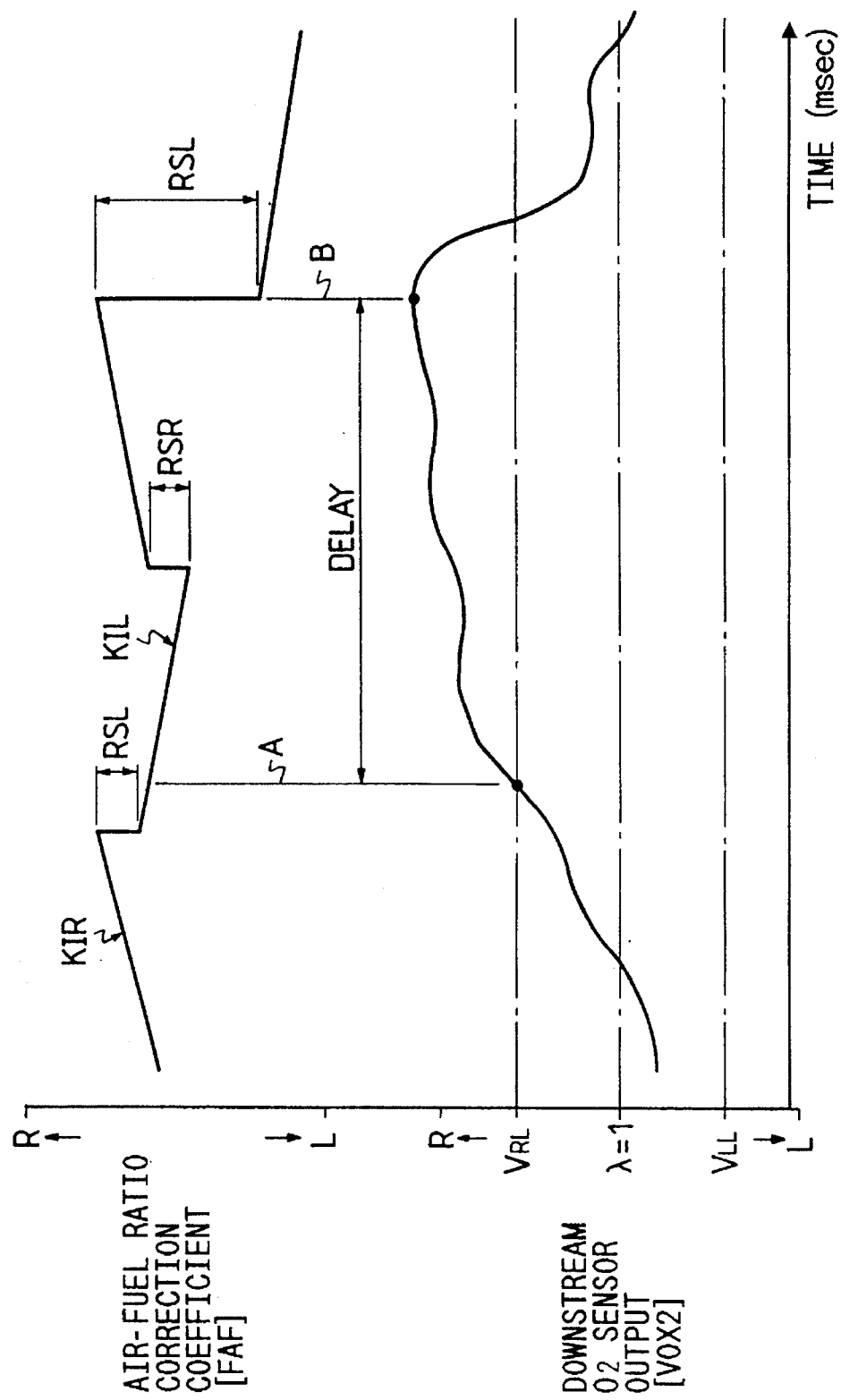
FIG. 52 is a time chart showing a relation between the air-fuel ratio correction coefficient and the output voltage of the downstream $O_2$ sensor, according to a conventional air-fuel ratio control system for an internal combustion engine.

Further, since the air-fuel ratio correction coefficient FAF is corrected by changing the comparison voltage VOX1LE, the variation of the output voltage VOX2 of the downstream $O_2$ sensor 27 is quickly reflected on the air-fuel ratio correction coefficient FAF, as opposed to the foregoing prior art of FIG. 52. Accordingly, the fuel injection amount TAU is controlled highly responsive to the fluctuation of the downstream air-fuel ratio λ. As a result, the output voltage VOX2 fluctuates at short cycles and with small amplitudes with respect to 0.45 V so that the air-fuel ratio λ of the exhaust gas having passed through the three way catalytic converter 13 converges to the stoichiometric air-fuel ratio λ=1.

Referring back to the step 1402 in FIG. 41, when the feedback control condition for the air-fuel ratio λ is not established, the routine proceeds to a step 1413 where the air-fuel ratio correction coefficient FAF is set to "1", and then proceeds to the step 1408.

At the step 1408, various correction coefficients may be reflected on the fuel injection amount TAU in addition to the basic fuel injection amount Tp and the air-fuel ratio correction coefficient FAF. For example, as described in the second preferred embodiment, a correction coefficient may be a multiplier for periodically fluctuating the fuel injection amount TAU so as to perform the dither control, or a correction coefficient which depends on, such as, an engine cooling water temperature Thw may be a multiplier for deriving the fuel injection amount TAU.

Now, a ninth preferred embodiment of the present invention will be described hereinbelow.

The ninth preferred embodiment differs from the eighth preferred embodiment in that the comparison voltage VOX1LE is corrected by the integral control using integral amounts VIR, VIL and by the skip control using skip amounts VSKR, VSKL, that these integral amounts VIR, VIL and the skip amounts VSKR, VSKL are varied depending on a deterioration-condition of the three way catalytic converter 13, and that the comparison voltage VOX1LE at the time of the downstream air-fuel ratio λ converging to the stoichiometric air-fuel ratio λ=1 is learned.

The following description mainly refers to the difference over the eighth preferred embodiment.

Figure 44:
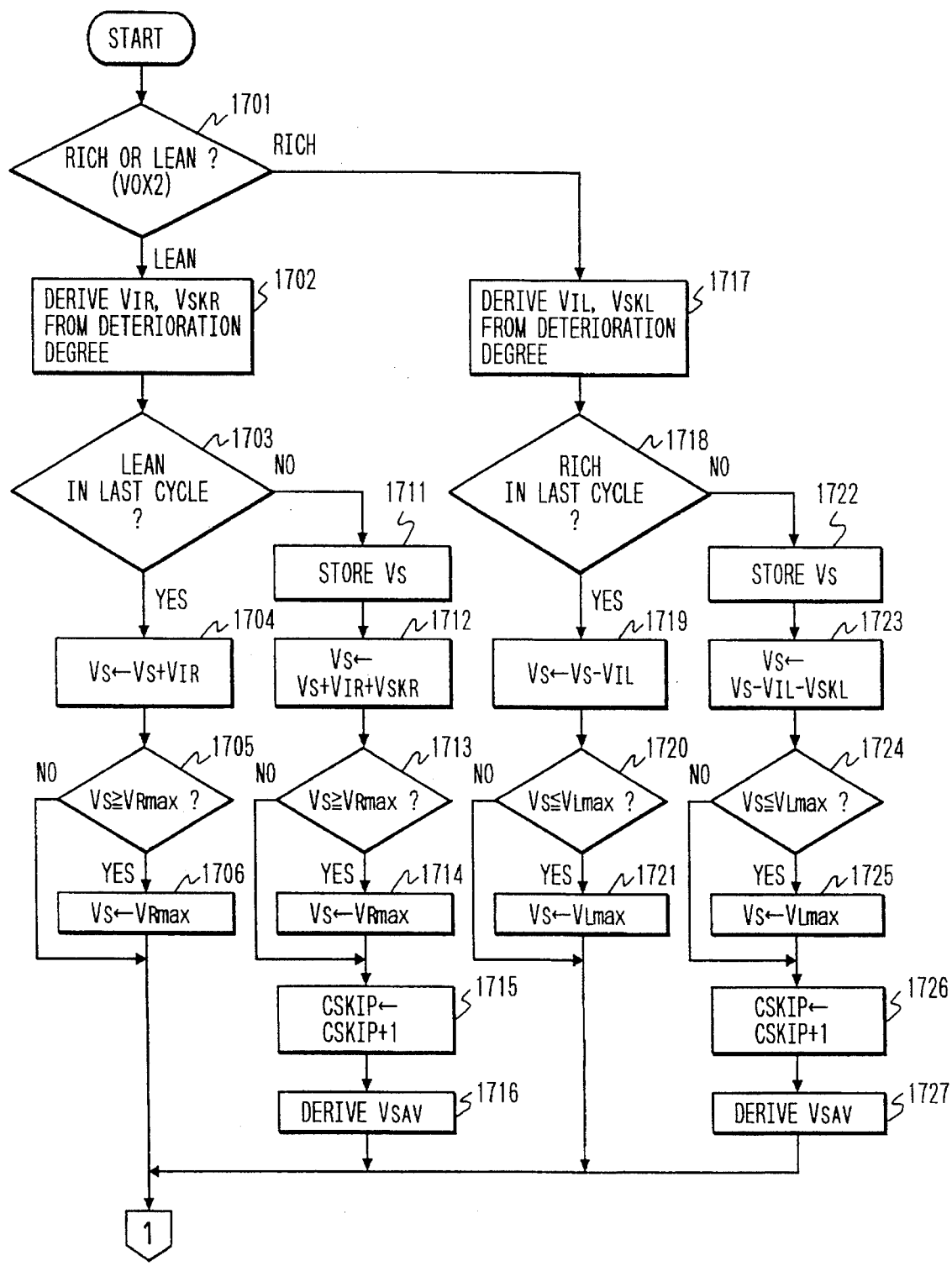
FIGS. 44 and 45 show a flowchart of a comparison voltage setting routine according to a ninth preferred embodiment of the present invention.
Figure 45:
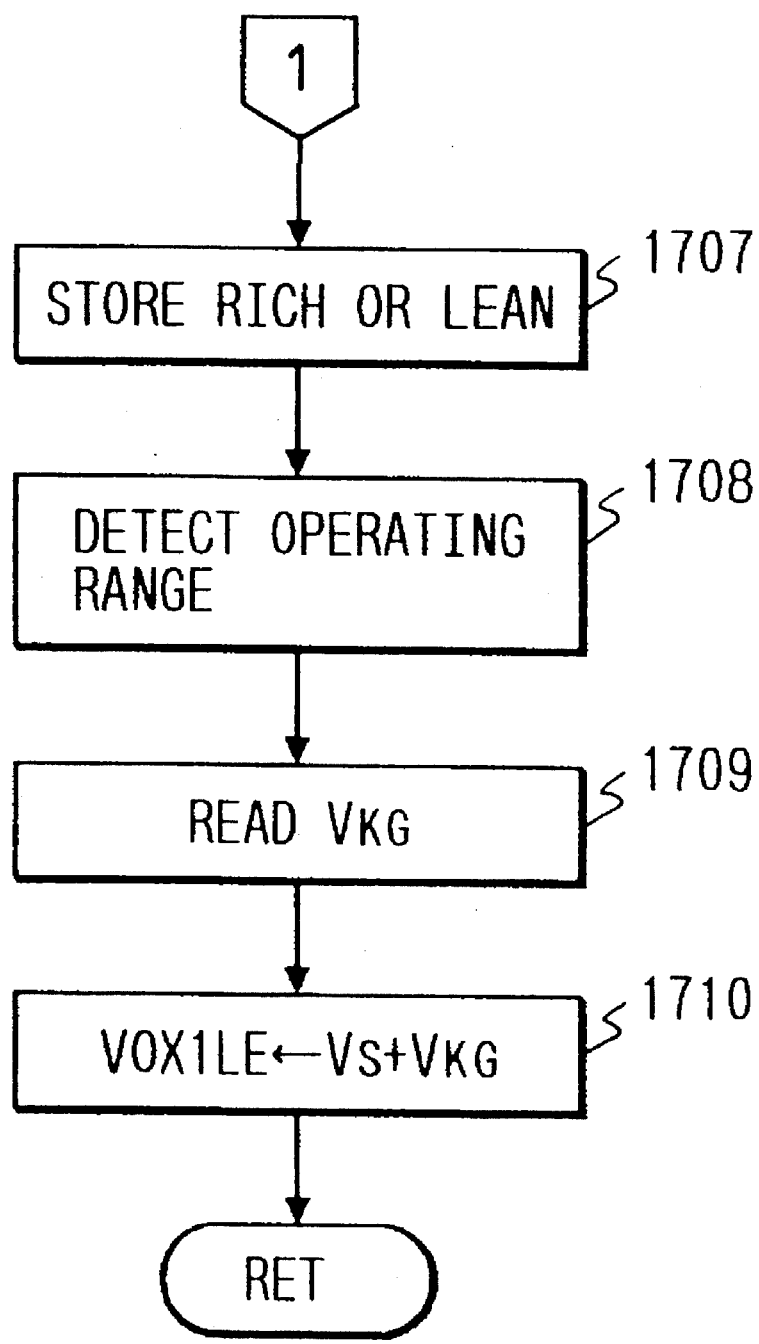
Figure 46:
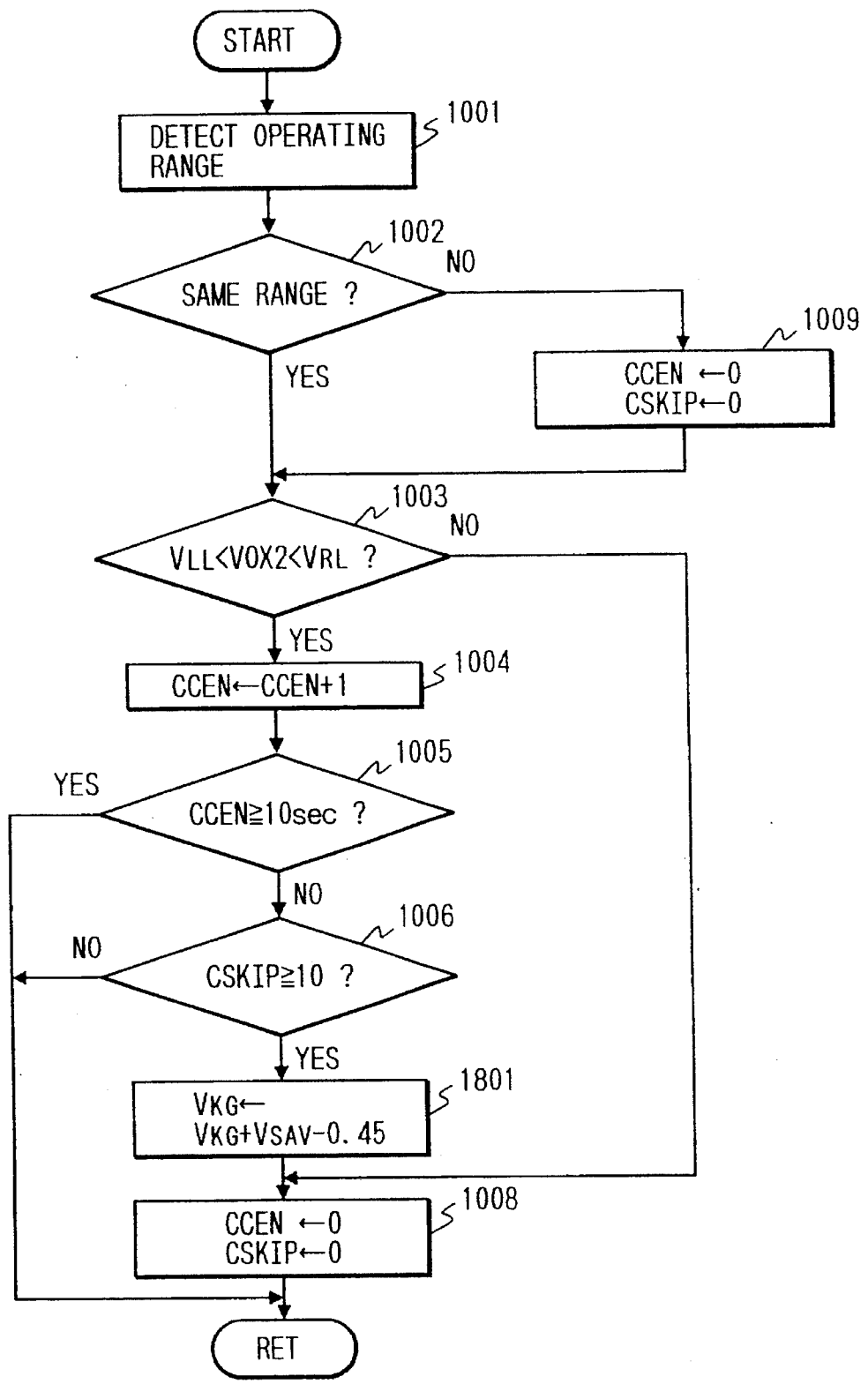
FIG. 46 is a flowchart of a comparison voltage learning routine according to the ninth preferred embodiment.

FIGS. 44 and 45 show a flowchart of a comparison voltage setting routine to be executed by the CPU 32, according to the ninth preferred embodiment. FIG. 46 shows a flowchart of a comparison voltage learning routine to be executed by the CPU32, according to the ninth preferred embodiment.

Figure 47:
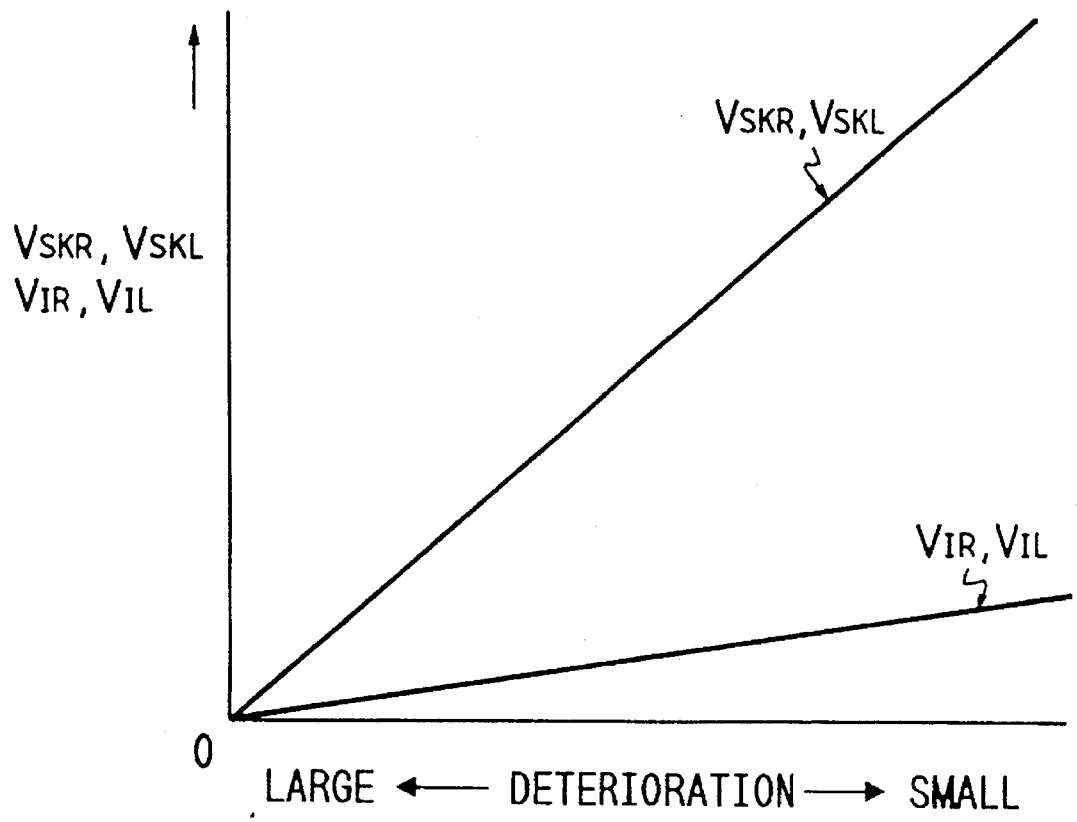
FIG. 47 is a map prestored in the ROM for deriving the integral amount and the skip amount based on a deterioration condition of the three way catalytic converter.

When the routine proceeds to the step 1403 in FIG. 41, a step 1701 in FIG. 44 determines whether the output voltage VOX2 of the downstream $O_2$ sensor 27 is higher (rich) or lower (lean) than 0.45 V. If "lower (lean)" is determined, a step 1702 derives the rich integral amount VIR and the rich skip amount VSKR based on a current deterioration degree or condition of the three way catalytic converter 13, using a map 36 prestored in the ROM 33. In this preferred embodiment, since the upstream $O_2$ sensor 41 is used in place of the A/F sensor 26, specific values of the maximum and minimum adsorption amounts OSTmax, OSTmin can not be derived based on the monitored air-fuel ratio λ upstream of the three way catalytic converter 13, as opposed to the foregoing first preferred embodiment. Accordingly, in this preferred embodiment, the deterioration condition of the three way catalytic converter 13 is determined using, for example, the determining methods as disclosed in Japanese First (unexamined) Patent Publication No. 61- 286550 or No. 3-253714. As shown in FIG. 47, as the deterioration advances, the rich integral amount VIR and the rich skip amount VSKR are derived to be smaller.

Subsequently, the routine proceeds to a step 1703 which determines whether the output voltage VOX2 was on the lean side. If answer is positive, a step 1704 corrects a basic comparison voltage VS by the integral amount VIR (VS←VS+VIR), thus to the rich side. The routine further proceeds to steps 1705 and 1706 where the basic comparison voltage VS is guarded by a rich side limit value VRmax. Thereafter, a step 1707 in FIG. 45 stores "lean" in the RAM 34 as a polarity of the air-fuel ratio λ downstream of the three way catalytic converter 13. Subsequently, a step 1708 detects a current engine operating range, and a step 1709 reads out a learned value VKG corresponding to the detected engine operating range from the backup RAM 35 which stores the learned value VKG per engine operating range. The routine further proceeds to a step 1710 where the comparison voltage VOX1LE is derived based on the basic comparison voltage VS and the learned value VKG (VOX1LE←VS+VKG), and is terminated.

Figure 20:
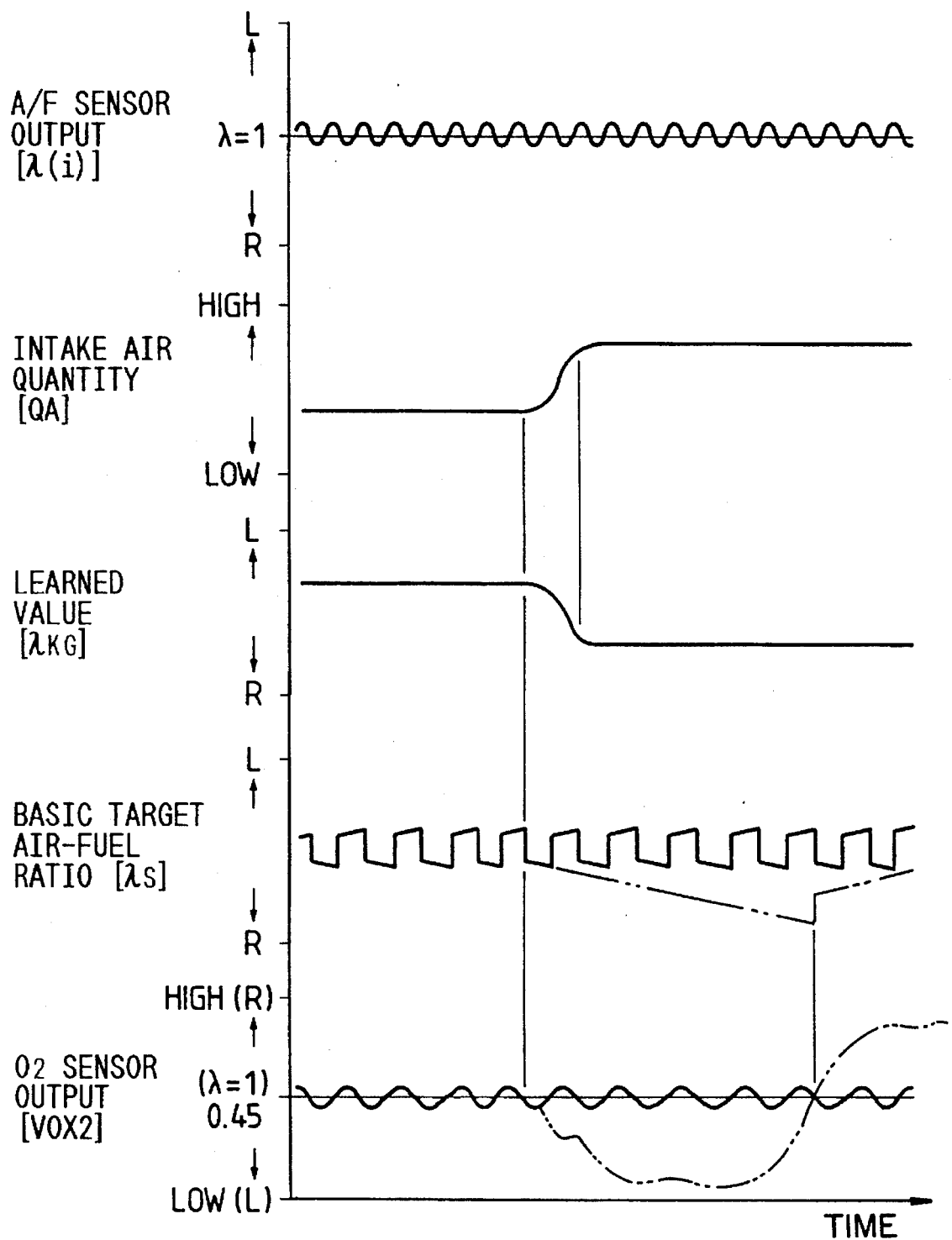
FIG. 20 is a time chart showing a relation among the output of the air-fuel ratio sensor, an intake air quantity, a leaned value, a basic target air-fuel ratio and the output of the $O_2$ sensor during the inversion skip control of FIG. 16.

The engine operating range is set based on, for example, the intake air quantity QA, the throttle opening degree TH and the vehicular speed as shown in FIG. 20, and the learned value VKG is learned per engine operating range by executing the comparison voltage learning routine in FIG. 46.

Referring back to the step 1703, when the output voltage VOX2 was on the rich side in the last cycle of this routine, the routine proceeds to a step 1711 which stores a current value of the basic comparison voltage VS in the RAM 34. Thereafter, a step 1712 corrects the basic comparison voltage VS by the rich integral amount VIR and the rich skip amount VSKR (VS←VS+VIR+VSKR), thus to the rich side. Through steps 1713 and 1714, the basic comparison voltage VS is guarded by the rich side limit value VRmax. Subsequently, a step 1715 increases a skip number counter CSKIP by "1". The skip number counter CSKIP counts the number of the skip corrections. Then, at a step 1716, a mean voltage VSAV is derived by averaging the basic comparison voltage VS stored in the RAM 34 at the step 1711 and the basic comparison voltage VS derived through the steps 1712 to 1714. Thereafter, the steps 1707 to 1710 are executed as described above.

Referring back to the step 1701, when the output voltage VOX2 is on the rich side, a step 1717 derives the lean integral amount VIL and the lean skip amount VSKL based on the map of FIG. 47. Subsequently, when a step 1718 determines that the output voltage VOX2 was on the rich side in the last cycle of this routine, the routine proceeds to a step 1719 which corrects the basic comparison voltage VS by the lean integral amount VIL (VS←VS− VIL), thus to the lean side. Through steps 1720 and 1721, the basic comparison voltage VS is guarded by a lean side limit value VLmax. Thereafter, the routine proceeds to the step 1707 which stores "rich" in the RAM 34, and further proceeds to the steps 1708 to 1710.

On the other hand, when the step 1718 determines that the output voltage VOX2 was on the lean side in the last cycle of this routine, a step 1722 stores a current value of the basic comparison voltage VS in the RAM 34. Subsequently, a step 1723 corrects the basic comparison voltage VS by the lean integral amount VIL and the lean skip amount VSKL (VS←VS−VIL−VSKL), thus to the lean side. Through steps 1724 and 1725, the basic comparison voltage VS is guarded by the lean side limit value VLmax. Then, at a step 1726, the skip number counter CSKIP is increased by "1". Thereafter, a step 1727 derives the mean voltage VSAV by averaging the basic comparison voltage VS stored in the RAM 34 at the step 1722 and the basic comparison voltage VS derived through the steps 1723 to 1725. The routine now proceeds to the step 1707 which stores "rich" in the RAM 34, and further to the steps 1708 to 1710.

Referring now to FIG. 46, the comparison voltage learning routine in this figure is the same as the target air-fuel ratio learning routine in FIG. 17 except for a step 1801 which replaces the step 1007 in FIG. 17. Accordingly, when it is determined that the skip number per unit time is large through the steps 1005 and 1006, the step 1801 updates the learned value VKG for the corresponding engine operating range, using the mean voltage VSAV currently derived at the step 1716 or 1727 in FIG. 44 (VKG←VKG+VSAV0− 0.45).

Figure 48:
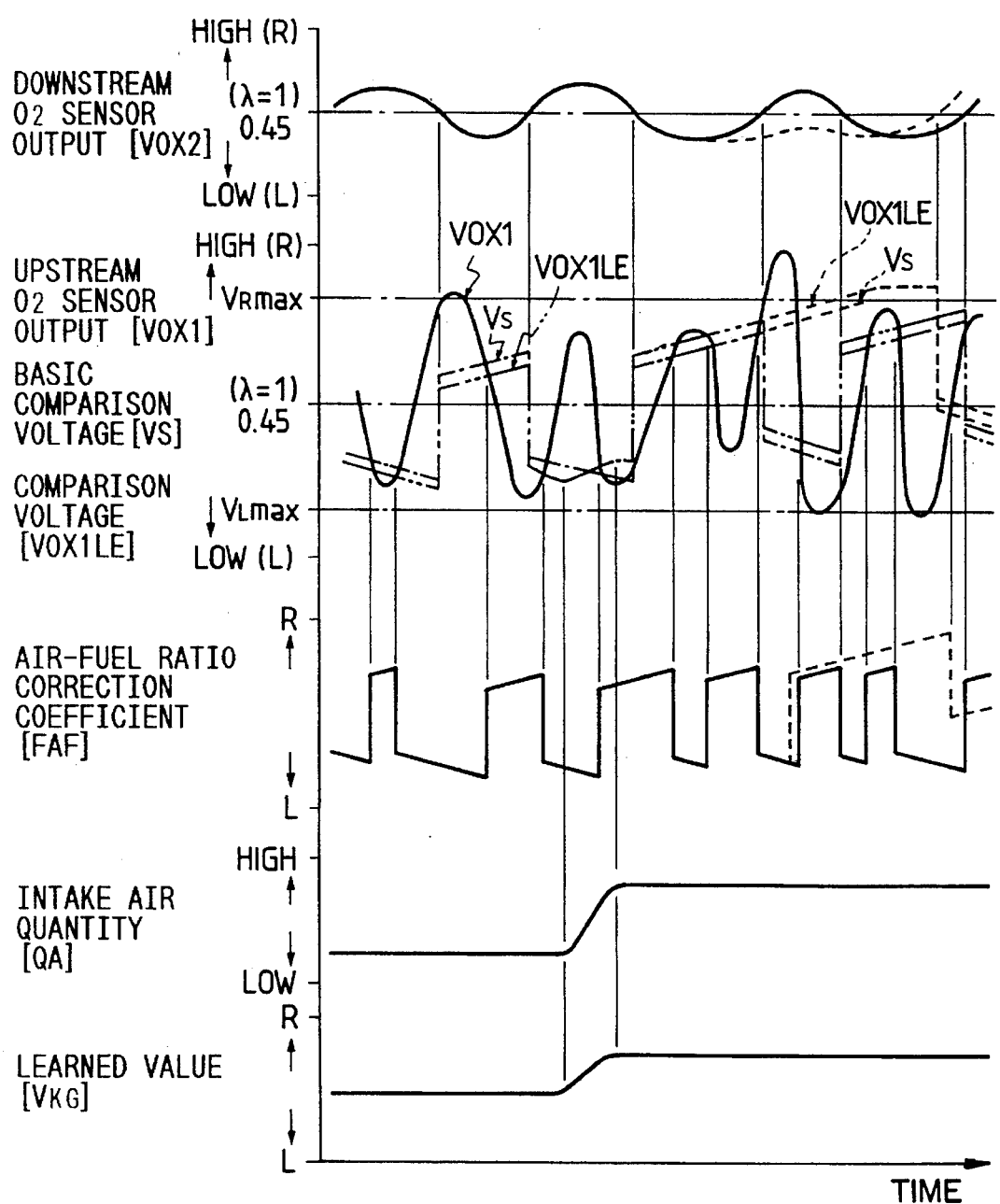
FIG. 48 is a time chart showing a relation among the output voltage of the downstream $O_2$ sensor, the output voltage of the upstream $O_2$ sensor, a basic comparison voltage, the comparison voltage, the air-fuel ratio correction coefficient, the intake air quantity and the learned value in the ninth preferred embodiment.

As described above, in this preferred embodiment, not only the skip control of the comparison voltage VOX1LE is performed at the inversion of the output voltage VOX2 as in the sixth preferred embodiment, but also the integral control of the comparison voltage VOX1LE is performed by the integral amounts VIR, VIL while the output voltage VOX2 is continuously deviated on the rich side or the lean side, as indicated by a two-dot chain line in FIG. 48. Accordingly, since the comparison voltage VOX1LE is increased in a direction opposite to that of the deviation of the output voltage VOX2 even during no inversion of the comparison voltage VOX1LE, the downstream air-fuel ratio $\lambda$ is more reliably converged to the stoichiometric air-fuel ratio $\lambda=1$. FIG. 48 also shows the basic comparison voltage VS guarded by the rich side limit value VRmax.

Further, since the integral amounts VIR, VIL and the skip amounts VSKR, VSKL are derived to be smaller as the deterioration degree of the three way catalytic converter 13 advances, a variation width of the comparison voltage VOX1LE is decreased. Accordingly, a variation width of the air-fuel ratio correction coefficient FAF is also decreased so that, as in the first preferred embodiment, the excess correction beyond the adsorption limit of the three way catalytic converter 13 is effectively prevented.

Moreover, as described above, the basic comparison voltages VS at the time of convergence of the downstream air-fuel ratio $\lambda$ to the stoichiometric air-fuel ratio $\lambda=1$ are learned per engine operating rage so as to update the learned value VKG, and this updated learned value VKG is reflected on the comparison voltage VOX1LE. Specifically, as shown in FIG. 48, when the intake air quantity QA increases to change the engine operating rage, the corresponding rich side learned value VKG is read out to immediately correct the comparison voltage VOX1LE toward the rich side. Accordingly, the correction delay, which is otherwise caused due to the change in engine operating range, is effectively prevented to hold the three way catalytic converter 13 at the neutral state, as in the foregoing second preferred embodiment.

Now, a tenth preferred embodiment of the present invention will be described hereinbelow.

The tenth preferred embodiment differs from the eighth preferred embodiment in that a downstream air-fuel ratio correction coefficient FAFR is set corresponding to the comparison voltage VOX1LE, and this correction coefficient FAFR is reflected on derivation of the fuel injection amount TAU.

The following description mainly refers to the difference over the eighth preferred embodiment.

Figure 49:
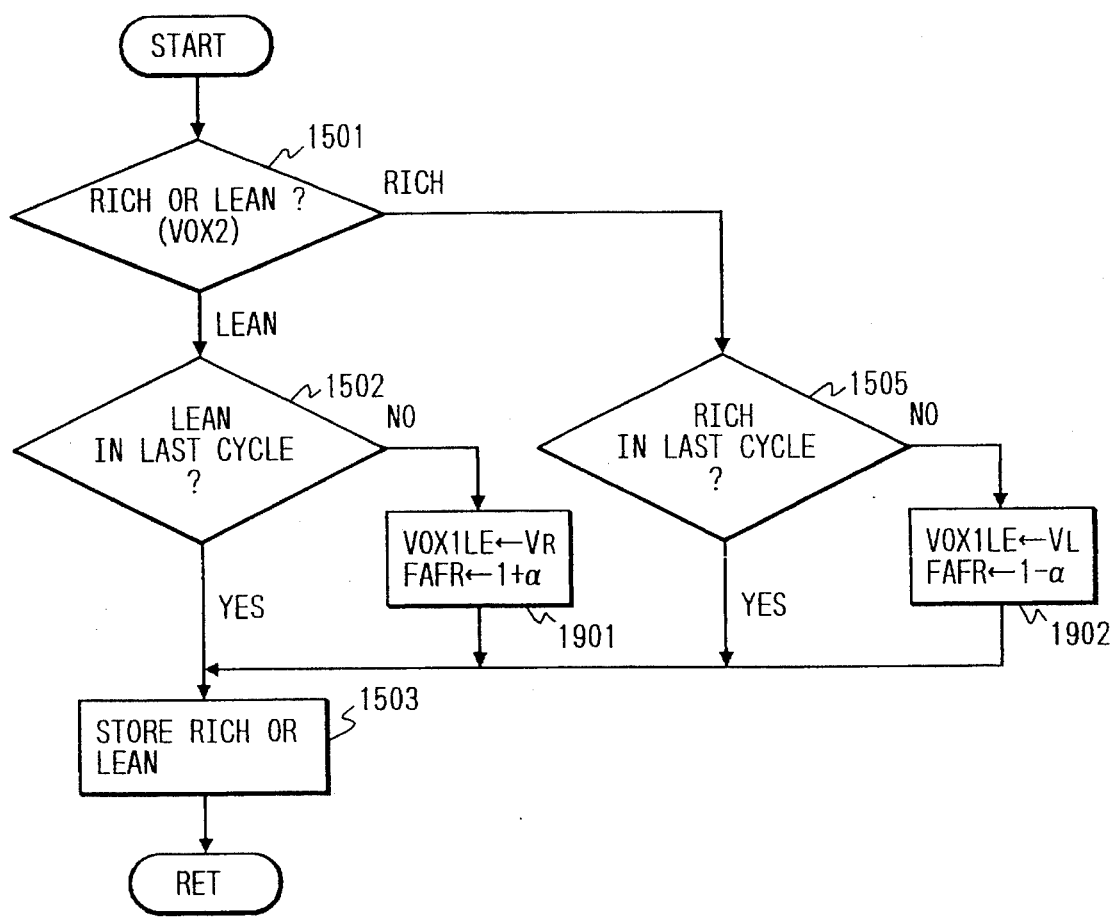
FIG. 49 is a flowchart of a comparison voltage setting routine according to a tenth preferred embodiment.

FIG. 49 shows a flowchart of a comparison voltage setting routine to be executed by the CPU 32, according to the tenth preferred embodiment.

The routine of FIG. 49 is the same as the comparison voltage setting routine of FIG. 42 except for steps 1901 and 1902 which replace the steps 1504 and 1506 in FIG. 42. Accordingly, when the output voltage VOX2 has been inverted from rich to lean as determined at the step 1502, the routine proceeds to the step 1901 where the comparison voltage VOX1LE is set to the preset rich side voltage VR on the rich side with respect to the stoichiometric air-fuel ratio $\lambda=1$, and further, the downstream air-fuel ratio correction coefficient FAFR is corrected to the rich side (FAFR←1+α, wherein α is a displacement amount). To the contrary, when the output voltage VOX2 has been inverted from lean to rich as determined at the step 1505, the routine proceeds to the step 1902 where the comparison voltage VOX1LE is set to the preset lean side voltage VL on the lean side, and further, the downstream air-fuel ratio correction coefficient FAFR is corrected to the lean side (FAFR←1−α).

The downstream air-fuel ratio correction coefficient FAFR is used at the step 1408 in FIG. 41 for deriving the fuel injection amount TAU based on the following equation:

$$TAU=Tp+FAF+FAFR+FALL$$

Figure 50:
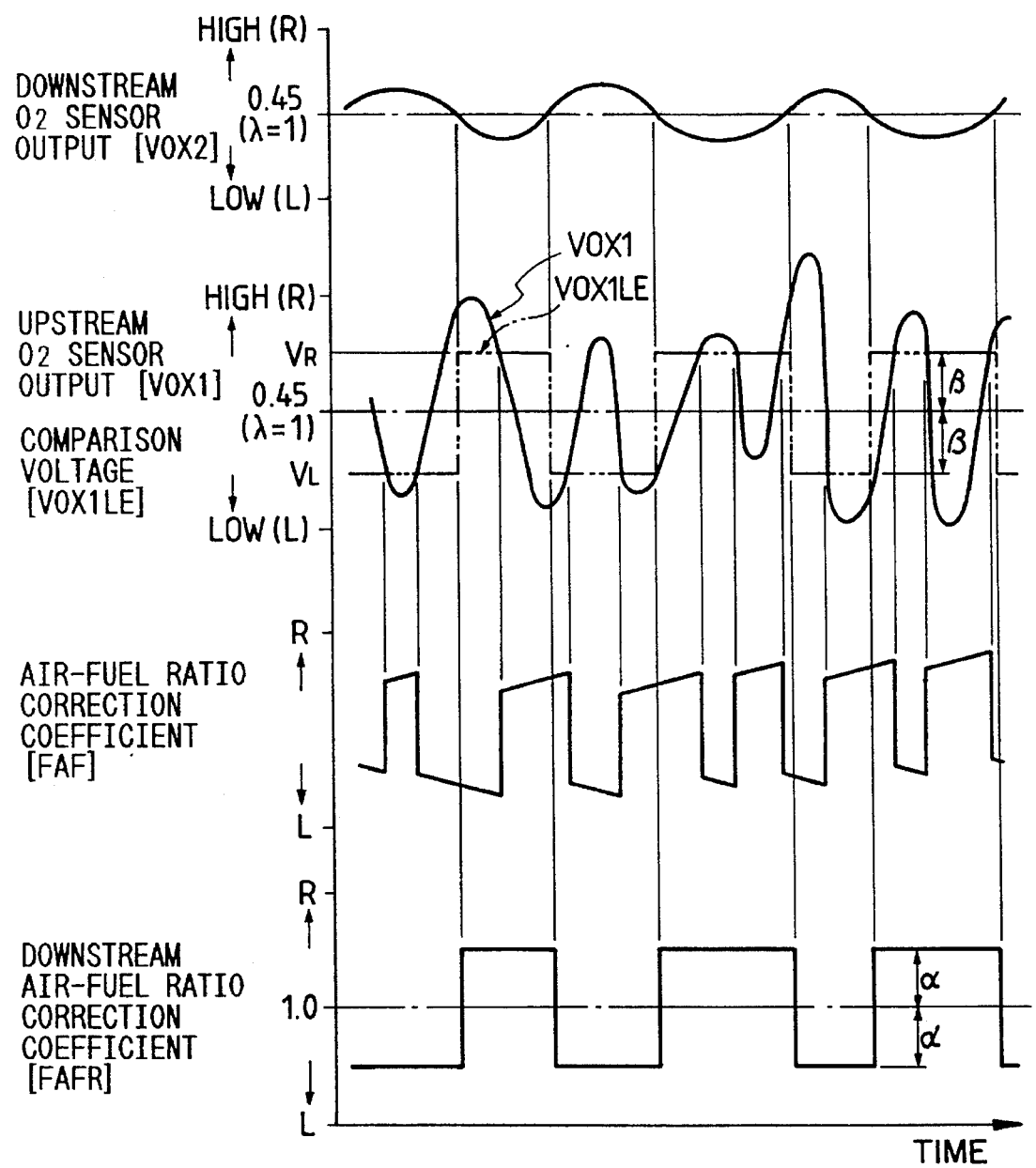
FIG. 50 is a time chart showing a relation among the output voltage of the downstream $O_2$ sensor, the output voltage of the upstream $O_2$ sensor, the comparison voltage, the air-fuel ratio correction coefficient and a downstream air-fuel ratio correction efficient in the tenth preferred embodiment.
Figure 51:
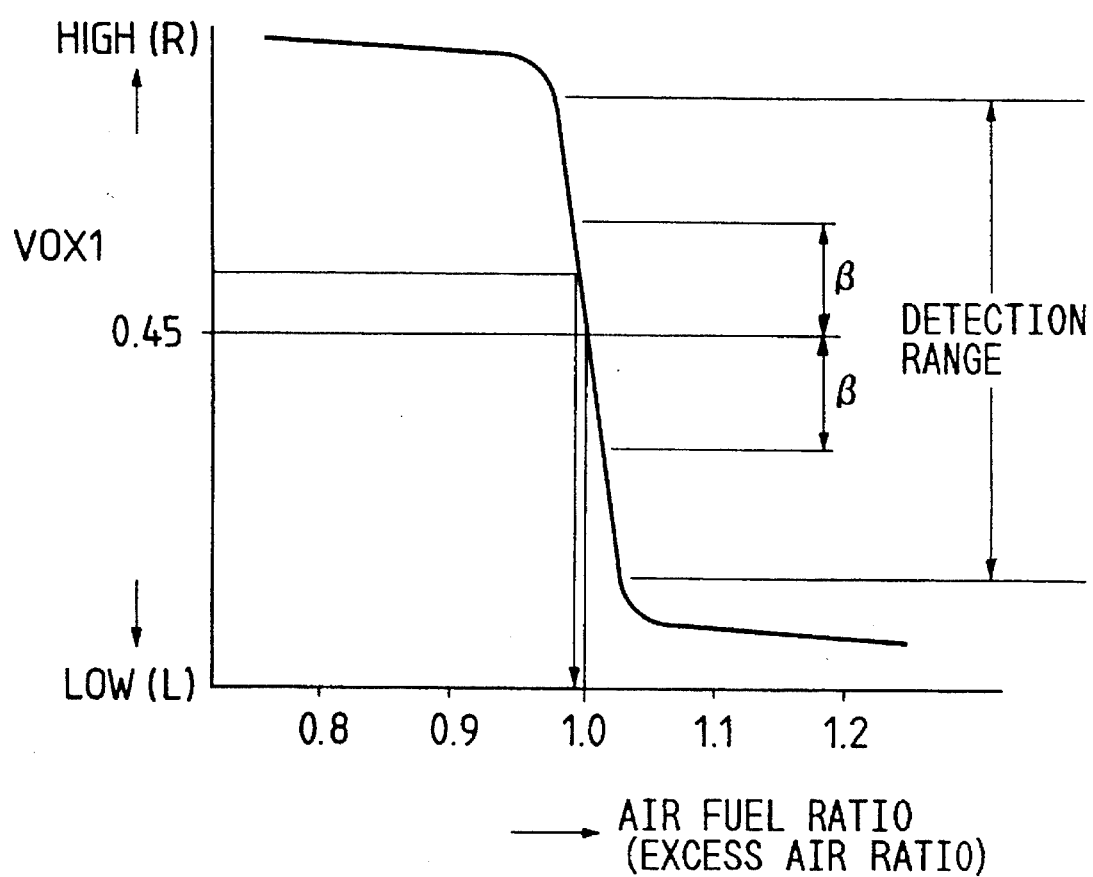
FIG. 51 is an explanatory diagram showing how displacement amounts are set relative to a detection range of the upstream $O_2$ sensor.

As shown in FIG. 50, the displacement amount α is preset as corresponding to a potential difference β between the preset rich side voltage VR (the preset lean side voltage VL) and the stoichiometric air-fuel ratio $\lambda=1$ (β=VR−($\lambda=1$)=($\lambda=1$)−VL). Specifically, the relation between the potential difference β and the displacement amount α is defined such that, when the fuel injection amount TAU is corrected to the rich or lean side by the downstream air-fuel ratio correction coefficient FAFR which is derived based on the displacement amount α, the output voltage VOX1 of the upstream $O_2$ sensor 41 varies by an amount of the potential difference β in the same direction as that of the correction of the fuel injection amount TAU. Further, as shown in FIG. 51, a magnitude of the potential difference β (=displacement amount α) is set smaller than the detection range of the upstream $O_2$ sensor 41 (the detection range of the air-fuel ratio $\lambda$ by linearizing the output voltage VOX1) with respect to the stoichiometric air-fuel ratio $\lambda=1$, as the preset rich side voltage VR and the preset lean side voltage VL in the sixth preferred embodiment.

As described before, in FIG. 43 of the eighth preferred embodiment, when the output voltage VOX2 is inverted at the point A, this inversion is reflected on the air-fuel ratio correction coefficient FAF at the point A' so that there is a delay from the point A to the point A'. On the other hand, as clear from FIG. 50, the inversion of the output voltage VOX2 is directly reflected on the fuel injection amount TAU in advance of the feedback control based on the comparison voltage VOX1LE, by using the downstream air-fuel ratio correction coefficient FAFR. Accordingly, the response characteristic of the control of the fuel injection amount TAU relative to the fluctuation of the downstream air-fuel ratio $\lambda$ is more enhanced so that the downstream air-fuel ratio $\lambda$ can be converged to the stoichiometric air-fuel ratio $\lambda=1$ more reliably.

Accordingly, in the tenth preferred embodiment, when the air-fuel ratio $\lambda$ downstream of the three way catalytic converter 13 is inverted between rich and lean, the comparison voltage VOX1LE is set on a side opposite to the inversion direction of the downstream air-fuel ratio $\lambda$, using the preset rich side voltage VR or the preset lean side voltage VL, and simultaneously, the downstream air-fuel ratio correction coefficient FAFR is set in the same direction as the comparison voltage VOX1LE, so as to correct the fuel injection amount TAU.

Further, in the tenth preferred embodiment, the downstream air-fuel ratio correction coefficient FAFR is corrected in the same direction as that of the comparison voltage VOX1LE and by the displacement amount α which is substantially the same as or corresponds to a magnitude of the comparison voltage VOX1LE on the above-noted opposite side, so as to correct the fuel injection amount TAU such that the same result as that of the feedback control based on the comparison voltage VOX1LE is obtained in advance thereof.

It is to be understood that this invention is not to be limited to the preferred embodiments and modifications described above, and that various changes and modifications may be made without departing from the spirit and scope of the invention as defined in the appended claims where the limitation "air-fuel ratio" should be interpreted as broad as possible at least as in the foregoing description.

For example, in the foregoing first and second preferred embodiments, the rich and lean skip amounts λSKR, λSKL are respectively decreased depending on decrement of the absolute values of the minimum and maximum adsorption amounts OSTmin, OSTmax of the three way catalytic converter 13, using the map of FIG. 9 stored in the ROM 33. However, these skip amounts λSKR, λSKL may be set to fixed values.

Further, in the foregoing first to seventh preferred embodiments, the target air-fuel ratio λTG derived in the inversion skip control, the purge control or the saturation skip control is directly used for deriving the air-fuel ratio correction coefficient FAF. However, for example, as in the air-fuel ratio control system disclosed in Japanese First (unexamined) Patent Publication No. 3- 185244, the so-called dither control may be performed to periodically fluctuate the target air-fuel ratio λTG with respect to the derived value.

Still further, in the foregoing fourth preferred embodiment, the integral amounts λIR, λIL and the skip amounts λSKR, λSKL are varied depending on variation in intake air quantity QA, and in the foregoing fifth preferred embodiment, the integral amount λI and the skip amount λSK are varied depending on variation in output voltage VOX2 of the $O_2$ sensor 27. However, it is not necessarily required to vary both of those values. Accordingly, either one of the integral amounts λIR, λIL, λI and the skip amounts λSKR, λSKL, λSK may be varied depending on variation in intake air amount QA or output voltage VOX2, and the other may be set fixed.

Further, in the foregoing sixth preferred embodiment, the lean skip amount ΔλLH and the rich skip amount ΔλRH for correcting the target air-fuel ratio λTG in a skipped manner are set fixed. However, these amounts may be varied depending on, for example, a magnitude of the air-fuel ratio λ corresponding to the output voltage VOX2AV of the $O_2$ sensor 27. In this case, as the output voltage VOX2AV approaches closer to an output voltage corresponding to the stoichiometric air-fuel ratio λ=1, the lean and rich skip amounts ΔλLH, ΔλRH are set to be smaller.

Still further, in the foregoing tenth preferred embodiment, the displacement amount α of the downstream air-fuel ratio correction coefficient FAFR is determined as corresponding to a magnitude (potential difference β) of the comparison voltage VOX1LE. However, it is not necessarily required to provide such correspondence. Accordingly, the displacement amount α may be set to a value other than the magnitude (potential difference β) of the comparison voltage VOX1LE as long as the downstream air-fuel ratio correction coefficient FAFR is corrected in the same direction as the setting of the comparison voltage VOX1LE.

What is claimed is:

1. An air-fuel ratio control system for an internal combustion engine, comprising:

upstream air-fuel ratio detecting means, provided upstream of a catalytic converter in an exhaust passage of the engine, for detecting a first air-fuel ratio of an air-fuel mixture based on exhaust gas upstream of the catalytic converter;

downstream air-fuel ratio detecting means, provided downstream of the catalytic converter, for detecting a second air-fuel ratio of the air-fuel mixture based on the exhaust gas having passed through the catalytic converter;

inversion direction determining means for determining a direction of inversion of said second air-fuel ratio when said second air-fuel ratio has been inverted between rich and lean with respect to a given air-fuel ratio;

target air-fuel ratio setting means for correcting a target air-fuel ratio in a direction opposite to said direction of the inversion when determined by said inversion direction determining means, said target air-fuel ratio setting means correcting said target air-fuel ratio by a given skip amount in a skipped manner; and fuel injection amount deriving means for deriving a fuel injection amount of a fuel injection valve at a given updating speed based on a differential between said first air-fuel ratio and said target air-fuel ratio.

2. The air-fuel ratio control system as set forth in claim 1, wherein said given air-fuel ratio represents a stoichiometric air-fuel ratio.

3. The air-fuel ratio control system as set forth in claim 2, wherein said target air-fuel ratio setting means corrects said target air-fuel ratio by a given integral amount in a direction opposite to that of deviation of said second air-fuel ratio with respect to the stoichiometric air-fuel ratio at no inversion of said second air-fuel ratio, said integral amount being smaller than said skip amount.

4. The air-fuel ratio control system as set forth in claim 2, wherein means is further provided for detecting a deterioration condition of said catalytic converter, and wherein said target air-fuel ratio setting means decreases said skip amount as deterioration of the catalytic converter advances.

5. The air-fuel ratio control system as set forth in claim 2, wherein said target air-fuel ratio setting means includes:

means for learning, per preset engine operating range, the target air-fuel ratio at the time of said second air-fuel ratio being converged to near the stoichiometric air-fuel ratio, so as to set a learned value; and means for determining one of said preset engine operating ranges to select corresponding one of said learned values and for correcting the target air-fuel ratio based on said selected learned value.

6. The air-fuel ratio control system as set forth in claim 2, wherein said target air-fuel ratio setting means includes:

means for detecting an engine operating condition; and means for correcting said skip amount depending on said detected engine operating condition.

7. The air-fuel ratio control system as set forth in claim 3, wherein said target air-fuel ratio setting means includes:

means for detecting an engine operating condition; and means for correcting said integral amount depending on said detected engine operating condition.

8. The air-fuel ratio control system as set forth in claim 2, wherein said target air-fuel ratio setting means increases said skip amount as said second air-fuel ratio goes away from the stoichiometric air-fuel ratio.

9. The air-fuel ratio control system as set forth in claim 3, wherein said target air-fuel ratio setting means increases said integral amount as said second air-fuel ratio goes away from the stoichiometric air-fuel ratio.

10. The air-fuel ratio control system as set forth in claim 1, wherein said given air-fuel ratio represents a control target value, and wherein means is further provided for detecting an engine operating condition so as to change said control target value depending on said detected engine operating condition.

11. The air-fuel ratio control system as set forth in claim 10, wherein said control target value is determined based on a condition of the exhaust gas.

12. The air-fuel ratio control system as set forth in claim 10, wherein said control target value is set to be rich with respect to the stoichiometric air-fuel ratio at an acceleration or at a high load driving, to be lean with respect to the stoichiometric air-fuel ratio at a deceleration or at an idling condition, and to the stoichiometric air-fuel ratio at other engine operating conditions.

13. The air-fuel ratio control system as set forth in claim 1, wherein said target air-fuel ratio setting means determines based on said second air-fuel ratio whether said catalytic converter is saturated, in response to said determination of the direction of the inversion by said inversion direction determining means, and wherein said target air-fuel ratio setting means performs said correction of the target air-fuel ratio when the saturation of the catalytic converter is determined.

14. An air-fuel ratio control system for an internal combustion engine, comprising:

upstream air-fuel ratio detecting means, provided upstream of a catalytic converter in an exhaust passage of the engine, for detecting a first air-fuel ratio of an air-fuel mixture based on exhaust gas upstream of the catalytic converter;

downstream air-fuel ratio detecting means, provided downstream of the catalytic converter, for detecting a second air-fuel ratio of the air-fuel mixture based on the exhaust gas having passed through the catalytic converter;

saturation determining means for determining saturation of said catalytic converter and a direction of said saturation based on said second air-fuel ratio;

target air-fuel ratio setting means for correcting a target air-fuel ratio in a direction opposite to said direction of the saturation when said saturation determining means determines the saturation of the catalytic converter, said target air-fuel ratio setting means correcting said target air-fuel ratio by a given skip amount in a skipped manner; and fuel injection amount deriving means for deriving a fuel injection amount of a fuel injection valve at a given updating speed based on a differential between said first air-fuel ratio and said target air-fuel ratio.

15. The air-fuel ratio control system as set forth in claim 14, wherein said target air-fuel ratio setting means gradually increases the target air-fuel ratio in a direction opposite to that of deviation of the second air-fuel ratio with respect to a stoichiometric air-fuel ratio when no saturation is determined by said saturation determining means.

16. The air-fuel ratio control system as set forth in claim 14, wherein said target air-fuel ratio setting means sets the target air-fuel ratio to a stoichiometric air-fuel ratio when no saturation is determined by said saturation determining means.

17. The air-fuel ratio control system as set forth in claim 16, further including means for deriving a saturated adsorption amount of said catalytic converter, and wherein said target air-fuel ratio setting means continues to set the target air-fuel ratio to a target value for a correction time in response to said determination of the saturation of the catalytic converter by said saturation determining means, said target value and said correction time corresponding to said saturated adsorption amount.

18. An air-fuel ratio control system for an internal combustion engine, comprising:

upstream air-fuel ratio detecting means, provided upstream of a catalytic converter in an exhaust passage of the engine, for detecting a first air-fuel ratio of an air-fuel mixture based on exhaust gas upstream of the catalytic converter;

downstream air-fuel ratio detecting means, provided downstream of the catalytic converter, for detecting a second air-fuel ratio of the air-fuel mixture based on the exhaust gas having passed through the catalytic converter;

saturation determining means for determining saturation of said catalytic converter and a direction of said saturation based on said second air-fuel ratio;

adsorption amount deriving means for deriving a saturated adsorption amount of said catalytic converter;

target air-fuel ratio setting means for setting the target air fuel ratio to a stoichiometric air-fuel ratio when no saturation is determined by said saturation determining means, and for continuously setting the target air-fuel ratio to a target value for a correction time when the saturation is determined by said saturation determining means, said target value and said correction time corresponding to said saturated adsorption amount derived by said adsorption amount deriving means; and fuel injection amount deriving means for deriving a fuel injection amount of a fuel injection valve at a given updating speed based on a differential between said first air-fuel ratio and said target air-fuel ratio.

19. An air-fuel ratio control system for an internal combustion engine, comprising:

upstream air-fuel ratio detecting means, provided upstream of a catalytic converter in an exhaust passage of the engine, for detecting a first air-fuel ratio of an air-fuel mixture based on exhaust gas upstream of the catalytic converter;

downstream air-fuel ratio detecting means, provided downstream of the catalytic converter, for detecting a second air-fuel ratio of the air-fuel mixture based on the exhaust gas having passed through the catalytic converter;

inversion direction determining means for determining a direction of inversion of said second air-fuel ratio when said second air-fuel ratio has been inverted between rich and lean with respect to a stoichiometric air-fuel ratio;

comparison value setting means for setting a comparison value on a side opposite to said direction of the inversion when determined by said inversion direction determining means; and fuel injection amount deriving means for deriving a fuel injection amount of a fuel injection valve based on a comparison between said first air-fuel ratio and said comparison value.

20. The air-fuel ratio control system as set forth in claim 19, wherein said comparison value setting means corrects said comparison value by a given skip amount in a skipped manner in a direction opposite to said direction of the inversion when determined by said inversion direction determining means, and by a given integral amount in a direction opposite to deviation of said second air-fuel ratio at no inversion thereof, said integral amount being set to be smaller than said skip amount.

21. The air-fuel ratio control system as set forth in claim 20, wherein means is further provided for detecting a deterioration condition of the catalytic converter, and wherein said comparison value setting means decreases said skip amount as deterioration of the catalytic converter advances.

22. The air-fuel ratio control system as set forth in claim 19, wherein said comparison value setting means includes:

means for learning, per preset engine operating range, the comparison value at the time of said second air-fuel ratio being converged to near the stoichiometric air-fuel ratio, so as to set a learned value; and means for determining one of said preset engine operating ranges to select corresponding one of said learned values and for correcting said comparison value based on said selected learned value.

23. The air-fuel ratio control system as set forth in claim 19, wherein said comparison value setting means further corrects said fuel injection amount in the same direction as said comparison value when the direction of the inversion of the second air-fuel ratio is determined by said inversion direction determining means.

24. The air-fuel ratio control system as set forth in claim 19, wherein said comparison value setting means further corrects said fuel injection amount in the same direction as that of said comparison value and by a displacement amount substantially the same as a magnitude of said comparison value on said opposite side when the direction of the inversion of the second air-fuel ratio is determined by said inversion direction determining means.

* * * * *